(12) United States Patent
Zhang et al.

(10) Patent No.: US 11,039,129 B2
(45) Date of Patent: Jun. 15, 2021

(54) SIGNALING OF SIMPLIFIED DEPTH CODING (SDC) FOR DEPTH INTRA- AND INTER-PREDICTION MODES IN 3D VIDEO CODING

(71) Applicant: QUALCOMM Incorporated, San Diego, CA (US)

(72) Inventors: Li Zhang, San Diego, CA (US); Hongbin Liu, Beijing (CN); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 15/895,815

(22) Filed: Feb. 13, 2018

(65) Prior Publication Data
US 2018/0241992 A1    Aug. 23, 2018

Related U.S. Application Data

(63) Continuation of application No. 15/103,798, filed as application No. PCT/CN2013/001562 on Dec. 13, 2013, now Pat. No. 10,110,895.

(51) Int. Cl.
*H04N 19/107* (2014.01)
*H04N 19/597* (2014.01)
(Continued)

(52) U.S. Cl.
CPC ......... *H04N 19/107* (2014.11); *H04N 19/159* (2014.11); *H04N 19/182* (2014.11);
(Continued)

(58) Field of Classification Search
CPC ...... H04N 19/91; H04N 19/70; H04N 19/597; H04N 19/463; H04N 19/182; H04N 19/159; H04N 19/107
See application file for complete search history.

(56) References Cited

U.S. PATENT DOCUMENTS 6,941,010 B2    9/2005    Kim et al.
9,071,838 B2    6/2015    Cho et al.
(Continued)

FOREIGN PATENT DOCUMENTS

CN    1296597 A    5/2001
CN    102907100 A    1/2013
(Continued)

OTHER PUBLICATIONS

Deng Z., et al., "3D-CE6-related: SDC without per-pixel prediction," Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, JCT3V-D0190, Apr. 26, 2013, 5 pages.

(Continued)

*Primary Examiner* — Peet Dhillon
(74) *Attorney, Agent, or Firm* — Shumaker & Sieffert, P.A.

(57) ABSTRACT

This disclosure describes techniques for signaling and processing information indicating simplified depth coding (SDC) for depth intra-prediction and depth inter-prediction modes in a 3D video coding process, such as a process defined by the 3D-HEVC extension to HEVC. In some examples, the disclosure describes techniques for unifying the signaling of SDC for depth intra-prediction and depth inter-prediction modes in 3D video coding. The signaling of SDC can be unified so that a video encoder or video decoder uses the same syntax element for signaling SDC for both the depth intra-prediction mode and the depth inter-prediction mode. Also, in some examples, a video coder may signal and/or process a residual value generated in the SDC mode using the same syntax structure, or same type of syntax structure, for both the depth intra-prediction mode and depth inter-prediction mode.

15 Claims, 10 Drawing Sheets

(51) Int. Cl.
*H04N 19/70* (2014.01)
*H04N 19/463* (2014.01)
*H04N 19/159* (2014.01)
*H04N 19/182* (2014.01)
*H04N 19/91* (2014.01)
*H04N 7/12* (2006.01)

(52) U.S. Cl.
CPC ......... *H04N 19/463* (2014.11); *H04N 19/597* (2014.11); *H04N 19/70* (2014.11); *H04N 19/91* (2014.11)

(56) References Cited

U.S. PATENT DOCUMENTS

| | | | |
|---|---|---|---|
| 9,232,236 B2 | 1/2016 | Narroschke et al. | |
| 2012/0121011 A1* | 5/2012 | Coban | H04N 19/436 375/240.03 |
| 2012/0189052 A1 | 7/2012 | Karczewicz et al. | |
| 2012/0269270 A1* | 10/2012 | Chen | H04N 19/147 375/240.16 |
| 2013/0002816 A1 | 1/2013 | Hannuksela et al. | |
| 2013/0003828 A1 | 1/2013 | Cohen et al. | |
| 2013/0022113 A1 | 1/2013 | Chen et al. | |
| 2013/0034154 A1* | 2/2013 | Song | H04N 19/13 375/240.03 |
| 2013/0064292 A1 | 3/2013 | Song et al. | |
| 2013/0070848 A1 | 3/2013 | Guo et al. | |
| 2014/0307786 A1 | 10/2014 | Deng et al. | |
| 2015/0003512 A1* | 1/2015 | Deng | H04N 19/11 375/240.02 |
| 2015/0304670 A1 | 10/2015 | Liu et al. | |
| 2015/0304683 A1 | 10/2015 | Jia et al. | |
| 2016/0037185 A1 | 2/2016 | Zheng | |
| 2016/0073082 A1 | 3/2016 | Liu et al. | |
| 2016/0212446 A1 | 7/2016 | Liu et al. | |
| 2016/0227250 A1 | 8/2016 | Lee et al. | |
| 2016/0316200 A1 | 10/2016 | Zhang et al. | |

FOREIGN PATENT DOCUMENTS

| | | |
|---|---|---|
| CN | 103200405 A | 7/2013 |
| CN | 103237216 A | 8/2013 |
| CN | 103327336 A | 9/2013 |
| EP | 2579592 A1 | 4/2013 |
| KR | 20120003863 A | 1/2012 |

OTHER PUBLICATIONS

Liu H., et al., "CE 6.h: Results on Simplified Inter Mode Coding of Depth," Joint Collaborative Team on 3D Video Coding Extension Development of ITU-T SG 16 WP 3 and ISO/IEC JTC 1/SC 29/WG 11, 5th Meeting: Vienna, AT, Jul. 27-Aug. 2, 2013, JCT3V-E0156, Jul. 19, 2013, 3 pages.

Tech G., et al., "3D-HEVC Test Model 2," Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, JCT3V-B1005_d0, Jan. 21, 2013, 118 pages.

Tech G., et al., "3D-HEVC Draft Text 2," Joint Collaborative Team on 3D Video Coding Extension Development of ITU-T SG 16 WP 3 and ISO/IEC JTC 1/SC 29/WG 11, 6th Meeting: Geneva, CH, Oct. 25-Nov. 1, 2013, JCT3V-F1001-v2, Dec. 5, 2013, 93 pages.

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v13, 12th Meeting: Geneva, CH, Jan. 14-23, 2013, 310 pp.

Bross B., et al., "High Efficiency video coding (HEVC) text specification Draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, Jul. 14, 2012, JCTVC-I1003_d9, pp. 45, 84-85.

International Search Report and Written Opinion—PCT/CN2013/001562—ISA/EPO—dated Sep. 26, 2014.

ITU-T H.265, Series H: Audiovisual and Multimedia Systems, Infrastructure of audiovisual services—Coding of moving video, High efficiency video coding, The International Telecommunication Union, Apr. 2015, 634 pp.

Jager F: "3D-CE6.h: Simplified Depth Coding with an optional Depth Lookup Table," 2. JCT-3V Meeting; 102. MPEG Meeting; Oct. 13-19, 2012; Shanghai, CN {The Joint Collaborative Team on 3D Video Coding Extension Development of ISO/IEC JTC1/SC29/WG11 and ITU-T SG.16 ); URL: http://phenix.int-evry.frijct2/,No. JCT3V-B0036,Oct. 16, 2012 {Oct. 16, 2012), 16 pp., XP030130217.

Liu et al., "CE5: Generic SDC for all Intra modes in 3D-HEVC," JCT-3V Meeting; Jan. 11-17, 2014; (Joint Collaborative Team on Video Coding of ISO/IEC JTC1/SC29/WG11 and ITU-T SG.16); Jan. 6, 2014; No. JCT3V-G0122, 9 pp.

Liu H., et al., "CE5 related: Generic SDC for all Intra models in 3D-HEVC" Document JCT3V-F0126, Joint Collaborative team on 3D Video Coding Extension Development of ITU-T SG 16 WP 3 and ISO/IEC JTC 1/SC 29/WG11, 6th Meeting: Geneva, CH, Oct. 25-Nov. 1, 2013, 8 pp.

Supplementary European Search Report—EP13899341—Search Authority—Munich—dated Mar. 31, 2017, 11 pp.

Tech et al., "3D-HEVC Draft Text 1", JCT-3V Meeting; MPEG Meeting; Jul. 27-Aug. 2, 2013; (The Joint Collaborative Team on 3D Video Coding Extension Development of ISO/IEC JTC1/SC29/WG11 and ITU-T SG.16); No. JCT3V-E1001_v3, XP030130664, 89 pp.

Tech et al., "3D-HEVC Draft Text 2," Document: JCT3V-F1001-v1, Joint collaborative Team on 3D Video Coding Extension Development of ITU-T SG 16 WP 3 and ISO/IEC JCT 1/SC 29/WG 11, 6th Meeting: Geneva, CH, Oct. 25-Nov. 1, 2013, 98 pp.

International Preliminary Report on Patentability from International Application No. PCT/CN2013/001562, dated Jun. 23, 2016, 8 pp.

Liu H., et al., "CE5 related: Unification of delta DC coding and signaling for inter SDC and intra SDC in 3D-HEVC", JCT-3V of ITU-T SG 16 WP 3 and ISO/IEC JTC 1/SC 29/WG 11, JCT3V-G0130, Ver.1, Jan. 3, 2014, pp. 1-8.

\* cited by examiner

SIGNALING OF SIMPLIFIED DEPTH CODING (SDC) FOR DEPTH INTRA- AND INTER-PREDICTION MODES IN 3D VIDEO CODING

This application is a continuation of U.S. Utility application Ser. No. 15/103,798, filed 10 Jun. 2016, which is a national-phase application of PCT Application Number PCT/CN2013/001562, filed 13 Dec. 2013, the entire contents of each of which are incorporated herein by reference.

TECHNICAL FIELD

This disclosure relates to video coding, and more particularly, to techniques for coding residual values for depth data in a three-dimensional (3D) video coding process.

BACKGROUND

Digital video capabilities can be incorporated into a wide range of devices, including digital televisions, digital direct broadcast systems, wireless broadcast systems, tablet computers, smartphones, personal digital assistants (PDAs), laptop or desktop computers, digital cameras, digital recording devices, digital media players, video gaming devices, video game consoles, cellular or satellite radio telephones, video teleconferencing devices, set-top devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive and store digital video information more efficiently.

An encoder-decoder (codec) applies video compression techniques to perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures alternatively may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-view coding bitstream may be generated by encoding views, e.g., from multiple perspectives. Multiview coding may allow a decoder to select different views, or possibly render multiple views. In addition, some three-dimensional (3D) video techniques and standards that have been developed, or are under development, make use of multiview coding aspects. For example, in some 3D video coding processes, different views may be used to transmit left and right eye views to support 3D video. Other 3D video coding processes may use multiview-plus-depth coding. In a multiview-plus-depth coding process, such as a process defined by the 3D-HEVC extension to HEVC, a 3D video bitstream may contain multiple views that include not only texture view components, but also depth view components. For example, a given view may comprise a texture view component and a depth view component. The texture view and depth view components may be used to construct 3D video data.

SUMMARY

In general, this disclosure describes techniques for signaling and processing information indicating the use of simplified depth coding (SDC) for depth intra-prediction and depth inter-prediction modes in a 3D video coding process, such as a process defined by the 3D-HEVC extension to HEVC. In some examples, the disclosure describes techniques for unifying the signaling of the use of SDC for depth intra-prediction and depth inter-prediction modes in 3D video coding, e.g., by using one syntax element to indicate usage of SDC for both depth intra- and depth inter-prediction.

The signaling of SDC can be unified so that a video encoder or video decoder, i.e., a video coder, uses the same syntax element, instead of separate syntax elements, for signaling SDC for both the depth intra-prediction mode and the depth inter-prediction mode. For example, a single syntax element may be signaled at the CU level to indicate whether SDC is used for the CU, whether the CU is intra-predicted or inter-predicted.

Also, in some examples, a video coder may signal and/or process a residual value generated in the SDC mode using the same syntax structure, the same type of syntax structure, or different instances of the same syntax structure, for both the depth intra-prediction mode and depth inter-prediction mode. In each case, the same syntax elements can be used to signal the residual values, e.g., DC residual values. In some examples, the syntax elements for signaling SDC for depth inter-prediction mode may be part of those syntax elements for signaling SDC for depth intra-prediction mode. In this case, the common syntax elements may be shared by depth intra and depth inter SDC modes.

For the shared syntax elements in the syntax structures used for the residual values generated by SDC, the context model and binarization processes, e.g., for a context-adaptive binary arithmetic coding (CABAC) entropy coding process, for relevant syntax elements for both the depth intra-prediction and depth inter-prediction modes can be unified. For example, the syntax elements for the residual values generated by SDC may be coded with the same context model and/or binarization processes for both the depth intra-prediction mode and the depth inter-prediction mode.

In some examples, a video coder may apply a constraint such that pulse code modulation (PCM) coding is disabled when SDC is enabled. Also, in some examples, a video coder may apply a constraint such that SDC is applied for both the depth intra-prediction and depth inter-prediction modes only for coding units having a particular partition size or partition sizes.

Further, in some examples, a single syntax element can be used to signal whether SDC is enabled or disabled for both the depth intra-prediction mode and depth inter-prediction modes for CU's in an entire coded video sequence or a slice. The syntax element can be presented, for example, in a video parameter set (VPS) extension, sequence parameter set (SPS), picture parameter set (PPS), slice segment header, or another data structure for signaling video coding syntax information. As an example, if this syntax element indicates that SDC is enabled for a sequence, then another syntax element can be signaled at a CU level for CU's in the sequence, to indicate if SDC is used in each respective CU. If this syntax element indicates that SDC is disabled for a sequence, then there is no need to signal a syntax element at the CU level for CU's in the sequence, as SDC is disabled. Alternatively, a syntax element may be provided to enable or disable the use of SDC for CU's in a picture of a slice.

In one example, the disclosure provides a method of decoding video data, the method comprising receiving a syntax element that indicates whether a simplified depth coding (SDC) mode is used for both intra-prediction and inter-prediction of a depth coding unit (CU) of the video data; when the depth CU is intra-predicted, performing intra-prediction to generate a predicted depth CU; when the depth CU is inter-predicted, performing inter-prediction to generate the predicted depth CU; when the syntax element indicates that the SDC mode is used, for each partition of a prediction unit (PU) of the depth CU, receiving information representing at least one DC residual value for the depth CU, wherein the at least one DC residual value represents a pixel difference between the partition of the PU of the depth CU and a corresponding partition of the predicted depth CU; and reconstructing the depth CU using the at least one DC residual value and the predicted depth CU.

In another example, the disclosure provides a method of encoding video data, the method comprising when a depth CU is intra-predicted, performing intra-prediction to generate a predicted depth CU, when the depth CU is inter-predicted, performing inter-prediction to generate the predicted depth CU, when a simplified depth coding (SDC) mode is used, for each partition of a prediction unit (PU) of the depth CU, generating information representing at least one DC residual value for the depth CU, wherein the at least one DC residual value represents a pixel difference between the partition of the PU of the depth CU and a corresponding partition of the predicted depth CU, when the SDC mode is used, generating a syntax element that indicates that the SDC mode is used for both intra-prediction and inter-prediction of a depth coding unit (CU) of the video data, and encoding the depth CU, in the video encoder, based on the information representing the at least one DC residual value and the syntax element.

In another example, the disclosure provides a video coder comprising a memory storing video data, and one or more processors configured to code a syntax element that indicates whether a simplified depth coding (SDC) mode is used for both intra-prediction and inter-prediction of a depth coding unit (CU) of the video data, when the depth CU is intra-predicted, perform intra-prediction to generate a predicted depth CU; when the depth CU is inter-predicted, perform inter-prediction to generate the predicted depth CU; and when the SDC mode is used, for each partition of a prediction unit (PU) of the depth CU, code information representing at least one DC residual value for the depth CU, wherein the at least one DC residual value represents a pixel difference between the partition of the PU of the depth CU and a corresponding partition of the predicted depth CU.

In another example, the disclosure provides a method of decoding video data, the method comprising when a depth coding unit (CU) of the video data is intra-predicted, performing intra-prediction to generate a predicted depth CU; when the depth CU is inter-predicted, performing inter-prediction to generate the predicted depth CU; when a simplified depth coding (SDC) mode is used, obtaining a syntax structure comprising one or more syntax elements indicating information representing at least one DC residual value for a partition of a prediction unit (PU) of the depth CU, wherein the syntax elements of the syntax structure are the same for the intra-prediction and the inter-prediction; and reconstructing the depth CU using the at least one DC residual value and the predicted depth CU.

In another example, the disclosure provides a method of encoding video data, the method comprising when a depth coding unit (CU) of the video data is intra-predicted, performing intra-prediction to generate a predicted depth CU; when the depth CU is inter-predicted, performing inter-prediction to generate the predicted depth CU; when a simplified depth coding (SDC) mode is used, coding a syntax structure comprising one or more syntax elements indicating information representing at least one DC residual value for a partition of a prediction unit (PU) of the depth CU, wherein the syntax elements of the syntax structure are the same for the intra-prediction and the inter-prediction; and encoding the depth CU based on the information representing the at least one DC residual value.

In another example, the disclosure provides a video coder comprising a memory storing video data; when a depth coding unit (CU) of the video data is intra-predicted, perform intra-prediction to generate a predicted depth CU of the video data; when the depth CU is inter-predicted, perform inter-prediction to generate the predicted depth CU of the video data; and when a simplified depth coding (SDC) mode is used, code a syntax structure comprising one or more syntax elements indicating information representing at least one DC residual value for a partition of a prediction unit (PU) of the depth CU, wherein the syntax elements of the syntax structure are the same for the intra-prediction mode and the inter-prediction mode.

In another example, the disclosure provides a method of decoding video data, the method comprising receiving a first syntax element that indicates whether a simplified depth coding (SDC) mode is enabled for depth coding units (CU) of an entire sequence of coded video data; receiving a second syntax element that indicates whether the SDC mode is used for both intra-prediction and inter-prediction of one of the depth CU's of the sequence; when the one of the depth CUs of the sequence is intra-predicted, performing intra-prediction to generate a predicted depth CU; when the one of the depth CUs of the sequence is inter-predicted, performing inter-prediction to generate the predicted depth CU; when the second syntax element indicates that the SDC mode is used, obtaining information representing at least one DC residual value of a partition of a prediction unit (PU) for the one of the depth CUs of the sequence; and reconstructing the partition of the PU of the one of the depth CUs of the sequence using the at least one DC residual value and the respective predicted depth CU.

In another example, the disclosure provides a method of encoding video data, the method comprising encoding a syntax element that indicates whether a simplified depth coding (SDC) mode is enabled for depth coding units (CU)

of an entire sequence of coded video data, encoding a second syntax element that indicates whether the SDC mode is used for both intra-prediction and inter-prediction of one of the depth CU's of the sequence, when one of the depth CUs of the sequence is intra-predicted, performing intra-prediction to generate a predicted depth CU, when one of the depth CUs of the sequence is inter-predicted, performing inter-prediction to generate the predicted depth CU, and when the second syntax element indicates that the SDC mode is used, encoding information representing at least one DC residual value of a partition of a prediction unit (PU) for the one of the depth CUs of the sequence.

In another example, the disclosure provides a video coder comprising a memory storing video data; and one or more processors configured to code a syntax element that indicates whether a simplified depth coding (SDC) mode is enabled for depth coding units (CU) of an entire code sequence of the video data; code a second syntax element that indicates whether the SDC mode is used for both intra-prediction and inter-prediction of one of the depth CU's of the sequence; when one of the depth CUs of the sequence is intra-predicted, perform intra-prediction to generate a predicted depth CU; when one of the depth CUs of the sequence is inter-predicted, perform inter-prediction to generate the predicted depth CU; and when the second syntax element indicates that the SDC mode is used, code information representing at least one DC residual value of a partition of a prediction unit (PU) for the one of the depth CUs of the sequence.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
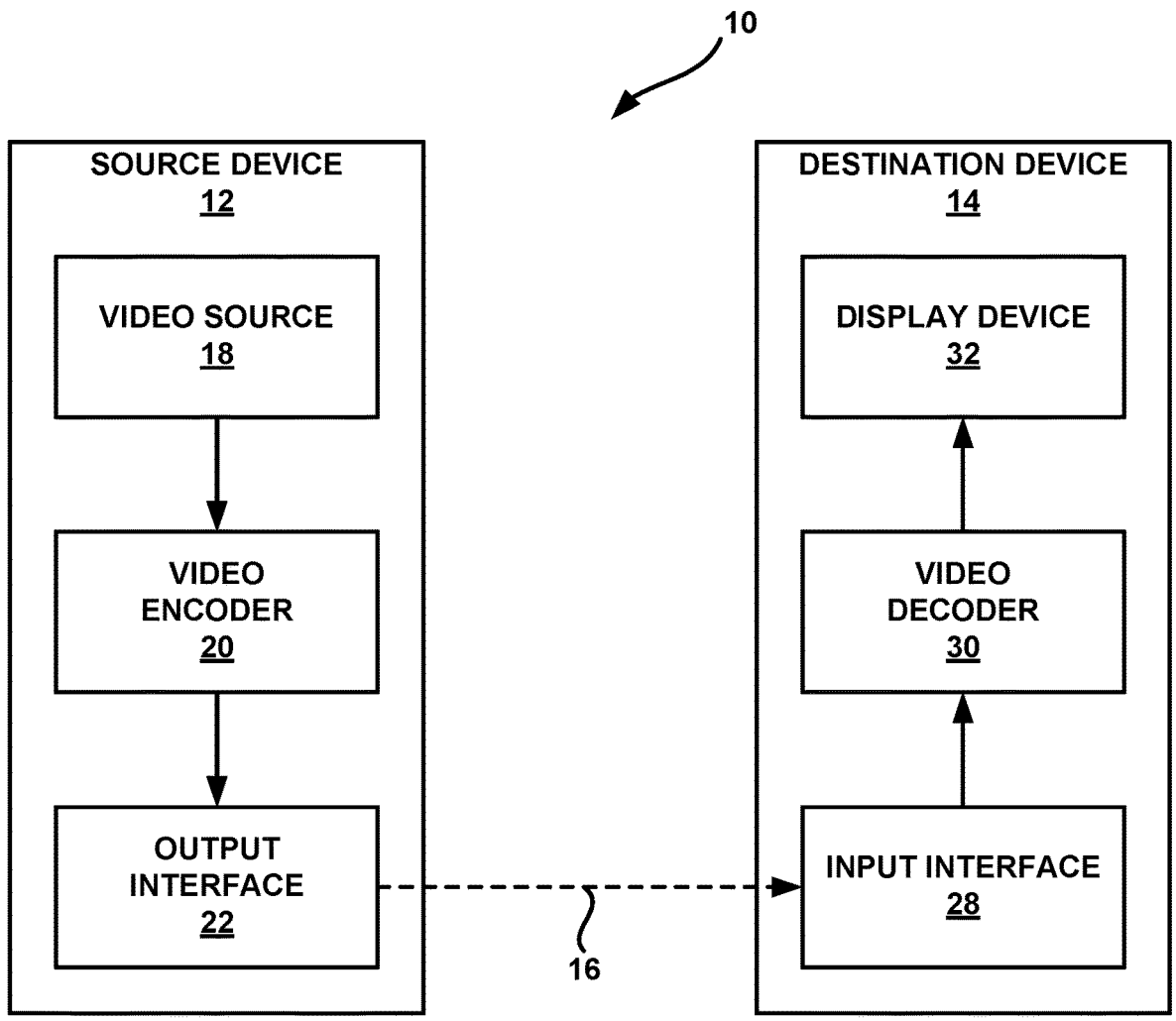
FIG. 1 is a block diagram illustrating an example video coding system that may utilize the techniques of this disclosure.

This disclosure is related to depth coding modes in a 3D video coding process, such as the 3D-HEVC extension to HEVC. More specifically, the disclosure describes techniques in which the signaling of SDC applied to depth intra-prediction and depth inter-prediction modes is unified. In some cases, SDC may be referred to, alternatively, as simplified residual coding or segment-wise DC coding. Simplified depth coding, simplified residual coding, and segment-wise DC coding will be referred to herein as simplified depth coding (SDC). In any event, as described in this disclosure, SDC may be applied to depth intra and depth inter coding with unified signaling techniques.

In 3D-HEVC, both intra SDC and inter SDC mode are used. However, in current designs of SDC, different syntax elements and context models are used to indicate the use of intra SDC and inter SDC in 3D-HEVC, which makes the parsing process of coding units more complex. In some examples, techniques described in this disclosure may address this problem in part by unifying syntax and context for intra SDC and inter SDC.

In SDC, in general, a video encoder encodes only one residual for each partition of a prediction unit (PU) of a depth coding unit (CU). Accordingly, in SDC, the video encoder may encode one residual value, e.g., a DC residual value, for a set of pixels associated with a partition of the PU. The PU could belong to an intra-coded depth CU or an inter-coded depth CU.

For each partition of a PU, instead of coding the differences for each pixel in a partition, the video encoder 20 may determine a difference between an average value of the original signal (i.e., an average value of the pixels in the partition of one block to be coded) and an average value of the prediction signal (i.e., an average value of the selected pixel samples in a corresponding partition of the predictive block), use this difference as the DC residual for all pixels in the PU, and signal this residual value to a video decoder.

The depth values can be optionally mapped to indexes using a Depth Lookup Table (DLT), which may be constructed by analyzing the frames within a first intra period before encoding a full video sequence. If DLT is used, the DLT may be transmitted by a video encoder to a video decoder, e.g., in a sequence parameter set (SPS) or other syntax structure, and decoded index values can be mapped back to depth values by the video decoder based on the DLT. With the use of DLT, further coding gain may be observed.

Intra- and inter-prediction mode signaling may be performed at the coding unit (CU) level. Similarly, the indication of the usage of SDC mode can be signaled at the CU level. However, when one CU (either intra-coded or inter-coded) is coded with SDC mode, it may be split into several prediction units (PUs). Each PU may be further split into several partitions. For SDC mode, a DC residual value may be signaled for each partition of each PU of a CU. That is, multiple DC residual values may be provided for multiple respective partitions of PU's in a CU.

For signaling of residual in SDC modes, as described above, for each partition, the difference of a representative value of the current partition and its predictor, may be signaled by a video encoder in the encoded bitstream. In some examples, the difference may be signaled without transform and quantization of the difference. The residual may be signaled using two different methods depending on whether a DLT is used. When a DLT is not used, the delta between the representative value of a current partition and its predictor is directly transmitted, e.g., as a DC residual value, with sign. When a DLT is used, instead of directly signaling the difference of depth values, the difference of DLT indices may be signaled, i.e., difference between a DLT index of the representative value of the current partition and a DLT index of the predictor.

In existing designs for SDC, different syntax elements and context models may be used to indicate usage of SDC for the depth intra prediction mode and depth inter prediction mode, respectively, in 3D-HEVC. In 3D-HEVC, the use of different syntax elements to indicate usage of SDC for the depth intra-prediction mode and depth inter-prediction mode makes the parsing process for coding units (CU's) complex at the decoder side.

As discussed above, intra and inter prediction mode signaling may performed for each depth CU, while the indication of the usage of SDC mode is also signaled at the CU level. In accordance with various examples, this disclosure describes techniques for unifying the signaling of SDC for depth intra-prediction and depth inter-prediction modes in a 3D video coding process, such as 3D-HEVC. Instead of separately signaling usage of SDC for intra-predicted CU's and inter-predicted CU's, a single SDC syntax element may be provided to indicate usage of SDC for a CU, whether the CU is intra- or inter-predicted. The techniques may be performed by a video encoder and/or video decoder, i.e., a video coder, to unify the signaling of SDC for depth intra-prediction and depth inter-prediction modes in 3D video coding. The signaling of SDC, which may be referred to as simplified depth coding, simplified residual coding or segment-wise DC coding herein, for depth intra and depth inter prediction modes in a 3D video coding process, may be unified in accordance with this disclosure. Various aspects of techniques for unifying SDC signaling are described below.

In some examples, in depth coding, a video coder may use only one syntax element (e.g., sdc_flag) to indicate the usage of SDC for either depth-intra or depth-inter modes. For example, a video encoder may use the same SDC syntax element (e.g., sdc_flag) to signal the use of SDC for both depth intra-prediction and depth inter-prediction modes. A video decoder may process the same syntax element (e.g., sdc_flag) to determine whether SDC is to be used for the depth intra-prediction and depth inter-prediction modes. If the syntax element indicates that SDC is to be used, then SDC is to be used for the CU for either depth intra-prediction or depth inter-prediction. In this manner, it is not necessary to signal different syntax elements to indicate SDC usage for depth intra-prediction and depth inter-prediction, respectively. Rather, a single syntax element indicates SDC usage regardless of which mode, intra or inter, is used for the CU. The signaling of one syntax element for both intra- and inter-prediction may reduce signaling overhead, promoting computing efficiency and possibly reducing memory requirements.

For example, the video coder may use the same syntax element to signal use of SDC for both depth intra-prediction and depth inter-prediction, instead of different syntax elements for separately signaling the use of SDC for depth intra-prediction and depth inter-prediction. Accordingly, if a single syntax element, such as sdc_flag, is used, a separate syntax element, such as inter_sdc_flag, that indicates that a current coding unit (CU) utilizes SDC for the depth inter-prediction mode can be removed. Likewise, a syntax element that indicates that a current CU utilizes SDC for the depth intra-prediction mode also can be removed. Hence, regardless of whether the current CU is coded with a depth intra-prediction mode or depth inter-prediction mode, a new syntax element, e.g., in the form of a flag such as sdc_flag, is introduced. When this flag is equal to 1, SDC is enabled for both depth intra-prediction mode or depth inter-prediction.

Also, in some examples, in depth coding, when the current depth CU is coded using SDC, for each partition, DC residual information representing a DC residual value for each partition of each PU of a depth inter-coded CU or a depth intra-coded CU may be unified in the sense that it may be presented by one SDC residual syntax structure, which includes information indicating the absolute value of the DC residual value and its sign, either directly or by use of DLT index values. For example, a video coder may store and/or retrieve residual values generated in the SDC mode using the same syntax structure, or same type of syntax structure, for both partitions of PU's in CU's coded with depth intra-prediction or depth inter-prediction modes. For example, a video encoder may generate a syntax structure containing the residual value for a partition of a PU of a depth CU, and a video decoder may obtain the residual value for the partition of the PU of the depth CU from such a syntax structure, for both depth intra-prediction and depth inter-prediction modes. Hence, syntax elements and syntax structures used to signal SDC can be unified for depth intra- and inter-coding.

Alternatively, or in addition, if a depth CU is intra-coded and SDC is utilized, a flag (equal to 1) indicating whether the current CU contains any non-zero DC residual value in any of its partitions may be further signaled by a video encoder and processed by a video decoder. If this flag is 0, the video encoder does not signal DC residual values and a video decoder infers the DC residual values to be equal to zero for each partition.

As a further alternative, or in addition, a flag indicating whether the current CU contains any non-zero DC residual value in any of its PU partitions may apply to both intra-coded and inter-coded CU's. In particular, if the flag is equal to 1, the video decoder determines that there are non-zero DC residual values for both an intra-coded CU and an inter-coded CU, as applicable. Hence, this flag may be used with the same syntax structure, or same type of syntax structure, used to present the DC residual value for partitions of PU's of an intra-coded CU or inter-coded CU, as described above.

As another alternative, or addition, this flag indicating whether the current CU contains any non-zero DC residual value in any of its partitions may not be used with a syntax structure used to present the DC residual value for an intra-coded CU and inter-coded CU. In this case, the same syntax structure, or type of syntax structure, may be used for intra-coded CU and inter-coded CU, as described above, but the DC residual value is signaled without the use of a flag indicating whether the current CU contains any non-zero DC residual value in any of its partitions.

In some examples, because syntax structures used for DC residual values for SDC in depth intra-prediction and depth inter-prediction modes share the same syntax elements, a context model and binarization process for entropy coding (e.g., context-adaptive binary arithmetic coding (CABAC)) the relevant syntax elements may also be unified, i.e., the same context model may be used for syntax elements that indicate SDC usage or include DC residual values for CU's depth intra-prediction and depth inter-prediction modes.

Consequently, the use of the same syntax elements and/or syntax structures for residual values generated by SDC for both depth intra- and inter-coding modes may promote reduced computational complexity, particularly in entropy coding. For example, the syntax elements for signaling SDC may be coded with the same context model and/or binarization process for both the depth intra-prediction mode and the depth inter-prediction mode. Also, the syntax structures carrying syntax element indicating information representing the residual values generated by SDC may also be entropy coded with the same content model and/or binarization process for intra-prediction and inter-prediction. Use of the same context model for depth intra-prediction and depth inter-prediction modes, e.g., in 3D-HEVC coding, may reduce computational burden and memory requirements associated with entropy coding, especially at the decoder side.

As another example, even though SDC signaling for depth intra modes and depth inter modes can use the same syntax structure for DC residual values, the video encoder and decoder may be configured to use different instances of the same syntax structure for depth intra coding and depth inter coding, respectively. Each instance of the syntax structure may include the same syntax elements or same types of syntax elements and the same structure to signal SDC usage and the DC residual value, but the instances of the syntax structure may signal values for such syntax elements separately for depth intra prediction and depth inter prediction modes, e.g., one instance of the syntax structure for depth intra prediction and one instance of the syntax structure for depth inter prediction. Thus, in this example, a video encoder and/or video decoder may use the same contexts and/or binarization processes for entropy coding, e.g., CABAC coding, of the different instances of the same syntax structures, or may maintain the contexts and/or binarization processes for entropy coding, e.g., CABAC coding, of the different instances of the syntax structures separately for SDC usage in depth intra prediction and depth inter prediction modes. In some examples, SDC usage for a CU for intra- or inter-mode may be signaled with a flag sdc_flag. In the syntax structure indicated DC residual for each partition, a DC residual value may be signaled, in some examples, with a magnitude indicated by depth_dc_abs and a sign indicated by depth_dc_sign_flag.

In some examples in accordance with this disclosure, video decoder may be configured to apply a constraint such that pulse code modulation (PCM) coding is disabled when SDC is used. For example, a constraint at the decoder side may be applied such that pcm_flag shall not be equal to 1 when sdc_flag is equal to 1, e.g., for a given depth CU. When SDC is enabled for both depth intra- and depth inter-prediction modes of a CU, PCM is not used for the CU. Accordingly, such a constraint prevents the decoder from enabling PCM when a syntax element (sdc_flag) indicating usage of SDC is equal to 1.

Also, in some examples, a video decoder may apply a constraint on SDC such that SDC is used for both the depth intra-prediction and depth inter-prediction modes only for coding units having a particular partition size or range of partition sizes. For example, a video decoder may apply a constraint on SDC at the decoder side such that both intra SDC mode and inter SDC mode are used only for CU's with a partition size 2N×2N. As an alternative, the video decoder may apply a constraint such that intra SDC mode is used for CU's with 2N×2N and N×N partition sizes. Hence, in one example, SDC may be used for depth intra prediction and depth inter prediction only for partition size 2N×2N. In another example, SDC may be used for depth inter prediction only for partition size 2N×2N, but SDC may be used for depth intra prediction only for partition sizes 2N×2N and N×N.

In some examples, a video encoder and/or video decoder may be configured to use a single syntax element, such as a one-bit flag or a multi-bit syntax element, to enable and disable SDC for both the depth intra-prediction and depth inter-prediction modes in a decoding process, e.g., for an entire coded video sequence. For example, such a syntax element may be coded in a video parameter set (VPS) extension, sequence parameter set (SPS), picture parameter set (PPS), slice segment header, or another data structure, to indicate whether SDC is enabled for both depth intra-prediction and depth inter-prediction modes. In this example, the single syntax element indicates whether SDC is enabled for both depth intra and depth inter modes for a coded video sequence. In another example, as an alternative, a video encoder and/or video decoder may code one flag to indicate whether SDC is enabled for depth intra mode is enabled for the whole coded video sequence and, if this is true, in addition, another flag to indicate whether SDC is enabled for depth inter mode for the whole coded video sequence or the whole slice. In this example, one syntax element is used to enable or disable SDC for a coded video sequence. If SDC is enabled, then another syntax element (e.g., sdc_flag) may be signaled by an encoder to indicate usage of SDC at the CU level for CU's within the coded video sequence. If SDC is disabled, then a syntax element to indicate usage of SDC at the CU level is not signaled by the encoder, and the decoder does not receive such a syntax element.

In some examples, a flag (e.g., SdcEnableFlag) may be provided to indicate whether SDC is enabled. The flag may have a value that is a function of corresponding values in a VPS, SPS, PPS, or slice header. Examples of VPS syntax elements that may determine in part the value of SdcEnableFlag include vps_inter_sdc_flag and vps_depth_modes_flag. A syntax element (sdc_flag) then may indicate whether SDC is used for a CU. Examples of these syntax elements are provided below. Similar syntax elements may be provided in a VPS, SPS, PPS, or slice segment header to enable and disable SDC for an entire code video sequence, picture, or slice, as applicable.

FIG. 1 is a block diagram illustrating an example video encoding and decoding system 10 that may be configured to utilize various techniques of this disclosure for signaling SDC for depth intra prediction modes and depth inter prediction modes, as described in this disclosure. In some examples, video encoder 20 and/or video decoder 30 of system 10 may be configured to perform techniques that unify the signaling of SDC for depth intra-prediction and depth inter-prediction modes in a 3D video coding process such as, e.g., 3D-HEVC.

As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium, such as a transmission channel, to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a computer-readable storage medium, such as a non-transitory computer-readable storage medium, i.e., a data storage device. Similarly, encoded data may be accessed from the storage device by input interface. The storage device may include any of a variety of distributed or locally accessed non-transitory data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply techniques for partition-based depth coding with non-rectangular partitions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for SDC for depth intra prediction modes may be performed by any digital video encoding and/or decoding device. Although generally the techniques of this disclosure are performed by a video encoder 20 and/or video decoder 30, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer generated video. In some cases, if video source 18 is a video camera, source device 12 and destination device 14 may form so-called smart phones, tablet computers or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or data storage media (that is, non-transitory storage media). In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers or in payloads of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, a projection device, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, as one example, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the HEVC standard and, more particularly, the 3D-HEVC extension of the HEVC standard, as referenced in this disclosure. HEVC presumes several additional capabilities of video coding devices relative to devices configured to perform coding according to other processes, such as, e.g., ITU-T H.264/AVC. For example, whereas H.264 provides nine intra-prediction encoding modes, the HM may provide as many as thirty-five intra-prediction encoding modes.

In general, HEVC specifies that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. Four sub-CUs of a leaf-CU may also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in HEVC has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape, or include partitions that are non-rectangular in shape, in the case of depth coding as described in this disclosure. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving reference samples for the PU. The reference samples may be pixels from a reference block. In some examples, the reference samples may be obtained from a reference block, or generated, e.g., by interpolation or other techniques. A PU also includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to a leaf-CU and leaf-TU, respectively, unless noted otherwise.

A video sequence typically includes a series of pictures. As described herein, "picture" and "frame" may be used interchangeably. That is, a picture containing video data may be referred to as a video frame, or simply a "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, HEVC supports prediction in various PU sizes. Assuming that the size of a particular CU is 2N×2N, HEVC supports intra prediction in PU sizes of 2N×2N or N×N, and inter prediction in symmetric PU sizes of 2N×2N, 2N×N, N×2N, or N×N. A PU having a size of 2N×2N represents an undivided CU, as it is the same size as the CU in which it resides. In other words, a 2N×2N PU is the same size as its CU. The HM also supports asymmetric partitioning for inter prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra predictive or inter predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video encoder 20 and/or video decoder 30 may perform intra-picture prediction coding of depth data and inter-prediction coding of depth data. In addition, in accordance with examples of this disclosure, video encoder 20 and/or video decoder 30 may use SDC to code residual data resulting from depth intra prediction coding of video data and/or depth inter prediction coding of video data, e.g., according to any of a variety of examples, as will be described. More specifically, a video encoder 20 and/or video decoder 30 may be configured according to the techniques of this disclosure to signal the use of SDC for depth intra prediction and depth inter prediction in a more unified manner in a 3D video coding process such as, e.g., 3D-HEVC.

This disclosure describes techniques for 3D video coding based on advanced codecs, such as High Efficiency Video Coding (HEVC) codecs. The 3D coding techniques described in this disclosure include depth coding techniques related to advanced inter-coding of depth views in a multi-view-plus-depth video coding process, such as the 3D-HEVC extension to HEVC, which is presently under development. Video coding standards and HEVC techniques related to this disclosure are reviewed below.

A recent draft of the HEVC standard, JCTVC-L1003, Benjamin Bross, Woo-Jin Han, Jens-Ranier Ohm, Gary Sullivan, Ye-Kui Wang, Thomas Wiegand, "High Efficiency Video Coding (HEVC) text specification draft 10 (for FDIS & Last Call)," Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013 ("HEVC WD10"), is incorporated herein by reference in its entirety, and is available from the following link: http://phenix.it-sudparis.eu/jct/doc_end_user/documents/ 12_Geneva/wg11/JCTVC-L1003-v34.zip A recent draft of 3D-HEVC is presented in JCTVC-F1001-v1, Gerhard Tech, Krzysztof Wegner, Ying Chen, and Sehoon Yea, "3D-HEVC Draft Text 2," Joint Collaborative Team on 3D Video Coding Extension Development of ITU-T SG 16 WP 3 and ISO/IEC JTC 1/SC 29/WG 11, 6th Meeting: Geneva, CH, 25 Oct.-1 Nov. 2013 ("3D-HEVC"), is incorporated herein by reference in its entirety, and is available from the following link: http://phenix.it-sudparis.eu/jct2/doc_end_user/documents/ 6_Geneva/wg11/JCT3V-F1001-v1.zip In HEVC, assuming that the size of a coding unit (CU) is 2N×2N, video encoder 20 and video decoder 30 may support various prediction unit (PU) sizes of 2N×2N or N×N for intra-prediction, and symmetric PU sizes of 2N×2N, 2N×N, N×2N, N×N, or similar for inter-prediction. A video encoder and video decoder may also support asymmetric partitioning for PU sizes of 2N×nU, 2N×nD, nL×2N, and nR×2N for inter-prediction.

For depth coding as provided in 3D-HEVC, a video encoder and video decoder may be configured to support a variety of different depth coding partition modes for intra prediction, including modes that use non-rectangular partitions. Examples of depth coding with non-rectangular partitions include wedgelet partition-based depth coding, Contour partition-based depth coding, and region boundary chain partition-based coding. Techniques for partition-based intra-coding of non-rectangular partitions, such as wedgelet partitions or contour partitions, as examples, may be performed in conjunction with a simplified depth coding (SDC) mode for coding of residual information resulting from intra prediction coding. In addition, for conventional intra/inter modes in HEVC, the techniques could also be performed in conjunction with SDC mode for coding of residual information resulting from intra prediction coding or inter-prediction coding of depth data.

Video data coded using 3D video coding techniques may be rendered and displayed to produce a three-dimensional effect. As one example, two images of different views (i.e., corresponding to two camera perspectives having slightly different horizontal positions) may be displayed substantially simultaneously such that one image is seen by a viewer's left eye, and the other image is seen by the viewer's right eye.

A 3D effect may be achieved using, for example, stereoscopic displays or autostereoscopic displays. Stereoscopic displays may be used in conjunction with eyewear that filters the two images accordingly. For example, passive glasses may filter the images using polarized lenses, or different colored lenses, or other optical filtering techniques, to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

The techniques of this disclosure relate to techniques for coding 3D video data by coding depth data to support 3D video. In general, the term "texture" is used to describe luminance (that is, brightness or "luma") values of an image and chrominance (that is, color or "chroma") values of the image. In some examples, a texture image may include one set of luminance data (Y) and two sets of chrominance data for blue hues (Cb) and red hues (Cr). In certain chroma formats, such as 4:2:2 or 4:2:0, the chroma data is down-sampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth image may include a set of depth pixels (or depth values) that each describes depth, e.g., in a depth component of a view, for corresponding texture data, e.g., in a texture component of the view. Each pixel may have one or more texture values (e.g., luminance and chrominance), and may also have one or more depth values. A texture picture and a depth map may, but need not, have the same spatial resolution. For instance, the depth map may include more or fewer pixels than the corresponding texture picture. The depth data may be used to determine horizontal disparity for the corresponding texture data, and in some cases, vertical disparity may also be used.

A device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change.

Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture components and corresponding depth components.

A picture generally corresponds to a particular temporal instance. Video data may be represented using a sequence of access units, where each access unit includes all data corresponding to a particular temporal instance. Thus, for example, for multiview video data plus depth coding, texture images from each view for a common temporal instance, plus the depth maps for each of the texture images, may all be included within a particular access unit. Hence, an access unit may include multiple views, where each view may include data for a texture component, corresponding to a texture image, and data for a depth component, corresponding to a depth map.

Each access unit may contain multiple view components or pictures. The view components for a particular view are associated with a unique view id or view order index, such that view components of different views are associated with different view ids or view order indices. A view component may include a texture view component as well as a depth view component. The texture and depth view components in the same view may have different layer ids. A texture view component may be coded as one or more texture slices, while the depth view component may be coded as one or more depth slices. Multiview-plus-depth creates a variety of coding possibilities, such as intra-picture, inter-picture, intra-view, inter-view, motion prediction, and the like.

In this manner, 3D video data may be represented using a multiview video plus depth format, in which captured or generated views include texture components associated with corresponding depth maps. Moreover, in 3D video coding, textures and depth maps may be coded and multiplexed into a 3D video bitstream. Depth maps may be coded as grayscale images, where "luma" samples (that is, pixels) of the depth maps represent depth values.

In general, a block of depth data (a block of samples of a depth map, e.g., corresponding to pixels) may be referred to as a depth block. A depth value may be referred to as a luma value associated with a depth sample. That is, depth map may generally be treated as a monochrome texture picture, in other words, a texture picture including luminance values and no chrominance values. In any case, conventional intra- and inter-coding methods may be applied for depth map coding.

Depth maps commonly are characterized by sharp edges and constant areas, and edges in depth maps typically present strong correlations with corresponding texture data. Due to the different statistics and correlations between texture and corresponding depth, different coding schemes have been designed for depth maps based on a 2D video codec.

HEVC techniques related to this disclosure are reviewed below. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, High Efficiency Video Coding (HEVC), mentioned above, is a new and upcoming video coding standard, developed by the Joint Collaboration Team on Video Coding (JCT-VC) of ITU-T Video Coding Experts Group (VCEG) and ISO/IEC Motion Picture Experts Group (MPEG).

Figure 2:
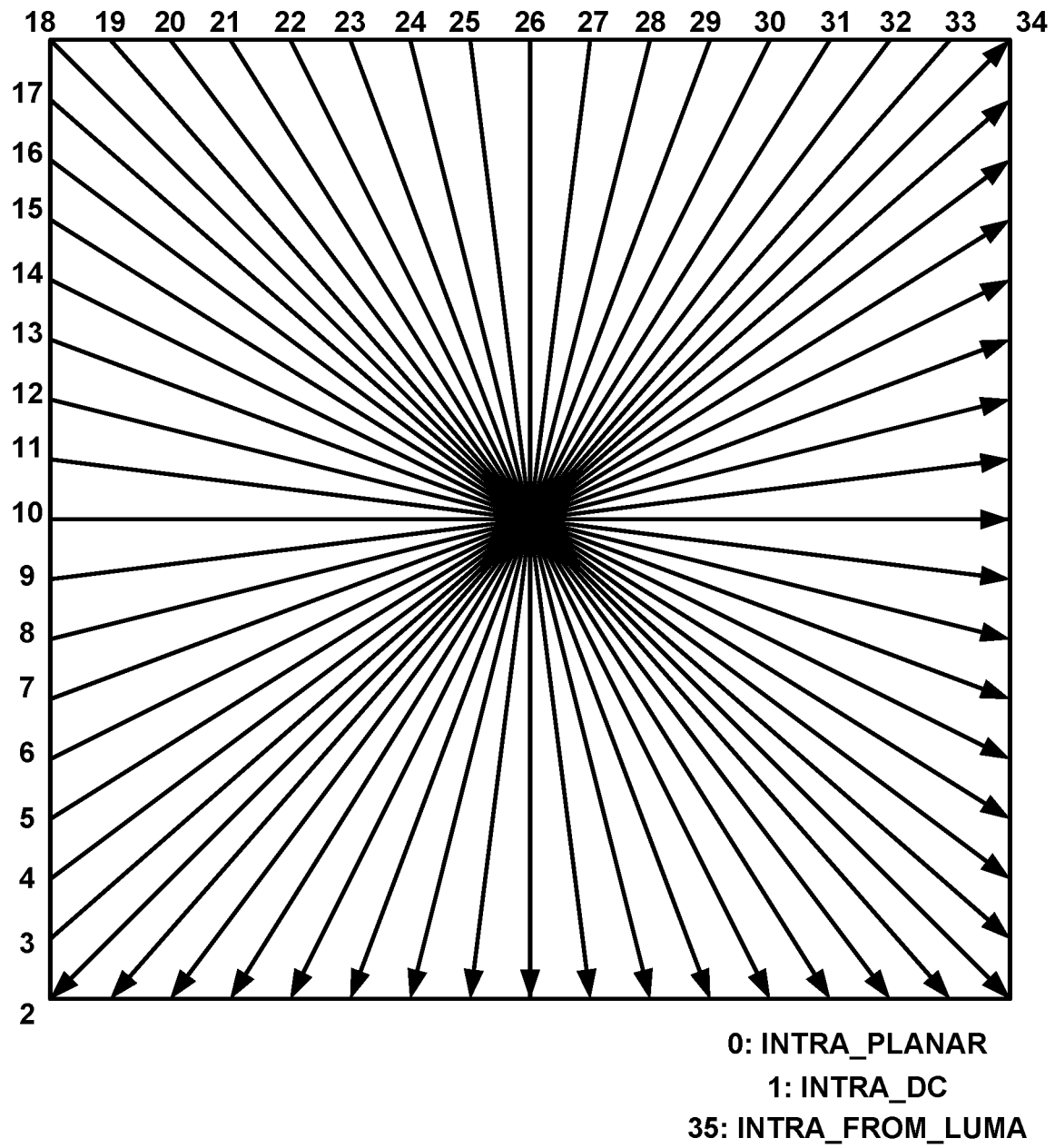
FIG. 2 is a diagram illustrating intra prediction modes used in high efficiency video coding (HEVC).

FIG. 2 is a diagram illustrating intra prediction modes used in HEVC. FIG. 2 generally illustrates the prediction directions associated with various directional intra-prediction modes available for intra-coding in HEVC. In the current HEVC, for the luma component of each Prediction Unit (PU), an intra prediction method is utilized with 33 angular prediction modes (indexed from 2 to 34), DC mode (indexed with 1) and Planar mode (indexed with 0), as shown in FIG. 2.

In the Planar mode (indexed with 0), prediction is performed using a so-called "plane" function to determine predictor values for each of the pixels within a block of video data, e.g., PU. According to the DC mode (indexed with 1), prediction is performed using an averaging of pixel values within the block to determine predictor values for each of the pixels within the block. According to a directional prediction mode, prediction is performed based on a neighboring block's reconstructed pixels along a particular direction (as indicated by the mode). In general, the tail end of the arrows shown in FIG. 2 represents a relative one of neighboring pixels from which a value is retrieved, while the head of the arrows represents the direction in which the retrieved value is propagated to form a predictive block.

For HEVC intra prediction modes, video encoder 20 and/or video decoder 30 generate a pixel specific predictor value for each pixel in the PU using the various modes discussed above, e.g., by using neighboring samples of the PU for modes 2 to 34. Video encoder 20 determines residual values for the video block based on the differences between the actual depth values and the predictor values for the pixels of the block, and provides the residual values to video decoder 30. According to HEVC WD10, video encoder 20 transforms the residual values and quantizes the transform coefficients, and may also entropy encode the quantized transform coefficients. Video decoder 30 (e.g., after entropy decoding, inverse quantizing, and inverse transforming) determines reconstructed values for the pixels of the block by adding the residual values to the predictor values. Further details regarding HEVC intra prediction modes are specified in HEVC WD10.

In JCT-3V, two HEVC extensions, the multiview extension (MV-HEVC) and 3D video extension (3D-HEVC) are being developed. A recent version of the reference software, "3D-HTM version 8.2," for 3D-HEVC is incorporated herein by reference in its entirety, and can be downloaded from the following link:
[3D-HTM version 8.2-dev0]:
https://hevc.hhi.fraunhofer.de/svn/svn_3DVCSoftware/branches/HTM-8.2-dev0/
A new version of the reference software, 3D-HTM 9.0, will be presented on top of the 3D-HTM version 8.2 and will be available soon.

The latest working draft (document number: F1001) is available from:
http://phenix.it-sudparis.eu/jct2/doc_end_user/documents/6_Geneva/wg11/JCT3V-F1001-v1.zip In 3D-HEVC, as defined in 3D-HEVC draft referenced above, each access unit contains multiple pictures, and each of the pictures in each view has a unique view identification (id), or view order index. However, the depth picture and texture picture of the same view may have different layer ids.

Depth intra coding in 3D video coding will now be described. 3D video data is represented using the multiview video plus depth format, in which captured views (texture) are associated with corresponding depth maps. In 3D video coding, textures and depth maps are coded and multiplexed into a 3D video bitstream. Depth maps are coded as a grayscale video where the luma samples represent the depth values, and conventional intra- and inter-coding methods can be applied for depth map coding.

As discussed above, depth maps may be characterized by sharp edges and constant areas. Due to the different statistics of depth map samples, different coding schemes are designed for depth maps based on a 2D video codec.

In 3D-HEVC, the same definition of intra prediction modes is utilized as in HEVC. That is, the intra modes used in 3D-HEVC include the intra modes of HEVC. Also, in 3D-HEVC, Depth Modeling Modes (DMMs) are introduced together with the HEVC intra prediction modes to code an Intra prediction unit of a depth slice. For better representations of sharp edges in depth maps, the current HTM (3D-HTM version 8.2) applies a DMM method for intra coding of depth map. There are two new intra modes in DMM. In both modes, a depth block is partitioned into two regions specified by a DMM pattern, where each region is represented by a constant value.

Figure 3:
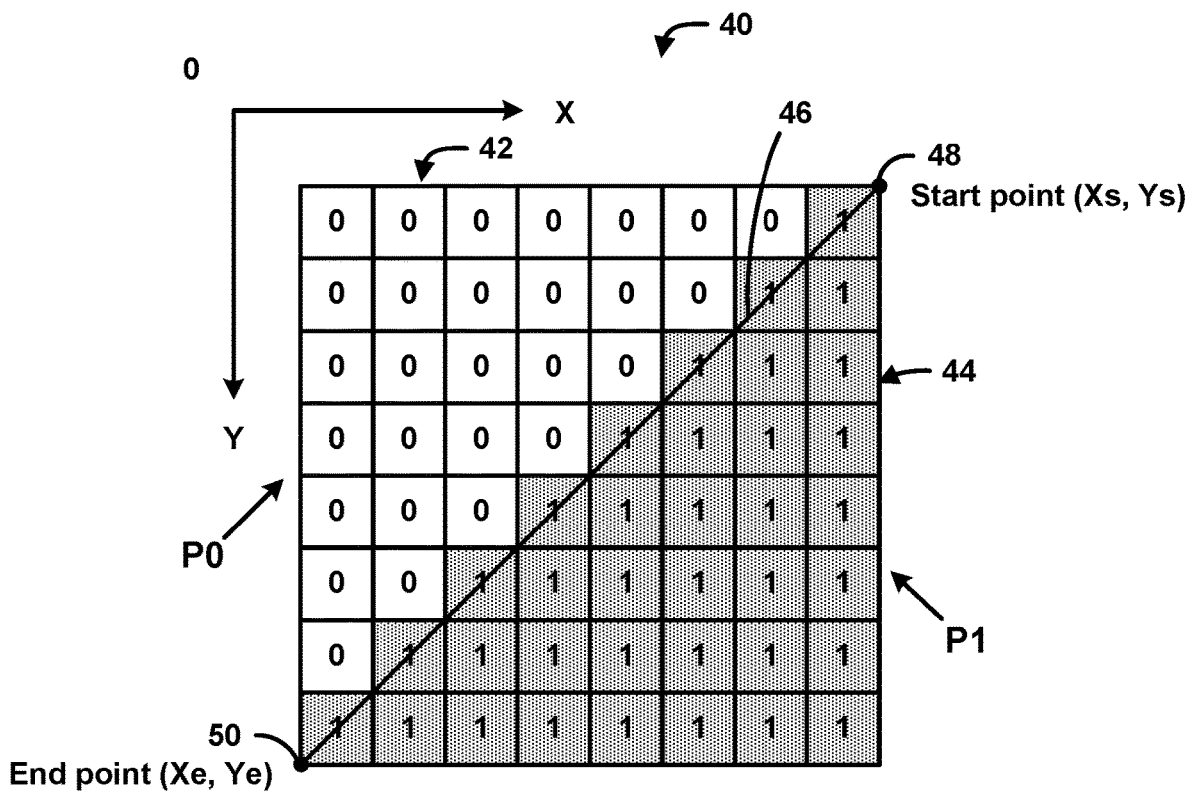
FIG. 3 is a diagram illustrating an example of one wedgelet partition pattern for use in coding an 8×8 block of pixel samples.
Figure 4:
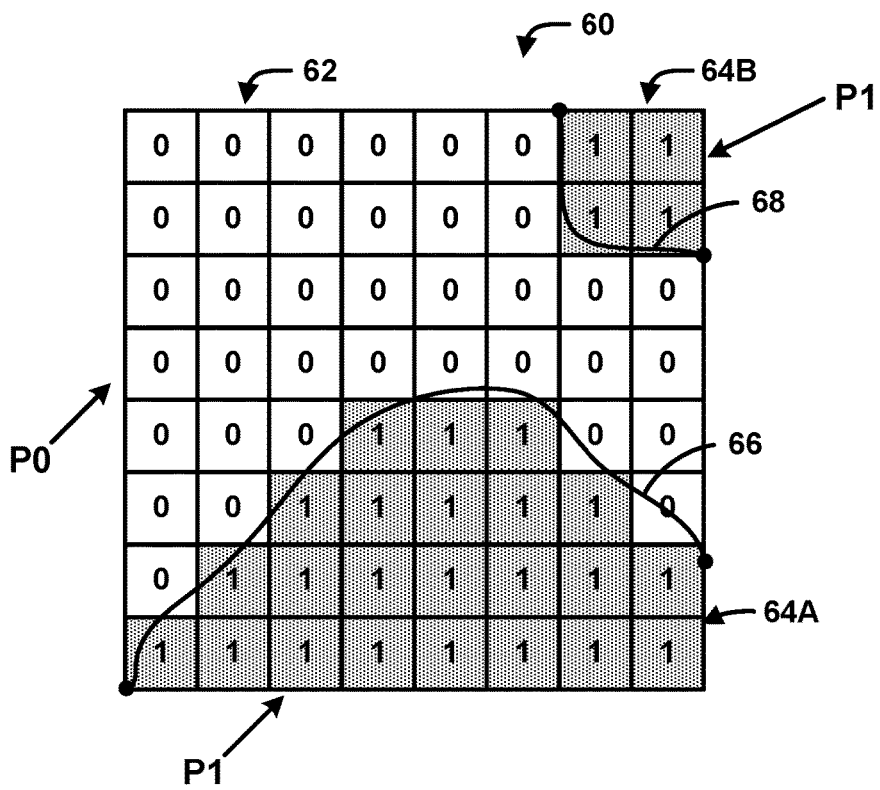
FIG. 4 is a diagram illustrating an example of one contour partition pattern for use in coding an 8×8 block of pixel samples.

The DMM pattern can be either explicitly signaled (DMM mode 1), or predicted by a co-located texture block (DMM mode 4). There are two types of partitioning models defined in DMM, including Wedgelet partitioning and the Contour partitioning. FIG. 3 is a diagram illustrating an example of a Wedgelet partition pattern for use in coding a block of pixel samples. FIG. 4 is a diagram illustrating an example of a contour partition pattern for use in coding a block of pixel samples.

For a Wedgelet partition, a depth block is partitioned into two regions by a straight line, as illustrated in FIG. 3. For Contour partitioning, a depth block can be partitioned into two irregular regions, as shown in FIG. 4. Contour partitioning is more flexible than the Wedgelet partitioning, but difficult to be explicitly signaled. In DMM mode 4, the contour partitioning pattern is implicitly derived using reconstructed luma samples of the co-located texture block.

As one example, FIG. 3 provides an illustration of a Wedgelet pattern for an 8×8 block 40. For a Wedgelet partition, a depth block, e.g., PU, is partitioned into two regions 42, 44 by a straight line 46, with a start point 48 located at (Xs, Ys) and an end point 50 located at (Xe, Ye), as illustrated in FIG. 3, where the two regions 42, 44 are also labeled with P0 and P1, respectively. Each pattern in block 40 consists of an array of size uB×vB binary digit labeling whether the corresponding sample belongs to region P0 or P1 where uB and vB represents the horizontal and vertical size of the current PU respectively. The regions P0 and P1 are represented in FIG. 3 by white and shaded samples, respectively. The Wedgelet patterns are initialized at the beginning of both encoding and decoding.

As shown in the example of FIG. 4, a depth block, such as depth block 60, can be partitioned into three irregularly-shaped regions 62, 64A and 64B, using contour partitioning, where region 62 is labeled as P0 and the two regions 64A and 64B are co-labeled as P1, respectively. Although pixels in region 64A are not immediately adjacent to pixels in region 64B, regions 64A and 64B may be defined to form one single region, for the purposes of predicting a PU of depth block 60. Contour partitioning may be more flexible than the Wedgelet partitioning, but may be relatively more difficult to signal. In DMM mode 4, in the case of 3D-HEVC, the contour partitioning pattern is implicitly derived using reconstructed luma samples of the co-located texture block.

With reference to FIGS. 3 and 4, each individual square within depth blocks 40 and 60 represents a respective individual pixel of depth blocks 40 and 60, respectively. Numeric values within the squares represent whether the corresponding pixel belongs to region 42 (value "0" in the example of FIG. 3) or region 44 (value "1" in the example of FIG. 3). Shading is also used in FIG. 3 to indicate whether a pixel belongs to region 42 (white squares) or region 44 (grey shaded squares).

As discussed above, each pattern (that is, both Wedgelet and Contour) may be defined by an array of size uB×vB binary digit labeling of whether the corresponding sample (that is, pixel) belongs to region P0 or P1 (where P0 corresponds to region 42 in FIG. 3 and region 62 in FIG. 4, and P1 corresponds to region 44 in FIG. 3 and regions 64A, 64B in FIG. 4), where uB and vB represent the horizontal and vertical size of the current PU, respectively. In the examples of FIG. 3 and FIG. 4, the PU corresponds to blocks 40 and 60, respectively. Video coders, such as video encoder 20 and video decoder 30, may initialize Wedgelet patterns at the beginning of coding, e.g., the beginning of encoding or the beginning of decoding.

For HEVC intra prediction modes, a pixel specific intra predictor value is generated for each pixel in the PU by using neighboring samples of the PU, as specified in sub-clause 8.4.2 in HEVC WD10.

For other depth intra modes, a partition specific DC predictor is calculated for each partition within the PU by using up to two neighboring samples of the PU. Let bPattern [x][y] be the partition pattern of the PU, where x=0 . . . N−1, y=0 . . . N−1 and N is the width of the PU. bPattern[x][y] indicates which partition pixel (x, y) belongs to and bPattern [x][y] can be equal to 0 or 1. Let BitDepth be the bit depth of depth samples and let RecSample[x][y] be the reconstructed neighboring samples of the PU, with x=−1 and y=0 . . . N−1 (corresponds to left neighboring pixels of the PU) or y=−1, x=0 . . . N−1 (corresponds to above neighboring pixels of the PU). Then, DC predictor of partition X, namely DCPred[X], with X=0 or 1 is derived as follows:

Set bT=(bPattern[0][0]!=bPattern[N−1][0])?1:0
Set bL=(bPattern[0][0]!=bPattern[0][N−1])?1:0
If bT equals bL
   DCPred[X]=(RecSample[−1][0]+RecSample[0][−1])>>1
   DCPred[1−X]=bL?(RecSample[−1][N−1]+RecSample[N−1][−1])>>1:$2^{BitDepth-1}$
Otherwise
   DCPred[X]=bL?RecSample[(N−1)>>1][−1]: RecSample[−1][(N−1)>>1]
   DCPred[1−X]=bL?RecSample[−1][N−1]:RecSample[N−1][−1]

As discussed above, a Depth Lookup Table (DLT) maps depth indexes to depth values. The DLT can be constructed by analyzing the frames within the first intra period before encoding the full video sequence. In the current design of 3D-HEVC, all of the valid depth values are sorted in ascending order and inserted to the DLT with increasing indexes.

DLT is an optional coding tool. In the current HTM, encoder 20 will not use DLT if more than half the values from 0 to MAX_DEPTH_VALUE (e.g., 255 for 8-bit depth samples) appear in the original depth map at the analysis step. Otherwise, the DLT will be coded in a sequence parameter set (SPS) and/or video parameter set (VPS). In order to code DLT, the number of valid depth values is coded with Exp-Golomb code first. Then, each valid depth value is also coded with an Exp-Golomb code.

Encoder 20 reads a pre-defined number of frames from the input video sequence to be coded and scans all samples for available depth map values. During this process, encoder 20 generates a mapping table that maps depth values to valid depth values based on the original uncompressed depth map.

Encoder 20 derives the Depth Lookup Table Idx2Depth (.), the Index Lookup TableDepth2Idx(.), the Depth Mapping Table M(.) and the number of valid depth values d_valid using the following algorithm that analyses the depth map $D_t$:
1. Initialization
   boolean vector B(d)=FALSE for all depth values d
   index counter i=0
2. Process each pixel position p in $D_t$ for multiple time instances t:
   Set (B($D_t$(p))=TRUE to mark valid depth values
3. Count number of TRUE values in B(d)→$d_{valid}$
4. For each d with B(d)==TRUE:
   Set Idx2Depth(i)=d
   Set M(d)=d
   Set Depth2Idx(d)=i
   i=i+1
5. For each d with B(d)==FALSE:
   Find d'=arg min|d−d'| and B(d')==TRUE
   Set M(d)=d'
   Set Depth2Idx(d)=Depth2Idx(d').

Mapping from an index Idx back to a depth value d is as follows: d=Idx2Depth [Idx]. Mapping from a depth value d to an index Idx is as follows: Idx=Depth2Idx [d].

Intra SDC mode (which may also be referred to as simplified depth coding, simplified residual coding, or segment-wise DC coding) is introduced in 3D-HEVC together with the HEVC intra prediction modes, DMM modes and chain coding mode to code an intra PU of a depth slice. In the current 3D-HEVC, SDC is only applied for 2N×2N PU partition size. Instead of coding quantized transform coefficients, SDC modes represent a depth block with the following two types of information:
1. The type of partition of the current depth block, including:
   a. DMM mode 1 (2 partitions)
   b. Planar (1 partition)
2. For each partition, a residual value (in the pixel domain) is signaled in the bitstream.

Two sub-modes are defined in SDC, including SDC mode 1 and SDC mode 2, which correspond to the partition type of Planar and DMM mode 1, respectively.

Simplified residual coding is used in SDC. In simplified residual coding, as described above, one DC residual value is signaled for each partition of the PU, and no transform or quantization is applied.

To signal the information representing the DC residual value of each partition, as discussed above, two methods can be applied:
1. Directly code the DC residual value of each partition which is calculated by subtracting the predictor, denoted by Pred, generated by neighbouring samples from the DC value (i.e., average value, denoted by Aver) of current partition in current PU.
2. When DLTs are transmitted, instead of coding the DC residual value, the index difference of the Aver and Pred mapped from the Index Lookup Table is coded. The index difference is calculated by subtracting the index of Pred from the index of Aver. At the decoder side, the sum of decoded index difference and the index of Pred is mapped back to depth values based on the DLT.

In addition to the inter-view sample prediction and inter-view motion prediction similar to texture coding, a new tool, namely Simplified inter-mode depth coding (SIDC), is also employed by 3D-HEVC.

SIDC extends the basic idea of SDC to inter mode depth coding. Therefore, SIDC may be referred to as "inter SDC" for short in the following context. However, in many instances, SDC will be used generally to refer to application of SDC for intra or inter coding throughout this disclosure. Inter SDC provides an alternative residual coding method by which encoder 20 only encodes one DC residual value for a PU. Transform and quantization are skipped by encoder 20 and/or video decoder 30, and no additional residual like transform tree is required to be generated by the encoder. Whether inter SDC is used is signaled by encoder 20 and parsed by decoder 30 in the general coding unit parameters at CU level. For inter SDC coded CU, one DC residual value is signaled for each PU and is used as residual for all samples in the PU. For example, SDC signaling may be performed by encoder 20 and received by decoder 30 at the CU level, along with depth intra- or inter-mode signaling. However, when a CU is coded with SDC mode, the CU may be split into several PU's, and each PU may be further split into partitions, such as, e.g., wedgelet partitions or contour partitions. The SDC residual data may include DC residual values that are signaled for each partition within each PU. Accordingly, in SDC mode, each partition of a PU may have a DC residual value.

To decrease the signaling bits for inter SDC mode, video encoder 20 and/or video decoder 30 may apply inter SDC only to non-skip CU's. Furthermore, to avoid possible overlap between inter SDC mode and skip mode, video encoder 20 and/or video decoder 30 apply inter SDC mode only when the DC residual of each PU within the CU is non-zero. The DC residual of a PU may be calculated as the average of the difference between an original sample value and a prediction sample value of all samples within a partition of the PU. Because only DC difference between a partition of an original block and a prediction block is signaled, to compensate the AC difference, mean-removed motion estimation is employed for depth inter mode coding.

Figure 5:
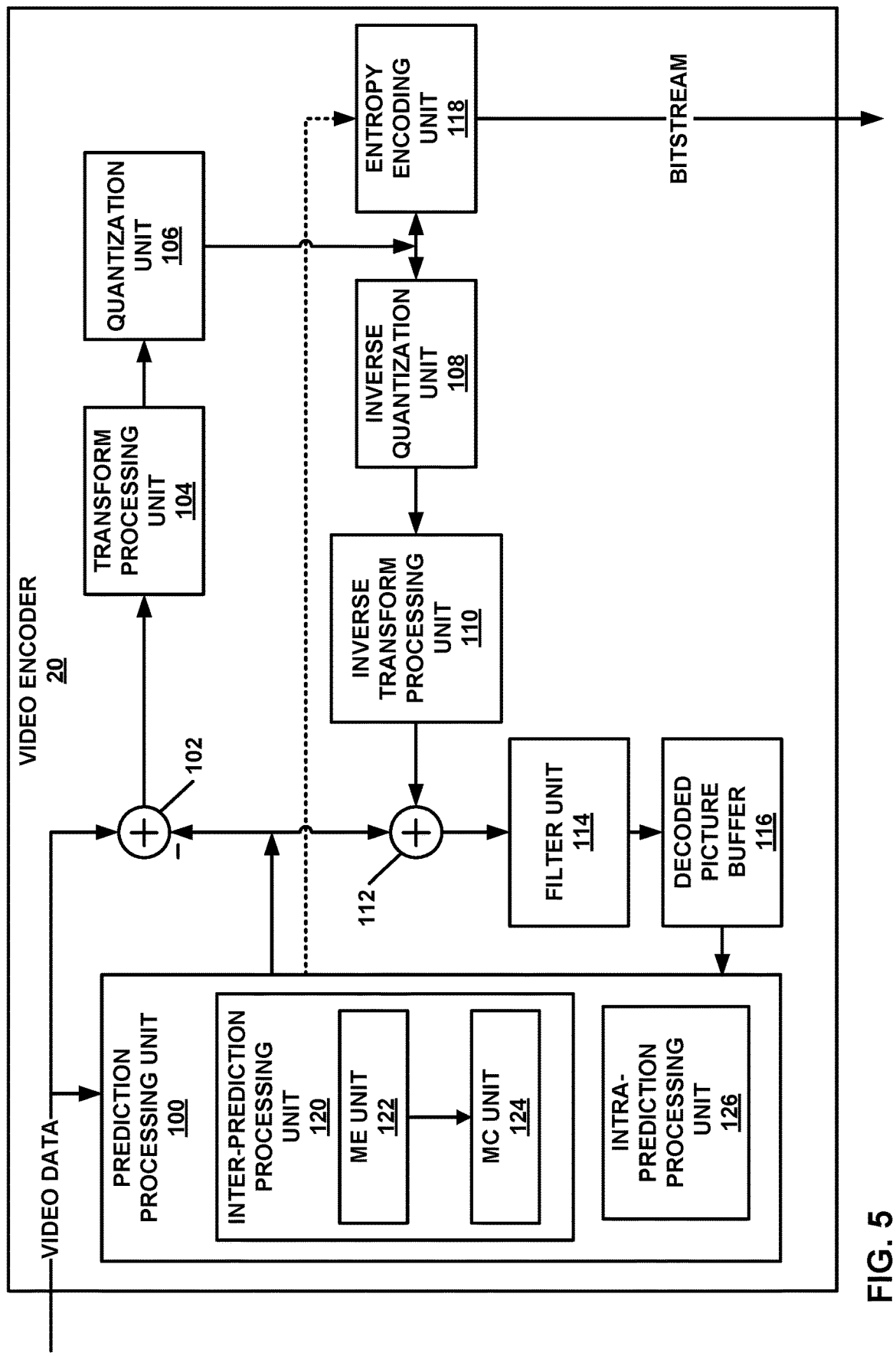
FIG. 5 is a block diagram illustrating an example video encoder that may implement the techniques of this disclosure.

FIG. 5 is a block diagram illustrating an example video encoder 20 that may be configured to implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding and, more particularly, 3D-HEVC. However, the techniques of this disclosure may be applicable to other coding standards or methods.

In the example of FIG. 5, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation (ME) unit 122 and a motion compensation (MC) unit 124. For ease of illustration, the components of prediction processing unit 100 are illustrated and described as performing both texture encoding and depth encoding. In some examples, texture and depth encoding may be performed by the same components of prediction processing unit 100 or different components within prediction processing unit 100. For example, separate texture and depth encoders may be provided in some implementations. Also, multiple texture and depth encoders may be provided to encode multiple views, e.g., for multiview plus depth coding. In either case, prediction processing unit 100 may be configured to intra- or inter-encode texture data and depth data as part of a 3D coding process, such as a 3D-HEVC process. Accordingly, prediction processing unit 100 may operate substantially in accordance with 3D-HEVC, subject to modifications and/or additions described in this disclosure, such as those relating to signaling of SDC for intra- and inter-prediction modes. Prediction processing unit 100 may generate and encode residual data for intra-encoded or inter-encoded depth data using SDC or non-SDC residual coding techniques, as described in this disclosure. When SDC is used, video encoder 20 may encode and signal a syntax element indicating use of SDC for both depth intra- and depth inter-prediction modes. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks.

Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction. In accordance with aspects of this disclosure, video encoder 20 and video decoder 30 also support non-rectangular partitions of a PU for depth inter coding.

Inter-prediction processing unit 120 may generate predictive data for a PU by performing inter prediction on each PU of a CU. The predictive data for the PU may include a predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, motion estimation (ME) unit 122 may search the reference pictures in a list of reference pictures (e.g., "RefPicList0") for a reference region for the PU. The reference pictures may be stored in decoded picture buffer 116. The reference region for the PU may be a region, within a reference picture, that contains sample blocks that most closely corresponds to the sample blocks of the PU. Motion estimation (ME) unit 122 may generate a reference index that indicates a position in RefPicList0 of the reference picture containing the reference region for the PU. In addition, motion estimation (ME) unit 122 may generate an MV that indicates a spatial displacement between a coding block of the PU and a reference location associated with the reference region. For instance, the MV may be a two-dimensional vector that provides an offset from the coordinates in the current decoded picture to coordinates in a reference picture. Motion estimation (ME) unit 122 may output the reference index and the MV as the motion information of the PU. Motion compensation (MC) unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation (ME) unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation (MC) unit 124 may generate the predictive sample blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation (ME) unit 122 may generate reference picture indexes that indicate positions in RefPicList0 and RefPicList1 of the reference pictures that contain the reference regions. In addition, motion estimation (ME) unit 122 may generate MVs that indicate spatial displacements between the reference location associated with the reference regions and a sample block of the PU. The motion information of the PU may include the reference indexes and the MVs of the PU. Motion compensation (MC) unit 124 may generate the predictive sample blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU, and then select one of the intra-prediction modes that yields acceptable or optimal coding performance, e.g., using rate-distortion optimization techniques. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Video encoder 20 is an example of a video encoder configured to perform any of the techniques for simplified residual coding for depth intra prediction or depth inter prediction as described herein. In accordance with one or more techniques of this disclosure, one or more units within video encoder 20 may perform one or more techniques described herein as part of a video encoding process. Similarly, video encoder 20 may perform a video decoding process using any of the techniques of this disclosure, to reproduce video data used as reference for subsequently coded video data. As discussed above, inverse quantization unit 108, inverse transform processing unit 110, and reconstruction unit 112, among other elements of video encoder 20, may be utilized in the video decoding process. Additional 3D processing components may also be included within video encoder 20.

For example, prediction processing unit 100 and, more particularly, inter-prediction processing unit 120 and intra-prediction processing unit 126, may perform an SDC mode for depth inter prediction and depth intra prediction encoding, respectively, of depth blocks as described herein. Inter-prediction processing unit 120 and intra-prediction processing unit 126, when used, may each determine a DC residual value for the depth block, e.g., PU, or each partition thereof. Prediction processing unit 120 may generate a syntax element and/or syntax structures that indicate that SDC is used for a current PU for depth intra prediction and depth inter prediction in a unified manner, as described in various examples of this disclosure.

Intra-prediction processing unit 126 or inter-prediction processing unit 120 may provide DC residual value(s) for the depth block, along with other syntax information, to entropy encoding unit 118, e.g., as illustrated by the dashed line in FIG. 5. Intra-prediction processing unit 126 or inter-prediction processing unit 120 may provide the DC residual values to entropy encoding unit 118 without the values being processed by transform processing unit 104 and quantization unit 106. In other examples, quantization unit 106 may quantize the DC residual values prior to entropy coding by entropy encoding unit 118. The syntax information may include various information, flags, or other syntax elements described herein for signaling in association with the techniques of this disclosure.

For example, the syntax information may indicate, as examples, whether the SDC mode is performed for the depth block, whether a partition-based (e.g., 3D-HEVC) or non-partition-based (HEVC) mode was used to determine the DC residual value, and which depth intra prediction mode was used to determine the DC residual value. In addition, the syntax information may indicate, in a unified manner, whether the SDC mode is used a CU, without regard to whether intra prediction or inter prediction is used for the CU, i.e., for either depth intra prediction or depth inter prediction, as the case may be. According to the SDC mode, video encoder 20 is configured to determine at least one DC residual value for the depth block (e.g., a partition of a PU of a CU) based on the indicated one of the depth intra prediction modes or depth inter prediction modes, wherein the DC residual value represents a residual value of a plurality of pixels of the depth block, and encode the DC residual value or information representing the DC residual value into the bitstream.

Video encoder 20 is an example of a video encoder comprising a memory storing video data, and one or more processors configured to perform a method comprising when a depth CU is intra-predicted, performing, in the video encoder, intra-prediction to generate a predicted depth CU, when the depth CU is inter-predicted, performing, in the video encoder, inter-prediction to generate the predicted depth CU, when a simplified depth coding (SDC) mode is used, for each partition of a prediction unit (PU) of the depth CU, generating, in the video encoder, information representing at least one DC residual value for the depth CU, wherein the at least one DC residual value represents a pixel difference between the partition of the PU of the depth CU and a corresponding partition of the predicted depth CU, when the SDC mode is used, generating, in a video decoder, a syntax element that indicates that the SDC mode is used for both intra-prediction and inter-prediction of a depth coding unit (CU) of the video data, and encoding the depth CU, in the video encoder, based on the information representing the at least one DC residual value and the syntax element.

Video encoder 20 is also an example a video encoder comprising a memory that stores video data, and one or more processors configured to perform a method comprising when a depth coding unit (CU) of the video data is intra-predicted, performing, in the video encoder, intra-prediction to generate a predicted depth CU, when the depth CU is inter-predicted, performing, in the video encoder, inter-prediction to generate the predicted depth CU, when a simplified depth coding (SDC) mode is used, coding, in the video encoding, a syntax structure comprising one or more syntax elements indicating information representing at least one DC residual value for a partition of a prediction unit (PU) of the depth CU, wherein the syntax elements of the syntax structure are the same for the intra-prediction and the inter-prediction, and encoding, in the video encoder, the depth CU based on the information representing the at least one DC residual value.

Video encoder 20 is also an example of a video encoder comprising a memory storing video data, and one or more processors configured to perform a method comprising encoding, in a video encoder, a syntax element that indicates whether a simplified depth coding (SDC) mode is enabled for depth coding units (CU) of an entire sequence of coded video data, encoding a second syntax element that indicates whether the SDC mode is used for both intra-prediction and inter-prediction of one of the depth CU's of the sequence, when one of the depth CUs of the sequence is intra-predicted, performing, in the video encoder, intra-prediction to generate a predicted depth CU, when one of the depth CUs of the sequence is inter-predicted, performing, in the video encoder, inter-prediction to generate the predicted depth CU, and when the second syntax element indicates that the SDC mode is used, encoding information representing at least one DC residual value of a partition of a prediction unit (PU) for the one of the depth CUs of the sequence.

Figure 6:
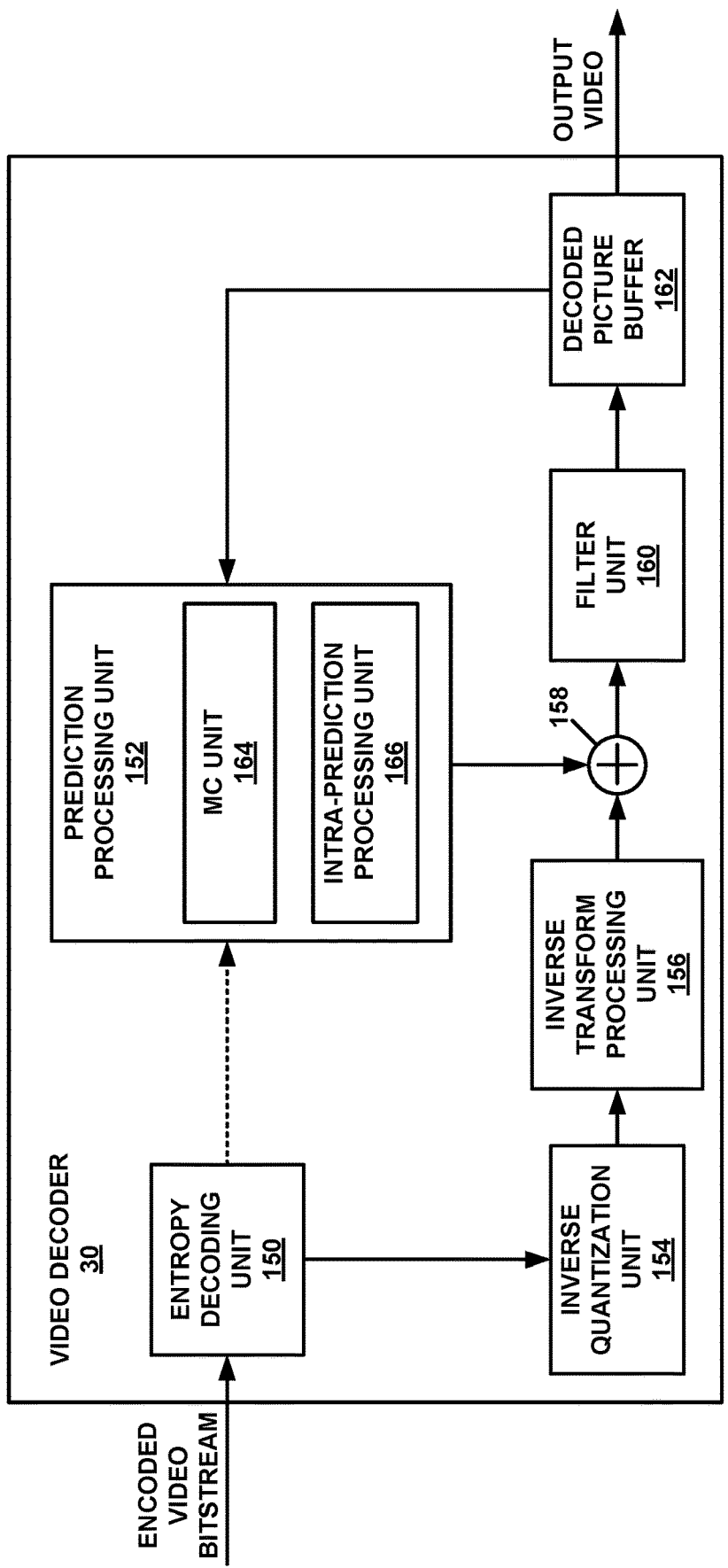
FIG. 6 is a block diagram illustrating an example video decoder that may implement the techniques of this disclosure.

FIG. 6 is a block diagram illustrating an example video decoder 30 that is configured to perform the techniques of this disclosure. FIG. 6 is provided for purposes of explanation and should not be considered limiting of the techniques as broadly exemplified and described in this disclosure. For purposes of explanation, this disclosure describes video decoder 30 in the context of HEVC coding and, in particular, 3D-HEVC coding. However, the techniques of this disclosure may be applicable to other 3D video coding standards or methods.

In the example of FIG. 6, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation (MC) unit 164 and an intra-prediction processing unit 166. For ease of illustration, the components of prediction processing unit 152 are illustrated and described as performing both texture decoding and depth decoding. In some examples, texture and depth decoding may be performed by the same components of prediction processing unit 152 or different components within prediction processing unit 152. For example, separate texture and depth decoders may be provided in some implementations. Also, multiple texture and depth decoders may be provided to decode multiple views, e.g., for multiview plus depth coding. In either case, prediction processing unit 152 may be configured to intra- or inter-decode texture data and depth data as part of a 3D coding process, such as a 3D-HEVC process. Accordingly, prediction processing unit 152 may operate substantially in accordance with 3D-HEVC, subject to modifications and/or additions described in this disclosure, such as those relating to signaling of SDC for intra- and inter-prediction modes. Prediction processing unit 152 may obtain residual data from the encoded video bitstream for intra-decoded or inter-decoded depth data using SDC or non-SDC residual coding techniques as described in this disclosure, and reconstruct CU's using intra-predicted or inter-predicted depth data and the residual data. When SDC is used, video decoder 30 may decode a syntax element indicating use of SDC for both depth intra- and depth inter-prediction modes. In other examples, video decoder 30 may include more, fewer, or different functional components.

Video decoder 30 may receive a bitstream. Entropy decoding unit 150 may parse the bitstream to decode syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements extracted from the bitstream.

The bitstream may comprise a series of NAL units. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice. The PPS may refer to an SPS, which may in turn refer to a VPS. Entropy decoding unit 150 may also entropy decode other elements that may include syntax information, such as SEI messages.

Decoded syntax elements in any of the slice header, parameter sets, or SEI messages may include information described herein as being signaled to perform the SDC mode in accordance with example techniques described in this disclosure. For example, the decoded syntax elements may indicate whether the SDC mode is performed for the depth block for both depth intra-prediction and depth inter-prediction modes, in a unified manner, as described in this disclosure. Such syntax information may be provided to prediction processing unit 152 for decoding and reconstruction of a depth block according to the techniques described in this disclosure.

In general, in addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation (MC) unit 164 may determine, based on the motion information of the PU, one or more reference regions for the PU. Motion compensation (MC) unit 164 may generate, based on samples blocks at the one or more reference blocks for the PU, predictive luma, Cb and Cr blocks for the PU.

Continuing reference is now made to FIG. 6. Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Video decoder 30 is an example of a video decoder configured to perform any of the techniques for unified signaling and parsing syntax elements indicating usage of SDC for both depth intra-prediction modes and depth inter-prediction modes, as described herein. In accordance with one or more techniques of this disclosure, one or more units within video decoder 30 may perform one or more techniques described herein as part of a video decoding process. Additional 3D coding components may also be included within video decoder 30.

For example, prediction processing unit 152 and, more particularly, intra-prediction processing unit 166 and motion compensation (MC) unit 164, may determine whether to perform SDC in depth intra-prediction modes and depth inter-prediction modes, as applicable, of a 3D video coding process, such as 3D-HEVC. Entropy decoding unit 150 may entropy decode one or more DC residual values for a depth block, as well as syntax information described herein, e.g., indicating whether depth intra prediction or depth inter prediction was used to encode the block, as well as whether the SDC mode was performed for the depth intra prediction or depth inter prediction to encode the block. In this manner, decoder 30 determines whether to use SDC to decode a current CU, i.e., a depth block, based on a syntax element, such as sdc_flag, and may use the same syntax structure or different instances of the syntax structure to obtain the residual value to be used with an intra-predicted depth block or inter-predicted depth block to reconstruct the CU.

Entropy decoding unit 150 may provide the DC residual value(s) and the syntax information for the block to prediction processing unit 152, as indicated by the dashed line in FIG. 6. In this manner, the DC residual value(s) need not be first provided to inverse quantization unit 154 and inverse transform processing unit 156 for inverse quantization and inverse transformation. In other examples, inverse quantization unit 154 may inverse quantize the DC residual value(s), and provide de-quantized DC residual values to prediction processing unit 152.

Motion compensation (MC) unit 164 may determine predictor values for the depth block based on a depth inter prediction mode, as indicated by syntax information, e.g., according to any of the technique described herein. Motion compensation (MC) unit 164 may utilize reconstructed depth blocks from reference pictures stored in decoded picture buffer 162 to determine the predictor values of the inter-predicted depth block. If the SDC mode is indicated, i.e., for both depth intra-prediction and inter-prediction, motion compensation (MC) unit 164 applies SDC to reconstruct the depth block. Motion compensation (MC) unit 164 may reconstruct the depth block by summing the DC residual value and the predictor values. In some examples, motion compensation (MC) unit 164 may utilize reconstruction unit 158 for the summing of the residual and predictor values for the inter-predicted depth block. For example, entropy decoding unit 150 may provide the DC residual value(s) to the reconstruction unit 158, and motion compensation (MC) unit 164 may provide the predictor values to the reconstruction unit.

Intra-prediction processing unit 166 may determine predictor values for the depth block based on the depth intra prediction mode indicated by the syntax information, e.g., according to any of the technique described herein. Intra-prediction processing unit 166 may utilize reconstructed depth blocks stored in decoded picture buffer 162 to determine the predictor values. Intra-prediction processing unit 166 may reconstruct the depth block by summing the DC residual value(s) and the predictor values, as described herein. In some examples, intra-prediction processing unit 166 may utilize reconstruction unit 158 for the summing of the residual and predictor values for the depth block. For example, entropy decoding unit 150 may provide the DC residual value(s) to the reconstruction unit, and intra prediction processing unit 166 may provide the predictor values to the reconstruction unit.

Video decoder 30 is an example of a video decoder comprising one or more processors configured to code a syntax element that indicates whether a simplified depth coding (SDC) mode is used for both intra-prediction and inter-prediction of a depth coding unit (CU) of the video data, when the depth CU is intra-predicted, perform intra-prediction to generate a predicted depth CU, when the depth CU is inter-predicted, perform inter-prediction to generate the predicted depth CU, and when the syntax element indicates that the SDC mode is used, generate at least one DC residual value for the depth CU, wherein the at least one DC residual value represents a pixel difference between the depth CU and the predicted depth CU. The one or more processors of video decoder 30 may be configured to decode the syntax element, and reconstruct the depth CU using the at least one DC residual value and the predicted depth CU.

In addition, video decoder 30 is an example of a video decoder comprising one or more processors configured to when a depth coding unit (CU) of the video data is intra-predicted, perform an intra-prediction mode to generate a predicted depth CU, when the depth CU is inter-predicted, perform an inter-prediction mode to generate the predicted depth CU, and when a simplified depth coding (SDC) mode is used, code a syntax structure comprising information representing at least one DC residual value for the depth CU, wherein the syntax elements of the syntax structure are the same for the intra-prediction mode and the inter-prediction mode. Video decoder 30 may be further configured to decode the syntax structure, and reconstruct the depth CU using the at least one DC residual value and the predicted depth CU.

In another example, video decoder 30 is an example of a video coder comprising one or more processors configured to code a syntax element that indicates whether a simplified depth coding (SDC) mode is used for both intra-prediction and inter-prediction of depth coding units (CU) of an entire sequence of coded video data, when one of the depth CUs of the sequence is intra-predicted, perform intra-prediction to generate a predicted depth CU, when one of the depth CUs of the sequence is inter-predicted, perform inter-prediction to generate the predicted depth CU, and when the syntax element indicates that the SDC mode is used, code information representing at least one DC residual value for each of the depth CUs of the sequence, wherein the at least one DC residual value represents a pixel difference between the respective depth CU and the respective predicted depth CU. Video decoder 30 may be configured to reconstruct the depth CUs using the at least one DC residual value for each of the depth CUs and the respective predicted depth CU.

Syntax and semantics for the existing draft of 3D-HEVC will now be described. Set forth below are the syntax elements that indicate intra/inter SDC modes in 3D-HEVC, where section and table references are made relative to 3D-HEVC.

H.7.3.2.1.2 Video Parameter Set Extension 2 Syntax

| vps_extension2( ) { | Descriptor |
|---|---|
| while( !byte_aligned( ) ) | |
|   vps_extension_byte_alignment_reserved_one_bit | u(1) |
| for( i = 0; i <= vps_max_layers_minus1; i++ ) { | |
|   layerId = layer_id_in_nuh[ i ] | |
|   if ( layerId != 0 ) { | |
|     iv_mv_pred_flag[ layerId ] | u(1) |
|     log2_sub_pb_size_minus2[ layerId ] | ue(v) |
|     if ( !VpsDepthFlag[ layerId ] ) { | |
|       iv_res_pred_flag[ layerId ] | u(1) |
|       depth_refinement_flag[ layerId ] | u(1) |
|       view_synthesis_pred_flag[ layerId ] | u(1) |
|     } else { | |
|       mpi_flag[ layerId ] | u(1) |
|       vps_depth_modes_flag[ layerId ] | u(1) |
|       lim_qt_pred_flag[ layerId ] | u(1) |
|       if( vps_depth_modes_flag[ layerId ] ) | |
|         dlt_flag[ layerId ] | u(1) |
|       if( dlt_flag[ layerId ] ) { | |
|         num_depth_values_in_dlt[ layerId ] | ue(v) |
|         for ( j = 0; j < | |
|         num_depth_values_in_dlt[ layerId ] ; j++) { | |
|           dlt_depth_value[ layerId ][ j ] | ue(v) |
|         } | |
|       } | |
|       vps_inter_sdc_flag[ layerId ] | u(1) |
|     } | |
|   } | |
| } | |
| cp_precision | ue(v) |
| ... | |

H.7.3.8.5 Coding Unit Syntax

| coding_unit( x0, y0, log2CbSize , ctDepth) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) { | |
|     prediction_unit( x0, y0, nCbS, nCbS ) | |
|     if ( iv_res_pred_flag[ nuh_layer_id ] && RpRefPicAvailFlag ) | |
|       iv_res_pred_weight_idx | ae(v) |
|     if ( icEnableFlag ) | |
|       ic_flag | ae(v) |
|   } | |
|   else { | |
|     if( slice_type != I ) | |
|       pred_mode_flag | ae(v) |
|     if( ( CuPredMode[ x0 ][ y0 ] != MODE_INTRA \|\| | |
|       log2CbSize == MinCbLog2SizeY ) && !predPartModeFlag ) | |
|       part_mode | ae(v) |
|     if( CuPredMode[ x0 ][ y0 ] == MODE_INTRA ) { | |
|       if( PartMode == PART_2Nx2N && pcm_enabled_flag && | |
|         log2CbSize >= Log2MinIpcmCbSizeY && | |
|         log2CbSize <= Log2MaxIpcmCbSizeY ) | |
|         pcm_flag[ x0 ][ y0 ] | |
|       if( pcm_flag[ x0 ][ y0 ] ) { | |
|         while( !byte_aligned( ) ) | |
|           pcm_alignment_zero_bit | f(1) |
|         pcm_sample( x0, y0, log2CbSize ) | |
|       } else { | |
|         pbOffset = ( PartMode == PART_NxN ) ? ( nCbS / 2 ) : nCbS | |
|         for( j = 0; j < nCbS; j = j + pbOffset ) | |
|           for( i = 0; i < nCbS; i = i + pbOffset ) { | |
|             if( vps_depth_modes_flag[ nuh_layer_id ] ) | |
|               depth_mode_parameters( x0 + i , y0+ j , log2CbSize ) | |
|             if( DepthIntraMode[ x0 + i ][ y0 + j ] == INTRA_DEP_NONE ) | |
|               prev_intra_luma_pred_flag[ x0 + i ][ y0 + j ] | ae(v) |
|         } | |
|         for( j = 0; j < nCbS; j = j + pbOffset ) | |
|           for( i = 0; i < nCbS; i = i + pbOffset ) | |

```
coding_unit( x0, y0, log2CbSize , ctDepth) {                                    Descriptor
            if( DepthIntraMode[ x0 + i ][ y0 + j ] == INTRA_DEP_NONE) {
              if( prev_intra_luma_pred_flag[ x0 + i ][ y0 + j ] )
                mpm_idx[ x0 + i ][ y0 + j ]                                      ae(v)
              else
                rem_intra_luma_pred_mode[ x0 + i ][ y0 + j ]                     ae(v)
            }
          intra_chroma_pred_mode[ x0 ][ y0 ]                                     ae(v)
        }
      } else {
        if( PartMode == PART_2Nx2N ) {
          prediction_unit( x0, y0, nCbS, nCbS )
          if ( iv_res_pred_flag[ nuh_layer_id ] && RpRefPicAvailFlag )
            iv_res_pred_weight_idx                                               ae(v)
        } else if( PartMode == PART_2NxN ) {
          prediction_unit( x0, y0, nCbS, nCbS / 2 )
          prediction_unit( x0, y0 + ( nCbS / 2 ), nCbS, nCbS / 2 )
        } else if( PartMode == PART_Nx2N ) {
          prediction_unit( x0, y0, nCbS / 2, nCbS )
          prediction_unit( x0 + ( nCbS / 2 ), y0, nCbS / 2, nCbS )
        } else if( PartMode == PART_2NxnU ) {
          prediction_unit( x0, y0, nCbS, nCbS / 4 )
          prediction_unit( x0, y0 + ( nCbS / 4 ), nCbS, nCbS * 3 / 4 )
        } else if( PartMode == PART_2NxnD ) {
          prediction_unit( x0, y0, nCbS, nCbS * 3 / 4 )
          prediction_unit( x0, y0 + ( nCbS * 3 / 4 ), nCbS, nCbS / 4 )
        } else if( PartMode == PART_nLx2N ) {
          prediction_unit( x0, y0, nCbS / 4, nCbS )
          prediction_unit( x0 + ( nCbS / 4 ), y0, nCbS * 3 / 4, nCbS )
        } else if( PartMode == PART_nRx2N ) {
          prediction_unit( x0, y0, nCbS * 3 / 4, nCbS )
          prediction_unit( x0 + ( nCbS * 3 / 4 ), y0, nCbS / 4, nCbS )
        } else { /* PART_NxN */
          prediction_unit( x0, y0, nCbS / 2, nCbS / 2 )
          prediction_unit( x0 + ( nCbS / 2 ), y0, nCbS / 2, nCbS / 2 )
          prediction_unit( x0, y0 + ( nCbS / 2 ), nCbS / 2, nCbS / 2 )
          prediction_unit( x0 + ( nCbS / 2 ), y0 + ( nCbS / 2 ), nCbS / 2, nCbS / 2 )
        }
      }
      if ( icEnableFlag )
        ic_flag                                                                  ae(v)
      if( vps_inter_sdc_flag && PredMode[ x0 ][ y0 ] != MODE_INTRA
          && !skip_flag[ x0 ][ y0 ] )
        inter_sdc_flag                                                           ae(v)
      if( inter_sdc_flag ) {
        puNum = ( PartMode == PART_2Nx2N ) ? 1 : ( PartMode == PART_NxN ? 4 : 2 )
        for( i = 0; i < puNum; i++ ) {
          inter_sdc_resi_abs_minus1[ x0 ][ y0 ][ i ]                             ae(v)
          inter_sdc_resi_sign_flag[ x0 ][ y0 ][ i ]                              ae(v)
        }
      }
      if( !pcm_flag[ x0 ][ y0 ] ) {
        if( CuPredMode[ x0 ][ y0 ] != MODE_INTRA &&
            !( PartMode == PART_2Nx2N && merge_flag[ x0 ][ y0 ] ) )
          rqt_root_cbf                                                           ae(v)
        if( rqt_root_cbf && !inter_sdc_flag ) {
          MaxTrafoDepth = ( CuPredMode[ x0 ][ y0 ] == MODE_INTRA ?
              ( max_transform_hierarchy_depth_intra + IntraSplitFlag )
              max_transform_hierarchy_depth_inter )
          transform_tree( x0, y0, x0, y0, log2CbSize, 0, 0 )
        }
      }
    }
  }
}
```

H.7.3.8.5.1 Depth Mode Parameter Syntax

```
depth_mode_parameters( x0 , y0 , log2CbSize ) {                                 Descriptor
  depth_intra_mode[ x0 ][ y0 ]                                                   ae(v)
  if ( DepthIntraMode[ x0 ][ y0 ] ==
      INTRA_DEP_DMM_WFULL ||
      DepthIntraMode[ x0 ][ y0 ] ==
```

-continued

```
depth_mode_parameters( x0 , y0 , log2CbSize ) {                                 Descriptor
      INTRA_DEP_SDC_DMM_WFULL )
    wedge_full_tab_idx[ x0 ][ y0 ]                                               ae(v)
  if( DmmFlag[ x0 ][ y0 ] || SdcFlag[ x0 ][ y0 ] ) {
    dcNumSeg = ( DepthIntraMode[ x0 ][ y0 ] ==
        INTRA_DEP_SDC_PLANAR ) ? 1 : 2
```

-continued

| depth_mode_parameters( x0 , y0 , log2CbSize ) { | Descriptor |
|---|---|
| depth_dc_flag[ x0 ][ y0 ] | ae(v) |
| if ( depth_dc_flag[ x0 ][ y0 ] ) | |
| for( i = 0; i < dcNumSeg; i ++ ) { | |
| depth_dc_abs[ x0 ][ y0 ][ i ] | ae(v) |
| if( depth_dc_abs[ x0 ][ y0 ][ i ]) | |
| depth_dc_sign_flag[ x0 ][ y0 ][ i ] | ae(v) |

The variable SdcFlag[x0][y0] is derived as specified in the following:

SdcFlag[x0][y0]=(DepthIntraMode[x0][y0]==IN-TRA_DEP_SDC_PLANAR)||(H-25) (DepthIntraMode[x0][y0]==INTRA_DEP_SDC_DMM_WFULL)

The variable DmmFlag[x0][y0] is derived as specified in the following:

DmmFlag[x0][y0]=(DepthIntraMode[x0][y0]==IN-TRA_DEP_DMM_WFULL)||(H-26) (DepthIntraMode[x0][y0]==INTRA_DEP_DMM_CPREDTEX)

TABLE H-2

Specification of DepthIntraMode and associated name depending on depthIntraModeSet and depth_intra_mode and specification of and depthIntraModeMaxLen depending on depthIntraModeSet

| | | depthIntraModeSet | 0 | 1 | 2 |
|---|---|---|---|---|---|
| | | depthIntraModeMaxLen | 1 | 3 | 3 |
| DepthIntraMode | Associated name | | | depth_intra_mode | |
| 0 | INTRA_DEP_SDC_PLANAR | | 0 | — | 0 |
| 1 | INTRA_DEP_NONE | | 1 | 0 | 1 |
| 2 | INTRA_DEP_SDC_DMM_WFULL | | — | — | 2 |
| 3 | INTRA_DEP_DMM_WFULL | | — | 1 | 3 |
| 4 | INTRA_DEP_DMM_CPREDTEX | | — | — | 4 |

-continued

| depth_mode_parameters( x0 , y0 , log2CbSize ) { | Descriptor |
|---|---|
| } | |
| } | |
| } | |

Semantics vps_inter_sdc_flag[layerId] equal to 1 specifies that inter SDC coding is used for the layer with nuh_layer_id equal to layerId. vps_inter_sdc_flag[layerId] equal to 0 specifies that inter SDC coding is not used for the layer with nuh_layer_id equal to layerId. When not present, the value of vps_inter_sdc_flag[layerId] is inferred to be equal to 0.

inter_sdc_flag equal to 1 specifies simplified depth coding of residual blocks is used for the current coding unit. inter_sdc_flag equal to 0 specifies simplified depth coding of residual blocks is not used for the current coding unit. When not present, inter_sdc_flag is inferred to be equal to 0.

inter_sdc_resi_abs_minus1[x0][y0][i], inter_sdc_resi_sign_flag[x0][y0][i] are used to derive InterSdcResi[x0][y0][i] as follows:

InterSdcResi[x0][y0][i]=(1−2*inter_sdc_resi_sign_flag[x0][y0][i])*(inter_sdc_resi_abs_minus1[x0][y0][i]+1) (H-19)

H.7.4.9.5.1 Depth Mode Parameter Semantics

The variable Log 2MaxDmmCbSize is set equal to 5.

The variable depthIntraModeSet is derived as specified in the following:

If log 2CbSize is equal to 6, depthIntraModeSet is set equal to 0.

Otherwise, if log 2CbSize is equal to 3 and PartMode [xC][yC] is equal to PART_N×N, depthIntraModeSet is set equal to 1.

Otherwise, depthIntraModeSet is set equal to 2.

depth_intra_mode[x0][y0] specifies the depth intra mode of the current prediction unit. Table H-2 specifies the value of the variable depthIntraModeMaxLen depending on depthIntraModeSet and the value of the variable DepthIntraMode and the associated name depending on the on depth_intra_mode and depthIntraModeSet.

wedge_full_tab_idx[x0][y0] specifies the index of the wedgelet pattern in the corresponding pattern list when DepthIntraMode[x0][y0] is equal to INTRA_DEP_DMM_WFULL.

depth_dc_flag[x0][y0] equal to 1 specifies that depth_dc_abs[x0][y0][i] and depth_dc_sign_flag[x0][y0][i] are present. depth_dc_flag[x0][y0] equal to 0 specifies that depth_dc_abs[x0][y0][i] and depth_dc_sign_flag[x0][y0][i] are not present.

depth_dc_abs[x0][y0][i], depth_dc_sign_flag[x0][y0][i] are used to derive DcOffset[x0][y0][i] as follows:

DcOffset[x0][y0][i]=(1−2*depth_dc_sign_flag[x0][y0][i])*(depth_dc_abs[x0][y0][i]−dcNumSeg+2) (H-27)

Some recent progress related to SDC will now be discussed. In JCT3V-F0126, Liu et al., "CE5 related: Generic SDC for all Intra modes in 3D-HEVC," Joint Collaborative Team on 3D Video Coding Extensions of ITU-T SG 16 WP 3 and ISO/IEC JTC 1/SC 29/WG 11, 6th Meeting: Geneva, CH, 25 Oct.-1 Nov. 2013, it was proposed that, in depth coding, simplified residual coding can be applied for the additional depth Intra prediction modes and the original HEVC Intra prediction modes. In simplified residual coding, one DC residual value is signaled for each partition of the PU, i.e., a PU coded with HEVC intra prediction modes has one partition, such that all pixels within the PU are in the same partition, and a PU coded with additional depth intra prediction modes has two partitions, both transform and quantization are skipped, and no additional residual is produced, i.e., the transform tree is not present in the 3D codec based on HEVC.

As discussed above, current designs for SDC present the issue that different syntax elements and context models are used to indicate the usage of intra or inter modes in 3D-HEVC which makes the parsing process of coding units more complex.

The signaling of Segment-wise DC coding (SDC) of depth intra and inter prediction modes in 3D-HEVC can be unified in accordance with techniques described in this disclosure. Various aspects, discussed above, are also summarized here as follows:

1. It is proposed in this disclosure that in some examples of depth coding, only one syntax element (e.g., sdc_flag) is used to indicate the usage of SDC for either intra or inter modes.

a. The inter_sdc_flag that indicates the current inter CU utilizes SDC is removed.
b. The indication of SDC mode for Intra mode is also removed.
c. Regardless whether the current coding unit is coded with Intra or Inter prediction, a new flag, namely sdc_flag is introduced. When this flag is 1, SDC is enabled.

2. It is proposed in this disclosure that in some examples of depth coding, when the current CU is coded as SDC, for each partition, the DC residual value for Inter coded CU or Intra coded CU is unified to be present by one syntax structure, which includes the absolute value of the DC residual value and its sign.
   a. Alternatively, or in addition, if the CU is coded with Intra, a flag (equal to 1) indicating whether the current CU contains any non-zero DC residual value in any of its partition may be further signaled. If this flag is 0, DC residual values are not signaled and inferred to be equal to zero for each partition.
   b. Alternatively, the above flag applies to both Intra and Inter modes.
   c. Alternatively, the above flag is not used for either Intra or Inter mode.

3. Furthermore, it is proposed in this disclosure that, in some examples, the syntax structures used for DC residual values of Inter and Intra modes share the same syntax elements therefore the context model and binarization processes for the relevant syntax elements are unified, i.e., the same context model.
   a. Alternatively, in some examples, even though Intra SDC modes and Inter SDC modes can use the same syntax structure for DC residual values, they use different instances of the syntax structure thus the context for elements related to DC residual values are maintained separated for Intra SDC and Inter SDC modes.

4. It is proposed in this disclosure that, in some examples, a constraint at the decoder side may be applied, that is, pcm_flag shall not be equal to 1 when the sdc_flag is equal to 1.

5. In addition, it is proposed in this disclosure that, in some examples, a constraint on SDC at the decoder side may be applied, that is, both intra SDC mode and inter SDC mode are used only for partition size 2N×2N.
   a. Alternatively, intra SDC mode is used for all partition sizes including 2N×2N and N×N.

6. In addition, it is proposed in this disclosure that, in some examples, one syntax element is used to enable/disable both intra and inter SDC modes in the decoding process, for the whole coded video sequence. If the one syntax element indicates that SDC is enabled for a sequence, then the encoder signals another syntax element to indicate whether SDC is used at the CU level, e.g., as described with reference to the use of a unified sdc_flag element in item 1 above.
   a. This syntax element can be set, in some examples, in a video parameter set extension, sequence parameter set, picture parameter set or slice segment header etc.
   b. Alternatively, in some examples, one flag is used to indicate whether the SDC for Intra mode is enabled for the whole coded video sequence, if this is true, in addition, another flag is used to indicate whether the SDC for Inter mode is enabled for the whole coded video sequence.

A variety of implementation examples are described below. In accordance with the examples below, changes are made to syntax elements and semantics of 3D-HEVC. In the syntax elements and semantics below, pertinent portions of 3D-HEVC have been changed to add syntax elements and semantics proposed in the JCT3V-F0126 document. Changes proposed in the JCT3V-F0126 document are shown with additions indicated by italics and deletions shown with italics and between italicized tags <deleted> and </deleted>. Additional changes to syntax elements and semantics, in accordance with this example of this disclosure, are shown with newly added parts presented in bold and newly deleted parts marked with bold text and between bold tags <deleted> and </deleted>.

Example syntax tables are presented below, followed by pertinent semantics, where section and table references refer to corresponding section and table references in 3D-HEVC.

The examples below illustrate the use of the sdc_flag[x0][y0] syntax element to specify use of SDC at the CU level, the use of an SdcEnableFlag syntax element to indicate whether SDC is enabled, and depth_dc_abs[x0][y0][i] and depth_dc_sign_flag[x0][y0][i] syntax elements to indicate DC residual value and sign, respectively. The syntax elements are examples of syntax elements described in this disclosure for signaling SDC use, SDC enable/disable status, and SDC residual values, respectively. In some examples, of the SdcEnableFlag syntax element may be derived at least in part from one or more values set forth in a VPS, such as vps_inter_sdc_flag[nuh_layer_id], and vps_depth_modes_flag[nuh_layer_id], and can be configured to enable or disable SDC for an entire coded video sequence.

H.7.3.8.5 Coding Unit Syntax

```
coding_unit( x0, y0, log2CbSize , ctDepth) {
  if( transquant_bypass_enable_flag ) {
    cu_transquant_bypass_flag                                              ae(v)
  ...
  else {
    if( slice_type != I )
      pred_mode_flag                                                       ae(v)
    if( ( CuPredMode[ x0 ][ y0 ] != MODE_INTRA ||
      log2CbSize == MinCbLog2SizeY ) && !predPartModeFlag )
      part_mode                                                            ae(v)
    if( SdcEnableFlag )
      sdc_flag[ x0 ][ y0 ]                                                 ae(v)
  ...
  } else {
    pbOffset = ( PartMode == PART_N×N ) ? ( nCbS / 2 ) : nCbS
    for( j = 0; j < nCbS; j = j + pbOffset )
      for( i = 0; i < nCbS; i = i + pbOffset ) {
        if( vps_depth_modes_flag[ nuh_layer_id ] ) {
          if ( log2CbSize < 6 )
```

-continued

```
                    hevc_intra_flag[ x0 + i ][ y0 + j ]                                          ae(v)
                    if ( !hevc_intra_flag[ x0 + i ][ y0 + j ] )
                       depth_intra_mode[ x0 + i ][ y0 + j ]                                      ae(v)
                       if ( DepthIntraMode[ x0 + i ][ y0 + j ] == INTRA_DEP_DMM_WFULL )
                          wedge_full_tab_idx[ x0 + i ][ y0 + j ]                                 ae(v)
                    }
<deleted>           depth_mode_parameters( x0 + i , y0+ j , log2CbSize )
                    if( DepthIntraMode[ x0 + i ][ y0 + j ] == INTRA_DEP_NONE ) </deleted>
                    if( hevc_intra_flag[ x0 ][ y0 ])
                       prev_intra_luma_pred_flag[ x0 + i ][ y0 + j ]                             ae(v)
                 }
              for( j = 0; j < nCbS; j = j + pbOffset )
                 for( i = 0; i < nCbS; i = i + pbOffset )
<deleted>if( DepthIntraMode[ x0 + i ][ y0 + j ] == INTRA_DEP_NONE) {
</deleted>
                    if( hevc_intra_flag[ x0 ][ y0 ] ) {
                       if( prev_intra_luma_pred_flag[ x0 + i ][ y0 + j ] )
                          mpm_idx[ x0 + i ][ y0 + j ]                                            ae(v)
                       else
                          rem_intra_luma_pred_mode[ x0 + i ][ y0 + j ]                           ae(v)
                    }
                 intra_chroma_pred_mode[ x0 ][ y0 ]                                              ae(v)
  ...
  <deleted>      if( vps_inter_sdc_flag && PredMode[ x0 ][ y0 ] != MODE_INTRA
                 && !skip_flag[ x0 ][ y0 ] )
              inter_sdc_flag                                                                     ae(v)
           if( inter_sdc_flag ) {
              puNum = ( PartMode == PART_2N×2N ) ? 1 : ( PartMode == PART_N×N ? 4 :
  2 )
              for( i = 0; i < puNum; i++ ) {
                 inter_sdc_resi_abs_minus1[ x0 ][ y0 ][ i ]                                      ae(v)
                 inter_sdc_resi_sign_flag[ x0 ][ y0 ][ i ]                                       ae(v)
              }
           }                                                                                     </deleted>
           if( sdc_flag[ x0 ][ y0 ] || PredMode[ x0 ][ y0 ] == MODE_INTRA )
              depth_dc_residual( x0 , y0 , log2CbSize )
           if( !pcm_flag[ x0 ][ y0 ] && !sdc_flag[ x0 ][ y0 ] ) {
              if( PredMode[ x0 ][ y0 ] != MODE_INTRA &&
                 !(PartMode == PART_2N×2N && merge_flag[x0][y0]))
                 rqt_root_cbf                                                                    ae(v)
              if( rqt_root_cbf <deleted> && !inter_sdc_flag </deleted> ) {
                 MaxTrafoDepth = ( PredMode[ x0 ][ y0 ] == MODE_INTRA ?
                                 max_transform_hierarchy_depth_intra + IntraSplitFlag :
                                 max_transform_hierarchy_depth_inter )
                 transform_tree( x0, y0 x0, y0, log2CbSize, 0, 0 )
              }
           }
        }
     }
  }
<deleted>
```

H.7.3.8.5.1 Depth Mode Parameter Syntax

| depth_mode_parameters( x0 , y0 , log2CbSize ) { | Descriptor |
|---|---|
| depth_intra_mode[ x0 ][ y0 ] | ae(v) |
| if ( DepthIntraMode[ x0 ][ y0 ] == INTRA_DEP_DMM_WFULL || | |
|    DepthIntraMode[ x0 ][ y0 ] == INTRA_DEP_SDC_DMM_WFULL ) | |
|   wedge_full_tab_idx[ x0 ][ y0 ] | ae(v) |
| if( DmmFlag[ x0 ][ y0 ] || SdcFlag[ x0 ][ y0 ] ) { | |
|   dcNumSeg = ( DepthIntraMode[ x0 ][ y0 ] == INTRA_DEP_SDC_PLANAR ) ? 1 : 2 | |
|   depth_dc_flag[ x0 ][ y0 ] | ae(v) |
|   if ( depth_dc_flag[ x0 ][ y0 ] ) | |
|     for( i = 0; i < dcNumSeg; i ++ ) { | |
|       depth_dc_abs[ x0 ][ y0 ][ i ] | ae(v) |
|       if ( depth_dc_abs[ x0 ][ y0 ][ i ]) | |
|         depth_dc_sign_flag[ x0 ][ y0 ][ i ] | ae(v) |
|     } | |
|   } | |
| } | |
| </deleted> | |

H.7.3.8.5.1 Depth DC Residual Value Syntax Table

| depth_dc_residual( x0 , y0 , log2CbSize ) { | Descriptor |
|---|---|
|   pbOffset = ( PartMode[ x0 ][ y0 ] == PART_NxN && PredMode[ x0 ][ y0 ] == MODE_INTRA ) ? ( nCbS / 2 ) : nCbS | |
|   for( j = 0; j < nCbS; j = j + pbOffset ) | |
|     for( i = 0; i < nCbS; i = i + pbOffset ) { | |
|       if( sdc_flag[ x0 ][ y0 ] \|\| DmmFlag[ x0 + i ][ y0 + j ] ) ) { | |
|         dcNumSeg = PredMode[ x0 ][ y0 ] == MODE_INTRA ? | |
|           ( DmmFlag[ x0 + i ][ y0 + j ] ? 2 : 1 ) : | |
|           ( ( PartMode[ x0 ][ y0 ] == PART_2Nx2N ) ? 1 : | |
|           ( PartMode[ x0 ][ y0 ] == PART_NxN ? 4 : 2 ) ) | |
|       if ( PredMode[ x0 ][ y0 ] == MODE_INTRA ) | |
|         depth_dc_flag[ x0 + i ][ y0 + j ] | ae(v) |
|       if( depth_dc_flag[ x0 + i ][ y0 + j ] ) { | |
|         for( k = 0; k < dcNumSeg; k ++ ) { | |
|           depth_dc_abs[ x0 + i ][ y0 + j ][ k ] | ae(v) |
|           if ( depth_dc_abs[ x0 + i ][ y0 + j ][ k ] ) | |
|             depth_dc_sign_flag[ x0 + i ][ y0 + j ][ k ] | ae(v) |
|         } | |
|       } | |
|     } | |
|   } | |
| } | |

Alternatively, when both intra and inter SDC are only applied to CUs with partition size equal to 2N×2N, the following syntax may be used.

H.7.3.8.5.1 Depth DC Residual Value Syntax Table

| depth_dc_residual( x0 , y0 , log2CbSize ) { | Descriptor |
|---|---|
|   dcNumSeg = PredMode[ x0 ][ y0 ] == DmmFlag[ x0 ][ y0 ] ? 2 : 1 | |
|   if ( PredMode[ x0 ][ y0 ] == MODE_INTRA ) | |
|     depth_dc_flag[ x0 + i ][ y0 + j ] | ae(v) |
|   if ( depth_dc_flag[ x0 + i ][ y0 + j ] ) { | |
|     for( k = 0; k < dcNumSeg; k ++ ) { | |
|       depth_dc_abs[ x0 + i ][ y0 + j ][ k ] | ae(v) |
|       if ( depth_dc_abs[ x0 + i ][ y0 + j ][ k ] ) | |
|         depth_dc_sign_flag[ x0 + i ][ y0 + j ][ k ] | ae(v) |
|     } | |
|   } | |
| } | |

Example semantics and the decoding process will now be described with reference to 3D-HEVC. Again, changes proposed in the JCT3V-F0126 document are shown with additions indicated by italics and deletions shown with italics and between italicized tags <deleted> and </deleted>. Additional changes to syntax elements and semantics, in accordance with this example of this disclosure, are shown with newly added parts presented in bold and newly deleted parts marked with bold text and between bold tags <deleted> and </deleted>.

H.7.4.9.5 Coding Unit Semantics

The variable SdcEnableFlag is derived as follows:

SdcEnableFlag =
( vps_inter_sdc_flag[ nuh_layer_id ] && PredMode[ x0 ][ y0 ] == MODE_INTER ) \|\|
( vps_depth_modes_flag[ nuh_layer_id ]
&& PredMode[ x0 ][ y0 ] == MODE_INTRA
&& PartMode[ x0 ][ y0 ] == PART_2Nx2N ) (H-16)
sdc_flag[ x0 ][ y0 ] equal to 1 specifies segment-wise DC coding of residual blocks is used for the current coding unit. sdc_flag[ x0 ][ y0 ] equal to 0 specifies segment-wise DC coding of residual blocks is not used for the current coding unit. When not present, sdc_flag[ x0 ][ y0 ] is inferred to be equal to 0.

*hevc_intra_flag[ x0 ][ y0 ] equal to 1 specifies that intra modes with intraPredMode in the range of 0 to 34 is used for the current prediction unit. hevc_intra_flag[ x0 ][ y0 ] equal to 0 specifies that another intra mode is used for the current prediction unit. When not present, hevc_intra_flag[ x0 ][ y0 ] is inferred to be equal to 1.*

*The variable DmmFlag[ x0 ][ y0 ] is derived as specified in the following:*
    *DmmFlag[ x0 ][ y0 ] = !hevc_intra_flag[ x0 ][ y0 ]    (H-25)* depth_intra_mode[ x0 ][ y0 ] specifies the depth intra mode of the current prediction unit.
*depth_intra_mode[ x0 ][ y0 ] equal to 0 specifies that DepthIntraMode[ x0 ][ y0 ] is equal to INTRA_DEP_DMM_WFULL, and depth_intra_mode[ x0 ][ y0 ] equal to 1 specifies that DepthIntraMode[ x0 ][ y0 ] is equal to INTRA_DEP_DMM_CPREDTEX. When not present, DepthIntraMode[ x0 ][ y0 ] is inferred to be equal to INTRA_DEP_NONE.* <deleted> *Table H-2 specifies the value of the variable depthIntraModeMaxLen depending on depthIntraModeSet and the value of the variable DepthIntraMode and the associated name depending on the on depth_intra_mode and depthIntraModeSet.* </deleted>

<deleted> The variable SdcFlag[ x0 ][ y0 ] is derived as specified in the following:
    SdcFlag[ x0 ][ y0 ] =( DepthIntraMode[ x0 ][ y0 ] == INTRA_DEP_SDC_PLANAR ) \|\| (H-25)
        ( DepthIntraMode[ x0 ][ y0 ] == INTRA_DEP_SDC_DMM_WFULL )
</deleted>

-continued

<deleted> The variable DmmFlag[ x0 ][ y0 ] is derived as specified in the following:
DmmFlag[ x0 ][ y0 ] = ( DepthIntraMode[ x0 ][ y0 ] == INTRA_DEP_DMM_WFULL ) || (H-26)
       ( DepthIntraMode[ x0 ][ y0 ] == INTRA_DEP_DMM_CPREDTEX )
</deleted>
<deleted> inter_sdc_flag equal to 1 specifies simplified depth coding of residual blocks is used for the
current coding unit. inter_sdc_flag equal to 0 specifies simplified depth coding of residual blocks is
not used for the current coding unit. When not present, inter_sdc_flag is inferred to be equal to 0.
inter_sdc_resi_abs_minus1[ x0 ][ y0 ][ i ], inter_sdc_resi_sign_flag[ x0 ][ y0 ][ i ] are used to derive
InterSdcResi[ x0 ][ y0 ][ i ] as follows:
       InterSdcResi[ x0 ][ y0 ][ i ] = ( 1 − 2 * inter_sdc_resi_sign_flag[ x0 ][ y0 ][ i ] ) *
       ( inter_sdc_resi_abs_minus1[ x0 ][ y0 ][ i ] + 1 )(H-11) </deleted>
wedge_full_tab_idx[ x0 ][ y0 ] specifies the index of the wedgelet pattern in the corresponding pattern list
when DepthIntraMode[ x0 ][ y0 ] is equal to INTRA_DEP_DMM_WFULL.

H.7.4.9.5.1 Depth DC Residual Semantics depth_dc_flag[x0][y0] equal to 1 specifies that depth_dc_abs[x0][y0][i] and depth_dc_sign_flag[x0][y0][i] are present. depth_dc_flag[x0][y0] equal to 0 specifies that depth_dc_abs[x0][y0][i] and depth_dc_sign_flag[x0][y0][i] are not present. When not present, depth_dc_flag[x0][y0] is inferred to be equal to 1.

depth_dc_abs[x0][y0][i], depth_dc_sign_flag[x0][y0][i] are used to derive DcOffset[x0][y0][i] as follows:
    DcOffset[x0][y0][i]=(1−2*depth_dc_sign_flag[x0][y0][i])*(depth_dc_abs[x0][y0][i]−dcNumSeg+2) (H-27)

H.8.4.2 Derivation Process for Luma Intra Prediction Mode

Input to this process is a luma location (xPb, yPb) specifying the top-left sample of the current luma prediction block relative to the top left luma sample of the current picture. In this process, the luma intra prediction mode IntraPredModeY[xPb][yPb] is derived.

Table H-3 specifies the value for the intra prediction mode and the associated names.

TABLE H-3

Specification of intra prediction mode and associated names

| Intra prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |
| 35 | INTRA_DMM_WFULL |
| 36 | INTRA_DMM_CPREDTEX |

IntraPredModeY[xPb][yPb] labelled 0 . . . 34 represents directions of predictions as illustrated in Table H-3.
<deleted>
    If DepthIntraMode[xPb][yPb] is equal to INTRA_DEP_SDC_PLANAR, IntraPredModeY[xPb][yPb] is set equal to INTRA_PLANAR.
    Otherwise, if DepthIntraMode[xPb][yPb] is equal to INTRA_DEP_SDC_DMM_WFULL, IntraPredModeY[xPb][yPb] is set equal to INTRA_DMM_WFULL.
    Otherwise, i</deleted> If DepthIntraMode[xPb][yPb] is equal to INTRA_DEP_DMM_WFULL, IntraPredModeY[xPb][yPb] is set equal to INTRA_DMM_WFULL.
    Otherwise if DepthIntraMode[xPb][yPb] is equal to INTRA_DEP_DMM_CPREDTEX, IntraPredModeY[xPb][yPb] is set equal to INTRA_DMM_CPREDTEX.
    Otherwise (DepthIntraMode[xPb][yPb] is equal to INTRA_DEP_NONE), IntraPredModeY[xPb][yPb] is derived as the following ordered steps:

H.8.4.4.2.1 General Intra Sample Prediction

Inputs to this process are:
    a sample location (xTbCmp, yTbCmp) specifying the top-left sample of the current transform block relative to the top left sample of the current picture,
    a variable predModeIntra specifying the intra prediction mode,
    a variable nTbS specifying the transform block size,
    a variable cIdx specifying the colour component of the current block.

Output of this process is the predicted samples predSamples[x][y], with x, y=0 . . . nTbS−1.

Set variable bSamplePredFlag to 1.
    Otherwise, if predModeIntra is equal to INTRA_DMM_CPREDTEX, the corresponding intra prediction mode specified in subclause H.8.4.4.2.8 is invoked with the location (xTbY, yTbY), with the sample array p and the transform block size nTbS and bSamplePredFlag as the inputs and the output are the predicted sample array predSamples.

H.8.4.4.2.8 Specification of Intra Prediction Mode INTRA_DMM_CPREDTEX

Inputs to this process are:
    a sample location (xTb, yTb) specifying the top-left sample of the current block relative to the top-left sample of the current picture,
    the neighbouring samples p[x][y], with x=−1, y=−1 . . . nTbS*2−1 and x=0 . . . nTbS*2−1, y=−1,
    a variable nTbS specifying the transform block size,
    a variable bSamplePredFlag specifying whether to generate the prediction samples or not, Output of this process is:
    the predicted samples predSamples[x][y], with x, y=0 . . . nTbS−1.
    wedgelet pattern wedgePattern[x][y], with x, y=0 . . . nT−1.

The values of the prediction samples predSamples[x][y], with x, y=0 . . . nTbS−1, are derived as specified by the following ordered steps:
    1. The variable recTextPic is set equal to the array of the reconstructed luma picture samples of TexturePic.
    2. The variable textThresh specifying a threshold for the segmentation of recTextPic is derived as specified in the following.
        The variable sumTextPicVals is set equal to 0.
        For x=0 . . . nTbS−1 the following applies
            For y=0 . . . nTbS−1 the following applies
                sumTextPicVals+=recTextPic[xTb+x][yTb+y] (H-45)
        The variable textThresh is set equal to (sumTextPicVals>>(2*log 2(nTbS)))

3. The variable wedgeletPattern[x][y] with x, y=0 . . . nTbS−1 specifying a binary partition pattern is derived as specified in the following.
 For x=0 . . . nTbS−1 the following applies
  For y=0 . . . nTbS−1 the following applies
   wedgeletPattern[x][y]=(recTextPic[xTb+x][yTb+y]>textThresh) (H-46)
4. When bSamplePredFlag is equal to 1, The depth partition value derivation and assignment process as specified in subclause H.8.4.4.2.9 is invoked with the neighbouring samples p[x][y], the binary pattern wedgeletPattern[x][y], the transform size nT, the dcOffsetAvailFlag set equal to depth_dc_flag[xTb][yTb], and the DC Offsets DcOffset[xTb][yTb][0], and DcOffset[xTb][yTb][1] as inputs and the output is assigned to predSamples[x][y].

H.8.4.4.3 Depth Value Reconstruction Process
Inputs to this process are:
 a luma location (xTb, yTb) specifying the top-left luma sample of the current block relative to the top-left luma sample of the current picture,
 a variable nTbS specifying the transform block size,
 predicted samples predSamples[x][y], with x, y=0 . . . nTbS−1
 the intra prediction mode predModeIntra,
Output of this process is:
 reconstructed depth value samples resSamples[x][y], with x, y=0 . . . nTbS−1.
Set variable bSamplePredFlag to 0.
Depending on predModeIntra the array wedgePattern[x][y] with x, y=0 . . . nTbS−1 specifying the binary segmentation pattern is derived as follows.
 If predModeIntra is equal to INTRA_DMM_WFULL, the following applies.
  wedgePattern=WedgePatternTable[Log 2(nTbS)][wedge_full_tab_idx[xTb][yTb]]
 Otherwise, if predModeIntra is equal to INTRA_DMM_CPREDTEX, subclause H.8.4.4.2.8 is invoked with the location (xB, yB), predicted samples predSamples, the transform block size nT and bSamplePredFlag as the inputs and the output is the wedgelet pattern wedgePattern.
 Otherwise (predModeIntra is not equal to INTRA_DMM_WFULL and predModeIntra is not equal to INTRA_DMM_CPREDTEX), the following applies.
  For x, y=0 . . . nTbS−1 wedgePattern[x][y] is set equal to 0.
Depending on dlt_flag[nuh_layer_id] the reconstructed depth value samples resSamples[x][y] are derived as specified in the following:
 If dlt_flag[nuh_layer_id] is equal to 0, the following applies:
  For x, y=0 . . . nTbS−1, the reconstructed depth value samples resSamples[x] [y] are derived as specified in the following:
resSamples[x][y]=predSamples[x][y]+DcOffset[xTb][yTb][wedgePattern[x][y]] (H-59)
 Otherwise (dlt_flag[nuh_layer_id] is equal to 1), the following applies:
  The variables dcPred[0] and dcPred[1] are derived as specified in the following:
<deleted> If predModeIntra is equal to INTRA DC, the following applies:
 dcPred[0]=predSamples[nTbS−1][nTbS−1] (H-60)
 Otherwise, if predModeIntra is equal to INTRA_PLANAR </deleted> If predModeIntra is not equal to INTRA_DMM_WFULL and predModeIntra is not equal to INTRA_DMM_CPREDTEX, the following applies:
 dcPred[0]=(predSamples[0][0]+predSamples[0][nTbS−1]+predSamples[nTbS−1][0]+predSamples[nTbS−1][nTbS−1]+2)>>2 (H-61)
Otherwise, <deleted> (predModeIntra is equal to INTRA_DMM_WFULL) </deleted> if predModeIntra is equal to INTRA_DMM_WFULL, the following applies.
 dcPred[wedgePattern[0][0]]=predSamples[0][0] (H-62)
 dcPred[wedgePattern[nTbS−1][0]]=predSamples[nTbS−1][0] (H-63)
 dcPred[wedgePattern[0][nTbS−1]]=predSamples[0][nTbS−1] (H-64)
 dcPred[wedgePattern[nTbS−1][nTbS−1]]=predSamples[nTbS−1][nTbS−1] (H-65)
Otherwise, (intraPredMode is equal to INTRA_DMM_CPREDTEX), the following applies.

```
dcPred[ wedgePattern[0][0] ] = predSamples[ 0 ][ 0 ]
dcPred1Found = 0;
for ( x = 0; x < nT − 1; x++ )
    for ( y = 0; y < nT − 1; y++ )
        if ( wedgePattern[ x ][ y ] != wedgePattern[ 0 ][ 0 ] && dcPred1Found == 0 ) {
            dcPred[ wedgePattern[ x ][ y ] ] = predSamples[ x ][ y ]
            dcPred1Found = {
        }
```

For x, y=0 . . . nTbS−1, the reconstructed depth value samples resSamples[x][y] are derived as specified in the following:
 dltIdxPred=DepthValue2Idx[dcPred[wedgePattern[x][y]]] (H-66)
 dltIdxResi=DcOffset[xTb][yTb][wedgePattern[x][y]] (H-67)
 resSamples[x][y]=predSamples[x][y]+Idx2DepthValue[dltIdxPred+dltIdxResi]−dcPred[wedgePattern[x][y]] (H-68)

H.8.5.4.1 General
If <deleted> inter_sdc_flag </deleted> sdc_flag is equal to 0, the following applies, depending on the value of rqt_root_cbf, the following applies:
 If rqt_root_cbf is equal to 0 or skip_flag[xCb][yCb] is equal to 1, all samples of the $(nCbS_L) \times (nCbS_L)$ array $resSamples_L$ and all samples of the two $(nCbS_C) \times (nCbS_C)$ arrays $resSamples_{Cb}$ and $resSamples_{Cr}$ are set equal to 0.
 Otherwise (rqt_root_cbf is equal to 1), the following ordered steps apply:
 The decoding process for luma residual blocks as specified in subclause H.8.5.4.2 below is invoked with the luma location (xCb, yCb), the luma location (xB0, yB0) set equal to (0, 0), the variable log 2TrafoSize set equal to log 2CbSize, the variable trafoDepth set equal to 0, the variable nCbS set equal to $nCbS_L$, and the $(nCbS_L) \times (nCbS_L)$ array $resSamples_L$ as inputs, and the output is a modified version of the $(nCbS_L) \times (nCbS_L)$ array $resSamples_L$.
 The decoding process for chroma residual blocks as specified in subclause H.8.5.4.3 below is invoked with the luma location (xCb, yCb), the luma location (xB0, yB0) set equal to (0, 0), the variable log 2TrafoSize set equal to log 2CbSize, the variable trafoDepth set equal to 0, the variable cIdx set equal to 1, the variable nCbS set equal to nCbS$_C$, and the (nCbS$_C$)×(nCbS$_C$) array resSamples$_{Cb}$ as inputs, and the output is a modified version of the (nCbS$_C$)×(nCbS$_C$) array resSamples$_{Cb}$.

The decoding process for chroma residual blocks as specified in subclause H.8.5.4.3 below is invoked with the luma location (xCb, yCb), the luma location (xB0, yB0) set equal to (0, 0), the variable log 2TrafoSize set equal to log 2CbSize, the variable trafoDepth set equal to 0, the variable cIdx set equal to 2, the variable nCbS set equal to nCbS$_C$, and the (nCbS$_C$)×(nCbS$_C$) array resSamples$_{Cr}$ as inputs, and the output is a modified version of the (nCbS$_C$)×(nCbS$_C$) array resSamples$_{Cr}$.

Otherwise (<deleted> inter_sdc_flag <deleted> sdc_flag is equal to 1), the decoding process for simplified depth coded residual blocks as specified in subclause H.8.5.4.4 is invoked with the luma location (xCb, yCb), the luma location (xB0, yB0) set equal to (0, 0), the variable log 2TrafoSize set equal to log 2CbSize, the variable trafoDepth set equal to 0, the variable nCbS set equal to nCbS$_L$, and the (nCbS$_L$)×(nCbS$_L$) array resSamples$_L$ as inputs, and the output is a modified version of the (nCbS$_L$)×(nCbS$_L$) array resSamples$_L$.

H.8.5.4.4 Decoding Process for Simplified Depth Coded Residual Blocks

For x in the range of 0 to nCbS the following applies:
  For y in the range of 0 to nCbS the following applies:
    The variable i is derived as specified in the following:
      If x is less than xOff and y is less than yOff, i is set equal to 0.
      Otherwise, if x greater than or equal to xOff and y is less than to yOff, i is set equal to 1.
      Otherwise, if x less than xOff and y is greater than or equal to yOff, i is set equal to 2.
      Otherwise, (x is greater than or equal to xOff and y is greater than or equal to yOff), i is set equal to 3.
    The value of resSamples[x][y] is set equal to DcOffset <deleted> InterSdcResi </deleted>[xCb][yCb][interSdcResiIdx[i]]

TABLE H-10

Association of ctxIdx and syntax elements for each initializationType in the initialization process

| Syntax structure | Syntax element | ctxTable | initType 0 | initType 1 | initType 2 |
|---|---|---|---|---|---|
| coding_unit( ) | depth_intra_mode | Table H-15 | 0 . . . 7 | 8 . . . 15 | 16 . . . 23 |
| depth mode_parameters( ) | wedge_full_tab_idx | Table H-11 | 0 | 1 | 2 |
| | depth_dc_flag | Table H-16 | 0 | 1 | 2 |
| | depth_dc_abs | Table H-12 | 0 | 1 | 2 |
| | iv_res_pred_weight_idx | Table H-13 | | 0 . . . 3 | 4 . . . 7 |
| | ic_flag | Table H-14 | | 0 . . . 2 | 3 . . . 5 |
| | <deleted> inter_sdc_flag | Table H-17 | 0 | 1 | 1 |
| | inter_sdc_resi_abs_minus1 | Table H-18 | 0 | 1 | 1 |
| | inter_sdc_resi_sign_flag | Table H-19 | 0 | 1 | 1 |

TABLE H-17

Values of initValue for inter_sdc_flag ctxIdx

| Initialization variable | ctxIdx of inter_sdc_flag | | |
|---|---|---|---|
| | 0 | 1 | 2 |
| initValue | 154 | 154 | 154 |

TABLE H-18

Values of initValue for inter_sdc_resi_abs_minus1

| Initialization variable | ctxIdx of inter_sdc_resi_abs_minus1 | | |
|---|---|---|---|
| | 0 | 1 | 2 |
| initValue | 154 | 154 | 154 |

TABLE H-19

Values of initValue for inter_sdc_resi_sign_flag ctxIdx

| Initialization | ctxIdx of inter_sdc_resi_sign_flag | | |
|---|---|---|---|
| variable | 0 | 1 | 2 |
| initValue | 154 | 154 | 154 |

TABLE H-20

Syntax elements and associated binarizations

| Syntax structure | Syntax element | Binarization Process | Input parameters |
|---|---|---|---|
| coding_unit( ) | iv_res_pred_weight_idx | TR | cMax = 2, cRiceParam = 0 |
| | ic_flag | FL | cMax = 1 |
| | <deleted> inter_sdc_flag | FL | cMax = 1/deleted> |
| | <deleted> inter_sdc_resi_abs_minus1 | UEG0 | [Ed. (GT) To be specified] |
| | inter_sdc_resi_sign_flag | FL | cMax = 1 </deleted> |

TABLE H-22

Assignment of ctxInc to syntax elements with context coded bins

| Syntax element | binIdx | | | | | |
|---|---|---|---|---|---|---|
| | 0 | 1 | 2 | 3 | 4 | >=5 |
| wedge_full_tab_idx | 0 | 0 | 0 | 0 | 0 | 0 |
| depth_dc_flag | 0 | na | na | na | na | na |
| depth_dc_abs | 0 | 0 | 0 | 0 | 0 | 0 |
| depth_dc_sign_flag | bypass | 0 | 0 | 0 | 0 | 0 |
| res_pred_flag | 0 | na | na | na | na | na |
| ic_flag | 0 | na | na | na | na | na |
| <deleted>inter_sdc_flag | 0 | 0 | 0 | 0 | 0 | |
| inter_sdc_resi_abs_minus1 | 0 | 0 | 0 | 0 | 0 | |
| inter_sdc_resi_sign_flag | 0 | 0 | 0 | 0 | 0 | 0 </deleted> |

In accordance with another example, changes are made to syntax elements and semantics of 3D-HEVC. In the syntax elements and semantics below, pertinent portions of 3D-HEVC have been changed to add syntax elements and semantics proposed in accordance with an example of this disclosure. Changes to syntax elements and semantics, in accordance with this example of this disclosure, are shown with newly added parts presented with bold and newly deleted parts marked with bold text and between bold tags <deleted> and </deleted>.

Syntax tables are presented below, followed by pertinent semantics.

H.7.3.8.5 General Coding Unit Syntax

```
coding_unit( x0, y0, log2CbSize , ctDepth) {
    if( transquant_bypass_enable_flag ) {
        cu_transquant_bypass_flag                                         ae(v)
    if( slice_type != I )
        cu_skip_flag[ x0 ][ y0 ]                                          ae(v)
    nCbS = ( 1 << log2CbSize )
    ...
    else {
        if( slice_type != I )
            pred_mode_flag                                                ae(v)
        if( ( PredMode[ x0 ][ y0 ] ! = MODE_INTRA || log2CbSize == Log2MinCbSize ) &&
            !predPartModeFlag)
            part_mode                                                     ae(v)
    ...
    <deleted> if(vps_inter_sdc_flag && PredMode[ x0 ][ y0 ] ! = MODE_INTRA &&
    !skip_flag[ x0 ][ y0 ] )
        inter_sdc_flag                                                    ae(v)
        if( inter_sdc_flag ) {
            puNum = ( PartMode == PART_2Nx2N ) ? 1 : ( PartMode == PART_NxN ? 4 : 2 )
            for( i = 0; i < puNum; i++ ) {
                inter_sdc_resi_abs_minus1[ x0 ][ y0 ][ i ]                ae(v)
                inter_sdc_resi_sign_flag[ x0 ][ y0 ][ i ]                 ae(v)
            }
    } </deleted>
    if( SdcEnableFlag )
        sdc_flag[ x0 ][ y0 ]                                              ae(v)
    if( sdc_flag[ x0 ][ y0 ] || PredMode[ x0 ][ y0 ] == MODE_INTRA )
        depth_dc_residual x0 , y0 , log2CbSize)
    if( !pcm_flag && !sdc_flag[ x0 ][ y0 ] ) {
        if( PredMode[ x0 ][ y0 ] != MODE_INTRA &&
```

```
                !(PartMode == PART_2N×2N && merge_flag[x0][y0]))
            rqt_root_cbf                                                              ae(v)
            if( rqt_root_cbf <deleted> && !inter_sdc_flag </deleted> ) {
                MaxTrafoDepth = ( PredMode[ x0 ][ y0 ] == MODE_INTRA ?
                        max_transform_hierarchy_depth_intra + IntraSplitFlag :
                        max_transform_hierarchy_depth_inter )
                transform_tree( x0, y0 x0, y0, log2CbSize, 0, 0 )
            }
        }
    }
}
```

H.7.3.8.5.1 Depth Mode Parameter Syntax

| depth_mode_parameters( x0 , y0 , log2CbSize ) { | Descriptor |
|---|---|
| depth_intra_mode[ x0 ][ y0 ] | ae(v) |
| if ( DepthIntraMode[ x0 ][ y0 ] == INTRA_DEP_DMM_WFULL <deleted> \|\| DepthIntraMode[ x0 ][ y0 ] == INTRA_DEP_SDC_DMM_WFULL ) </deleted> | |
|     wedge_full_tab_idx[ x0 ][ y0 ] | ae(v) |
| <deleted>if( DmmFlag[ x0 ][ y0 ] \|\| SdcFlag[ x0 ][ y0 ] ) { | |
|     dcNumSeg = ( DepthIntraMode[ x0 ][ y0 ] == INTRA_DEP_SDC_PLANAR ) ? 1 : 2 | |
|     depth_dc_flag[ x0 ][ y0 ] | ae(v) |
|     if ( depth_dc_flag[ x0 ][ y0 ] ) | |
|         for( i = 0; i < dcNumSeg; i ++ ) { | |
|             depth_dc_abs[ x0 ][ y0 ][ i ] | ae(v) |
|             if( depth_dc_abs[ x0 ][ y0 ][ i ]) | |
|                 depth_dc_sign_flag[ x0 ][ y0 ][ i ] | ae(v) |
|         } | |
| } </deleted> | |
| } | |

H.7.3.8.5.2 Depth DC Residual Syntax Table

| depth_dc_residual( x0 , y0 , log2CbSize ) { | Descriptor |
|---|---|
| pbOffset = ( PartMode[ x0 ][ y0 ] == PART_N×N && PredMode[ x0 ][ y0 ] == MODE_INTRA ) ? ( nCbS / 2 ) : nCbS | |
| for( j = 0; j < nCbS; j = j + pbOffset ) | |
|     for( i = 0; i < nCbS; i = i + pbOffset ) | |
|         if( sdc_flag[ x0 ][ y0 ] \|\| DmmFlag[ x0 + i ][ y0 + j ] ) ) { | |
|             dcNumSeg = PredMode[ x0 ][ y0 ] == MODE_INTRA ? | |
|                 ( DmmFlag[ x0 + i ][ y0 + j ] ? 2 : 1 ) : | |
|                 ( ( PartMode[ x0 ][ y0 ] == PART_2N×2N ) ? 1 : | |
|                 ( PartMode[ x0 ][ y0 ] == PART_N×N ? 4 : 2 )) | |
|             if ( PredMode[ x0 ][ y0 ] == MODE_INTRA ) | |
|                 depth_dc_flag[x0 + i ][ y0 + j ] | ae(v) |
|             if ( depth_dc_flag[ x0 + i ][ y0 + j ] ) | |
|                 for( k = 0; k < dcNumSeg; k ++ ) { | |
|                     depth_dc_abs[ x0 + i ][ y0 + j ][ k ] | ae(v) |
|                 if ( depth_dc_abs[ x0 + i ][ y0 + j ][ k ] ) | |
|                     depth_dc_sign_flag[ x0 + i ][ y0 + j ][ k ] | ae(v) |
|                 } | |
|         } | |
| } | |

Semantics and Decoding Process
H.7.4.9.5 Coding Unit Semantics

<deleted> inter_depth_sdc_flag equal to 1 specifies simplified depth coding of residual blocks is used for the current coding unit. inter_sdc_flag equal to 0 specifies simplified depth coding of residual blocks is not used for the current coding unit. When not present, inter_sdc_flag is inferred to be equal to 0.

inter_depth_sdc_resi_abs_minus1[x0][y0][i], inter_depth_sdc_resi_sign_flag[x0][y0][i] are used to derive InterSdcResi[x0][y0][i] as follows:

InterSdcResi[x0][y0][i]=(1−2*inter_sdc_resi_sign_flag [x0][y0][i])*(inter_ sdc_resi_abs_minus1[x0][y0][i]+ 1) (H-19)
</deleted>

The variable SdcEnableFlag is set equal to 0, and the following applies:
SdcEnableFlag=(vps_inter_sdc_flag[nuh_layer_id]&& PredMode[x0][y0]==MODE_INTER)\|\|(vps_ depth_modes_flag[nuh_layer_id]&& PredMode[x0] [y0]==MODE_INTRA && PartMode[x0][y0] ==PART_2N×2N && (IntraPredModeY[x0][y0]==IN- TRA_DMM_WFULL\|\|IntraPredModeY[x0][y0] ==INTRA_PLANAR)) (H-16)

sdc_flag[x0][y0] equal to 1 specifies segment-wise DC coding of residual blocks is used for the current coding unit. sdc_flag[x0][y0] equal to 0 specifies segment-wise DC coding of residual blocks is not used for the current coding unit. When not present, sdc_flag[x0][y0] is inferred to be equal to 0.

H.7.4.9.5.1 Depth Mode Parameter Semantics

The variable Log 2MaxDmmCbSize is set equal to 5.
The variables depthIntraModeSet is derived as specified in the following:
  If log 2CbSize is equal to 6, depthIntraModeSet is set equal to 0.
  Otherwise, if log 2CbSize is equal to 3 and PartMode [xC][yC] is equal to PART_N×N, depthIntraModeSet is set equal to 1.
  Otherwise, depthIntraModeSet is set equal to 2.
depth_intra_mode[x0][y0] specifies the depth_intra_mode of the current prediction unit. Table H-2 specifies the value of the variable depthIntraModeMaxLen depending on depthIntraModeSet and the value of the variable DepthIntraMode and the associated name depending on the on depth_intra_mode and depthIntraModeSet.
<deleted> The variable SdcFlag[x0][y0] is derived as specified in the following:
  SdcFlag[x0][y0]=(DepthIntraMode[x0][y0]==INTRA_DEP_SDC_PLANAR)||(H-25) (DepthIntraMode[x0][y0]==INTRA_DEP_SDC_DMM_WFULL)
  </deleted>
The variable DmmFlag[x0][y0] is derived as specified in the following:
  DmmFlag[x0][y0]=(DepthIntraMode[x0][y0]==INTRA_DEP_DMM_WFULL)||(H-26) (DepthIntraMode[x0][y0]==INTRA_DEP_DMM_CPREDTEX)

H.8.5.4.1 General

If <deleted> inter_sdc_flag </deleted> sdc_flag is equal to 0, the following applies, depending on the value of rqt_root_cbf, the following applies:
  If rqt_root_cbf is equal to 0 or skip_flag[xCb][yCb] is equal to 1, all samples of the $(nCbS_L)\times(nCbS_L)$ array resSamples$_L$ and all samples of the two $(nCbS_C)\times(nCbS_C)$ arrays resSamples$_{Cb}$ and resSamples$_{Cr}$ are set equal to 0.
  Otherwise (rqt_root_cbf is equal to 1), the following ordered steps apply:
  The decoding process for luma residual blocks as specified in subclause H.8.5.4.2 below is invoked with the luma location (xCb, yCb), the luma location (xB0, yB0) set equal to (0, 0), the variable log 2TrafoSize set equal to log 2CbSize, the variable trafoDepth set equal to 0, the variable nCbS set equal to nCbS$_L$, and the $(nCbS_L)\times(nCbS_L)$ array resSamples$_L$ as inputs, and the output is a modified version of the $(nCbS_L)\times(nCbS_L)$ array resSamples$_L$.
  The decoding process for chroma residual blocks as specified in subclause H.8.5.4.3 below is invoked with the luma location (xCb, yCb), the luma location (xB0, yB0) set equal to (0, 0), the variable log 2TrafoSize set equal to log 2CbSize, the variable trafoDepth set equal to 0, the variable cIdx set equal to 1, the variable nCbS set equal to nCbS$_C$, and the $(nCbS_C)\times(nCbS_C)$ array resSamples$_{Cb}$ as inputs, and the output is a modified version of the $(nCbS_C)\times(nCbS_C)$ array resSamples$_{Cb}$.
  The decoding process for chroma residual blocks as specified in subclause H.8.5.4.3 below is invoked with the luma location (xCb, yCb), the luma location

TABLE H-2

Specification of DepthIntraMode and associated name depending on depthIntraModeSet and depth_intra_mode and specification of and depthIntraModeMaxLen depending on depthIntraModeSet

| | depthIntraModeSet | <deleted>0</deleted> | 1 | 2 |
|---|---|---|---|---|
| | depthIntraModeMaxLen | <deleted>1</deleted> | 1 | 2 |
| | | | <deleted>3</deleted> | <deleted>3</deleted> |

| DepthIntra Mode | Associated name | depth_intra_mode | | | |
|---|---|---|---|---|---|
| </deleted> 0 | INTRA DEP SDC_PLANAR | 0 | — | 0 | </deleted> |
| 0 <deleted> 1 </deleted> | INTRA_DEP_NONE | <deleted>1</deleted> | 0 | 0 <deleted>1</deleted> | |
| <deleted>2 | INTRA_DEP_SDC_DMM_WFULL | <deleted></deleted> | <deleted></deleted> | 2 | </deleted> |
| 1 <deleted>3</deleted> | INTRA_DEP_DMM_WFULL | <deleted></deleted> deleted> | 1 | 1 <deleted>3</deleted> | |
| 2 <deleted>4</deleted> | INTRA_DEP_DMM_CPREDTEX | <deleted></deleted> | <deleted></deleted> | 2 <deleted>4</deleted> | |

H.7.4.9.5.2 Depth DC Residual Semantics depth_dc_flag[x0][y0] equal to 1 specifies that depth_dc_abs[x0][y0][i] and depth_dc_sign_flag[x0][y0][i] are present. depth_dc_flag[x0][y0] equal to 0 specifies that depth_dc_abs[x0][y0][i] and depth_dc_sign_flag[x0][y0][i] are not present. When not present, depth_dc_flag[x0][y0] is inferred to be equal to 1.
depth_dc_abs[x0][y0][i], depth_dc_sign_flag[x0][y0][i] are used to derive DcOffset[x0][y0][i] as follows:
  DcOffset[x0][y0][i]=(1−2*depth_dc_sign_flag[x0][y0][i])*(depth_dc_abs[x0][y0][i]−dcNumSeg+2) (H-27)

(xB0, yB0) set equal to (0, 0), the variable log 2TrafoSize set equal to log 2CbSize, the variable trafoDepth set equal to 0, the variable cIdx set equal to 2, the variable nCbS set equal to nCbS$_C$, and the $(nCbS_C)\times(nCbS_C)$ array resSamples$_{Cr}$ as inputs, and the output is a modified version of the $(nCbS_C)\times(nCbS_C)$ array resSamples$_{Cr}$.
Otherwise (<deleted> inter_sdcw_flag </deleted> sdc_flag is equal to 1), the decoding process for simplified depth coded residual blocks as specified in subclause H.8.5.4.4 is invoked with the luma location (xCb, yCb), the luma location (xB0, yB0) set equal to (0, 0), the variable log 2TrafoSize set equal to log 2CbSize, the variable trafoDepth set equal to 0, the variable nCbS set equal to $nCbS_L$, and the $(nCbS_L) \times (nCbS_L)$ array resSamples$_L$ as inputs, and the output is a modified version of the $(nCbS_L) \times (nCbS_L)$ array resSamples$_L$.

H.8.5.4.4 Decoding Process for Simplified Depth Coded Residual Blocks

For x in the range of 0 to nCbS the following applies:
    For y in the range of 0 to nCbS the following applies:
        The variable i is derived as specified in the following:

If x is less than xOff and y is less than yOff, i is set equal to 0.
Otherwise, if x greater than or equal to xOff and y is less than to yOff, i is set equal to 1.
Otherwise, if x less than xOff and y is greater than or equal to yOff, i is set equal to 2.
Otherwise, (x is greater than or equal to xOff and y is greater than or equal to yOff), i is set equal to 3.

The value of resSamples[x][y] is set equal to DcOffset <deleted> InterSdcResi </deleted>[xCb][yCb][interSdcResiIdx[i]]

TABLE H-10

Association of ctxIdx and syntax elements for each initializationType in the initialization process

| Syntax structure | Syntax element | ctxTable | initType 0 | 1 | 2 |
|---|---|---|---|---|---|
| coding_unit( ) | depth_intra_mode | Table H-15 | 0 ... 7 | 8 ... 15 | 16 ... 23 |
| depth_mode_parameters( ) | wedge_full_tab_idx | Table H-11 | 0 | 1 | 2 |
| | depth_dc_flag | Table H-16 | 0 | 1 | 2 |
| | depth dc abs | Table H-12 | 0 | 1 | 2 |
| | iv_res_pred_weight_idx | Table H-13 | | 0 ... 3 | 4 ... 7 |
| | ic_flag | Table H-14 | | 0 ... 2 | 3 ... 5 |
| | <deleted>inter_sdc_flag | Table H-17 | 0 | 1 | 2 |
| | inter_sdc_resi_abs_minus1 | Table H-18 | 0 | 1 | 2 |
| | inter_sdc_resi_sign_flag | Table H-19 | 0 | 1 | 2 |

TABLE H-17

Values of initValue for inter_sdc_flag ctxIdx

| Initialization variable | ctxIdx of inter_sdc_flag | | |
|---|---|---|---|
| | 0 | 1 | 2 |
| initValue | 154 | 154 | 154 |

TABLE H-18

Values of initValue for inter_sdc_resi_abs_minus1 ctxIdx

| Initialization variable | ctxIdx of inter_sdc_resi_abs_minus1 | | |
|---|---|---|---|
| | 0 | 1 | 2 |
| initValue | 154 | 154 | 154 |

TABLE H-19

Values of initValue for inter_sdc_resi_sign_flag ctxIdx

| Initialization variable | ctxIdx of inter_sdc_resi_sign_flag | | |
|---|---|---|---|
| | 0 | 1 | 2 |
| initValue | 154 | 154 | 154 |

</deleted>

TABLE H-20

Syntax elements and associated binarizations

| Syntax structure | Syntax element | Binarization Process | Input parameters |
|---|---|---|---|
| coding_unit( ) | iv_res_pred_weight_idx | TR | cMax = 2, cRiceParam = 0 |
| | ic_flag | FL | cMax = 1 |
| | <deleted>inter_sdc_flag | FL | cMax = 1 |
| | inter_sdc_resi_abs_minus1 | UEG0 | [Ed. (GT) To be specified] |
| | inter_sdc_resi_sign_flag | FL | cMax = 1 </deleted> |

TABLE H-22

Assignment of ctxInc to syntax elements with context coded bins

| | binIdx | | | | | |
|---|---|---|---|---|---|---|
| Syntax element | 0 | 1 | 2 | 3 | 4 | >=5 |
| wedge_full_tab_idx | 0 | 0 | 0 | 0 | 0 | 0 |
| depth_dc_flag | 0 | na | na | na | na | na |
| depth_dc_abs | 0 | 0 | 0 | 0 | 0 | 0 |
| depth_dc_sign_flag | bypass | 0 | 0 | 0 | 0 | 0 |
| res_pred_flag | 0 | na | na | na | na | na |
| ic_flag | 0 | na | na | na | na | na |
| <deleted>inter_sdc_flag | 0 | 0 | 0 | 0 | 0 | 0 |
| inter_sdc_resi_abs_minus1 | 0 | 0 | 0 | 0 | 0 | 0 |
| inter_sdc_resi_sign_flag | 0 | 0 | 0 | 0 | 0 | 0 </deleted> |

FIGS. 7-12 are flow diagrams illustrating various example operations performed by video encoder 20 and/or video decoder 20 in accordance with this disclosure. The flow diagrams are provided for purposes of illustration and should not be considered limiting. The order of various operations is presented for purposes of illustration and does not necessarily indicate that the operations must be performed in the illustrated order. Also, in many cases, the operations illustrated in FIGS. 7-12 may be practiced with one another in various combinations.

Figure 7:
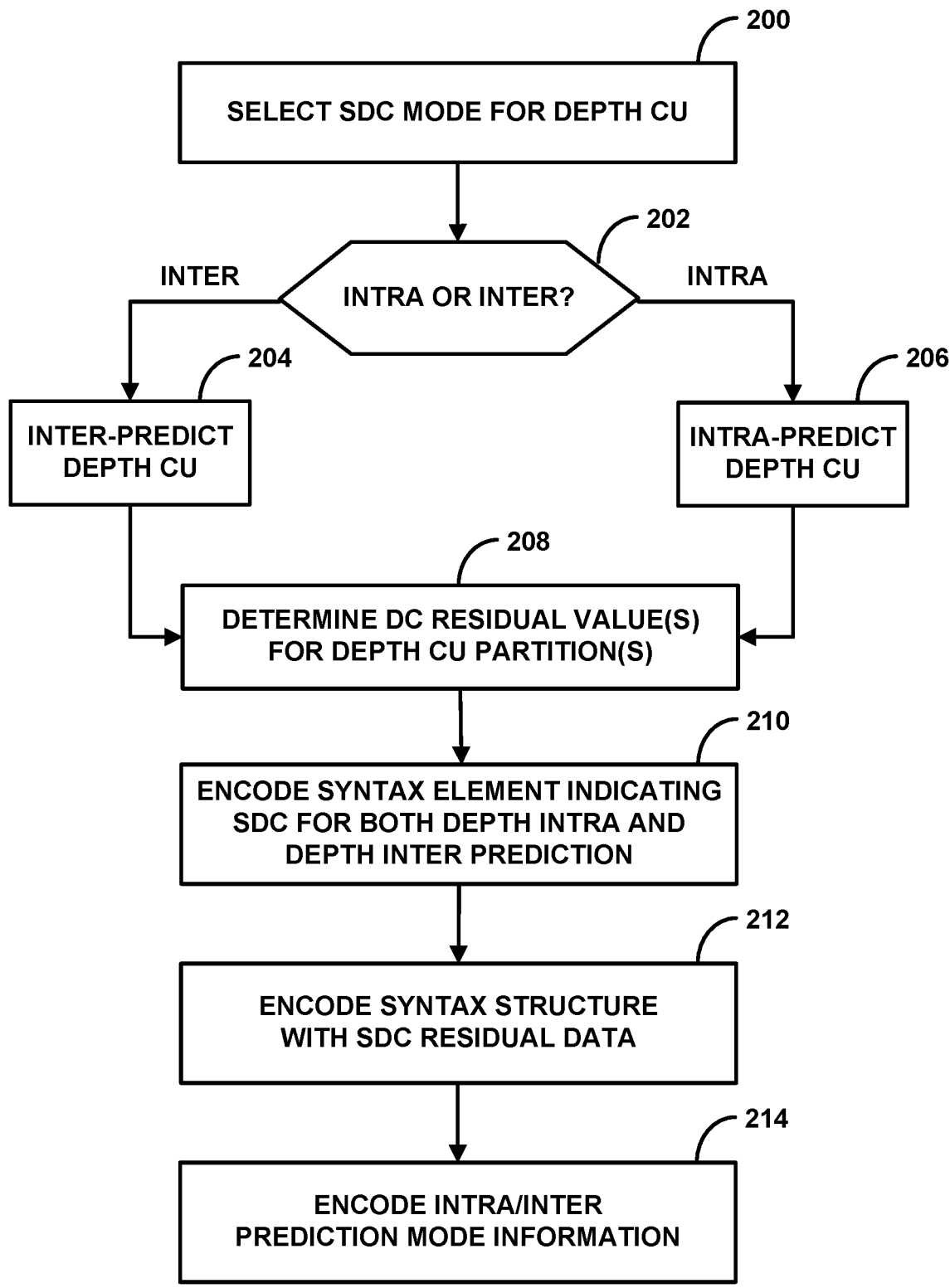
FIG. 7 is a flow diagram illustrating encoding of a syntax element to indicate SDC usage for a CU both depth intra-prediction and depth inter-prediction modes.

FIG. 7 is a flow diagram illustrating encoding of a syntax element to indicate SDC usage for both depth intra-prediction and depth inter-prediction modes, e.g., at a CU level. Video encoder 20 may be configured to perform the operations of FIG. 7. For example, video encoder 30 may select the SDC mode for coding partitions of PU's of a depth CU. In some examples, video encoder 30 may transmit a syntax element to enable or disable the SDC mode for coding depth CU's in an entire encoded video sequence. Then, in some examples, if SDC is enabled for the sequence, video encoder 30 may signal a syntax element for each depth CU in the sequence to indicate whether SDC is selected for the depth CU. Video encoder 30 selects an inter-coding mode or an intra-coded mode for each CU (202) and then either applies inter-prediction of the depth CU (204) or intra-prediction of the depth CU (206).

Various types of SDC intra prediction may be used. In some examples, for SDC, for a current intra-coded, where the syntax element indicates whether the SDC mode is used for the current depth CU, coding may include, when performing the intra prediction to generate the predicted depth CU, using samples from a texture component that corresponds to a depth component of the depth CU.

For depth coding, video encoder 30 may use regular HEVC intra-prediction or inter-prediction modes or DMM modes such as wedgelet, contour or planar partitioning modes. In either case, video encoder 20 may apply SDC to generate a DC residual value or values for the depth CU partition or partitions (208). For example, with SDC, video encoder 20 may encode only one DC residual value for the partition associated with each PU of the depth CU. Hence, video encoder 20 signals one DC residual value for each PU, and the one DC residual value is used as the residual for all samples in the PU. The PU may be the entire CU or individual partitions in the CU, such as partitions defined by wedgelet or contour partitioning.

With further reference to FIG. 7, video encoder 20 may encode a syntax element indicating that SDC is used for a CU, whether for intra or inter mode, i.e., for both depth intra and depth inter prediction (210). Hence, instead of independently signaling SDC for depth intra and depth inter prediction separately, video encoder 20 generates a single syntax element for a CU that indicates that SDC applies the CU, regardless of whether the CU is coded with depth intra and depth inter prediction. The syntax element may be an sdc_flag syntax element. The sdc_flag syntax element may be a one-bit flag. As an example, an sdc_flag value of 1 indicates that SDC is to be used for both depth intra and depth inter prediction, and an sdc_flag value of 0 indicates that SDC is not to be used for either depth intra and depth inter prediction. Again, another syntax element may enable or disable SDC for an entire sequence. If SDC is enabled, the sdc_flag may be signaled at the CU level. If SDC is disabled for the sequence, in some examples, the sdc_flag is not signaled. Again, enablement or disablement of SDC may be applied on a sequence, picture or slice basis, whereas sdc_flag may be sent to indicate actual SDC usage at a CU level.

In some examples, video encoder 20 may signal the SDC syntax element sdc_flag in the general coding unit parameters at CU level. Accordingly, video encoder 20 may signal the SDC syntax element on a CU-by-CU basis. In other examples, as discussed above, video encoder 20 may signal another syntax element in a slice segment header, indicating that SDC is enabled (or disabled) for all depth CU's in a slice segment. In still other examples, the SDC syntax element generated by video encoder 20 may indicate that SDC is enabled (or disabled) for all depth CUs in an entire picture or entire video sequence. For example, video encoder 20 may signal the enablement/disablement SDC syntax element in a video parameter set (VPS) extension, e.g., for 3D-HEVC, in a sequence parameter set (SPS), or in a picture parameter set (PPS). In some examples, one or more syntax elements signaled in a VPS, SPS, PPS, slice header or the like may be used to calculate a value for an enable or disable flag that may be signaled separately, e.g., at the CU level. Accordingly, a first SDC enable syntax element may be used to enable or disable SDC, e.g., for all depth CU's is a slice, all depth CU's in a picture, or all depth CU's in an entire encoded video sequence, and a second SDC syntax element (e.g., sdc_flag) may be configured to indicate that SDC is actually used for both depth intra and depth inter prediction for individual depth CU's.

Video encoder 20 also may encode a syntax structure with the SDC residual data. For example, when the current depth CU is coded with SDC, for each partition, the DC residual value for each partition of each PU of an inter-coded CU or an intra-coded CU may be presented in one syntax structure. The DC residual value may be a DC offset in the pixel value domain. This single syntax structure for the partition includes the DC residual data for the partition, whether the partition is intra- or inter-predicted. For example, for either intra-prediction or inter-prediction, the syntax structure may include an absolute value of the DC residual value and its sign (plus or minus). Examples of DC residual syntax elements include depth_dc_abs, to indicate the residual, and depth_dc_sign_flag, to indicate the sign. For example, depth_dc_abs and depth_dc_sign_flag can be used to derive a DcOffset value. In this manner, video encoder 20 may be configured to unify the DC residual data for an inter coded CU or intra coded CU to be presented by one syntax structure. In some examples, the DC residual data in the syntax structure may include the DC residual value and sign. In other examples, the DC residual data may be signaled using a DLT. In this case, the DC residual data may be signaled as a difference between a DLT index of an original DC value and a DLT index of a predicted DC value, e.g., for a depth PU or partition.

As an alternative, or additionally, video encoder 20 may be configured to signal and encode a flag, for an intra-coded CU, that indicates whether the CU contains any non-zero DC residual value in any of its partitions. If this flag is 0, video encoder 20 does not signal any DC residual values for the intra-coded CU, and the DC residual values are inferred by decoder 30 to be equal to zero for each partition of the CU. As a further alternative, the flag generated by video encoder 20 to indicate whether the CU contains any non-zero DC residual value in any of its partitions may apply to both intra-coded and inter-coded CU's.

The syntax structure generated by video encoder 20 and used to signal DC residual values for intra-predicted and inter-predicted CU's may be a single syntax structure, as described above. That is, a single syntax structure may be generated for each depth CU, whether the CU is intra-predicted or inter-predicted. In this manner, the intra-prediction and inter-prediction modes may share the same syntax elements to signal the DC residual value(s) for the partition(s) of the depth CU. Video encoder 20 may entropy code the syntax elements of the syntax structure using the same context model and/or binarization process for the relevant syntax elements, whether the depth CU is intra-predicted or inter-predicted, thereby unifying the entropy coding process for intra-prediction and inter-prediction with SDC.

Alternatively, video encoder 20 may generate separate instances of the syntax structure, i.e., one syntax structure including DC residual data for intra-prediction and one syntax structure including DC residual data for inter-prediction, where the instances of the syntax structure are identical or substantially identical in that the same syntax elements are included in each instance of the syntax structure. In this case, video encoder 30 may entropy code the separate instances of the syntax structure separately, and use contexts, and possibly binarizations, that are the same, or maintained separately, for the intra-prediction instance of the syntax structure and the inter-prediction instance of the syntax structure. Even if the contexts are maintained separately, the intra SDC and inter SDC modes can still use the same syntax elements and same syntax structure, albeit in different instances, to carry the DC residual data for partitions of PU's of the depth CU's.

Video encoder 214 encodes intra-prediction or inter-prediction information for prediction of one or more PU's associated with a depth CU (214). For example, video encoder 214 may encode an indication of the coding mode for each PU and any other information for inter- or intra-prediction of each PU at the decoder side. For SDC intra-prediction, for example, video encoder 20 may encode intra-coding mode information for HEVC intra-prediction modes, DMM modes, or other intra modes. For inter-prediction, for example, video encoder 20 may encode motion information for generation of inter-predicted depth PU's and/or partitions. Video encoder 214 may entropy code the SDC syntax element (i.e., indicating use of SDC at the CU level), SDC syntax structure(s) (i.e., indicating DC values for PU partitions), and intra- or inter-prediction information for use by decoder 30 in decoding and reconstructing the depth CU's as part of a 3D decoding process, such as a 3D-HEVC decoding process, at the decoder side.

Figure 8:
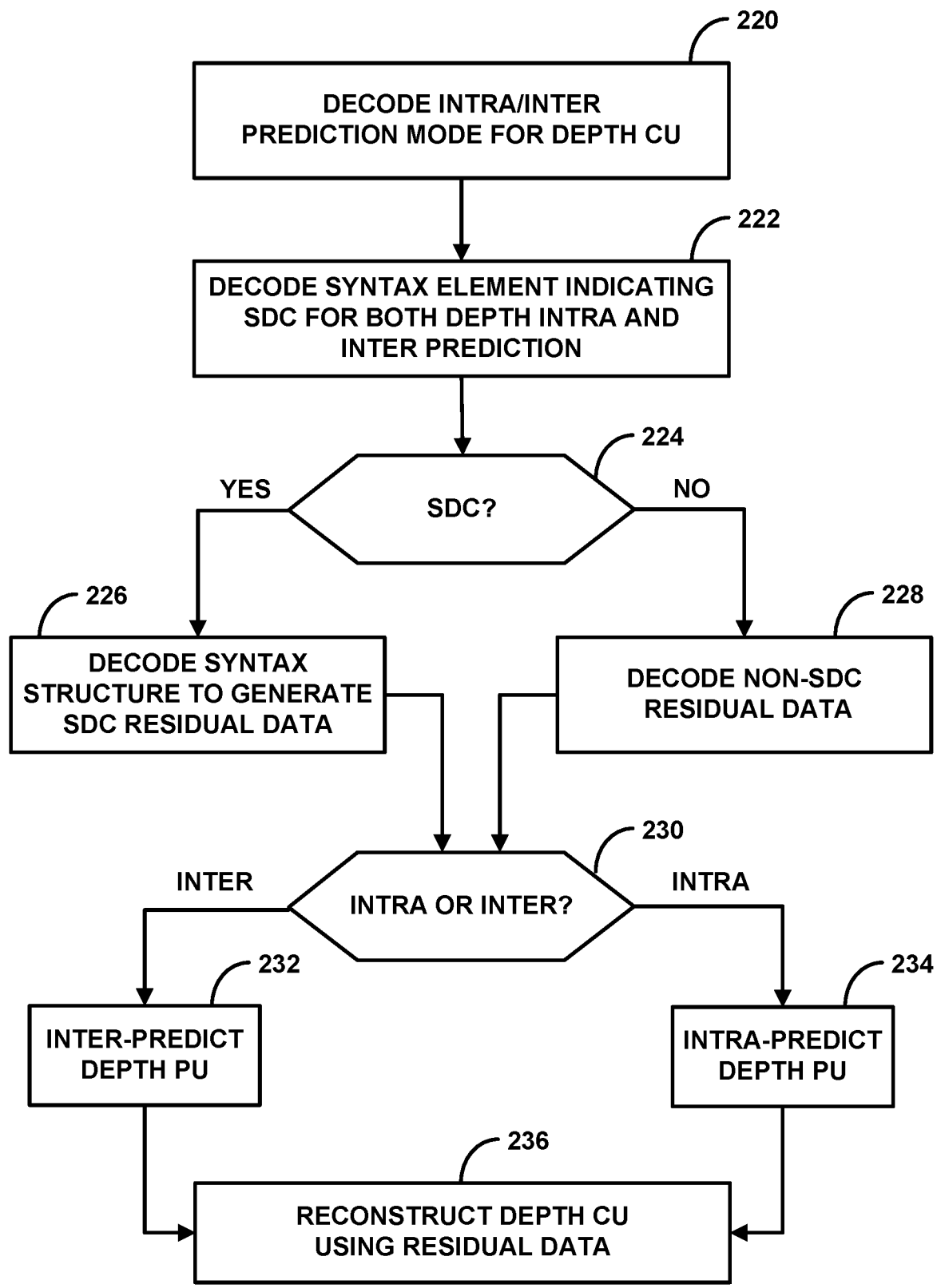
FIG. 8 is a flow diagram illustrating decoding of a syntax element to indicate SDC usage for both depth intra-prediction and depth inter-prediction modes for a CU.

FIG. 8 is a flow diagram illustrating decoding of an SDC syntax element, such as the syntax element described above with reference to FIG. 7, to indicate SDC usage for both depth intra-prediction and depth inter-prediction modes. In general, FIG. 8 describes the processes illustrated in FIG. 7 from the decoder side perspective of video decoder 30. Accordingly, the details of various operations and syntax described with reference to FIG. 7 may apply in a similar manner to FIG. 8, but from the perspective of video decoder 30. As shown in FIG. 8, video decoder 30 may be configured to decode intra and/or inter prediction mode information for depth CU's to generate predicted depth information. In addition, video decoder 30 may receive and decode an SDC syntax element (e.g., sdc_flag) that indicates whether SDC is to be used for a CU, i.e., regardless of whether depth intra prediction and depth inter prediction modes are used. In other words, the syntax element is used to signal SDC for both intra and inter CU's.

As discussed with reference to FIG. 7, instead of independently receiving signaling of SDC for depth intra and depth inter prediction separately, video decoder 20 receives an SDC syntax element that indicates that SDC applies to both depth intra and depth inter prediction. Again, the SDC syntax element may be a sdc_flag syntax element, and may otherwise conform to the description of the syntax element described above with reference to FIG. 7. An sdc_flag value of 1 may indicate that SDC is to be used for both depth intra and depth inter prediction for the CU, and an sdc_flag value of 0 may indicate that SDC is not to be used for either depth intra and depth inter prediction for the CU.

Video decoder 30 may receive the SDC syntax element in the general coding unit parameters at CU level. Accordingly, video decoder 30 may receive and decode the SDC syntax element on a CU-by-CU basis. In some examples, video decoder 30 may receive another SDC syntax element in a slice segment header, indicating that SDC is enabled for all depth CU's in a slice segment. In still other examples, video decoder 30 may receive another syntax element indicating SDC is enabled for intra- and inter-prediction of depth CU's in an entire coded video sequence, or in a picture. For example, video decoder 30 may receive the additional SDC syntax element (indicating whether SDC is enabled or disabled) in a video parameter set (VPS) extension, e.g., for 3D-HEVC, in a sequence parameter set (SPS), or in a picture parameter set (PPS). Accordingly, video decoder 30 may receive a first SDC syntax element indicating that SDC is enabled for CU's in a sequence, picture or slice, and a second SDC element (e.g., sdc_flag) at the CU level indicating that SDC is actually used for a particular CU.

If SDC is indicated as not being used (e.g., sdc_flag=0) for intra-prediction and inter-prediction (224), decoder 30 decodes the bitstream to obtain non-SDC residual data for use in reconstruction of intra- or inter-predicted PUs. If the syntax element indicates that SDC is used (e.g., sdc_flag=1) for intra-prediction and inter-prediction (224), decoder 30 decodes a syntax structure to generate SDC residual data for a partition of a depth PU of the current CU. This may be repeated for multiple partitions of PU's in the CU. Decoder 30 may receive a plurality of syntax structures, where the syntax structures includes SDC residual data for a respective depth PU partition. As described with reference to FIG. 8, the syntax structure for each depth PU may be a single syntax structure, whether the depth PU is intra- and inter-coded, or separate instances of the same syntax structure for intra- and inter-coded depth PU's, respectively. When a current depth CU is coded with SDC, for each partition, a DC residual value for an inter-coded CU or an intra-coded CU may be presented in the syntax structure. Hence, this syntax structure for the partition includes the DC residual data for the partition, whether the partition is intra- or inter-predicted.

For example, for either intra-prediction or inter-prediction, the syntax structure decoded by video decoder 30 may include an absolute value of the DC residual value and its sign (plus or minus). Examples of DC residual syntax elements in the syntax structure include depth_dc_abs, to indicate the residual, and depth_dc_sign_flag, to indicate the sign. In this manner, by using the same syntax structure, or at least the same syntax elements, to convey DC residual data for both depth intra and depth inter coding, video decoder 30 may be configured to unify the DC residual value for an inter coded CU or intra coded CU. In some examples, the DC residual data in the syntax structure may include the DC residual value and sign. In other examples, the DC residual data may be signaled using a DLT. In this case, the DC residual data may be signaled as a difference between a DLT index of an original DC value and a DLT index of a predicted DC value, e.g., for a depth PU or partition.

In some examples, as described with reference to FIG. 7, in the operations of FIG. 8, video decoder 30 may be configured to signal and decode a flag, for an intra-coded CU, that indicates whether the CU contains any non-zero DC residual value in any of its partitions. If this flag is 0, video decoder 20 does not parse for any DC residual values for the intra-coded CU, and instead infers the DC residual values to be equal to zero for each partition of the CU. As a further alternative, the flag decoded by video decoder 30 to indicate whether the CU contains any non-zero DC residual value in any of its partitions may apply to both intra-coded and inter-coded CU's.

The syntax structure decoded by video decoder 30 may be a single syntax structure, as described above. That is, a single syntax structure may be generated for each depth CU, whether the CU is intra-predicted or inter-predicted. In this manner, the intra-prediction and inter-prediction modes may share the same syntax elements to signal the DC residual value(s) for the partition(s) of the depth CU. Video decoder 20 may entropy decode the syntax structure using at least one of the same context model and binarization process for the relevant syntax elements, whether the depth CU is intra-predicted or inter-predicted, thereby unifying the entropy decoding process for intra-prediction and inter-prediction with SDC. At least one of the context models and binarization process used for the context-adaptive entropy coding process can be the same for the same syntax elements, e.g., depth_dc_abs and depth_dc_sign_flag, in the syntax structure.

Alternatively, in the operations of FIG. 8, video decoder 30 may receive and decode separate instances of the syntax structure, i.e., one syntax structure including DC residual data for intra-prediction and one syntax structure including DC residual data for inter-prediction, where the instances of the syntax structure substantially identical in that the same syntax elements are included in each instance of the syntax structure, as described with reference to FIG. 7. In this case, video decoder 30 may entropy decode the separate instances of the syntax structure separately, but with the same syntax elements, and use contexts, and possibly binarizations, that are the same or maintained separately for the intra-prediction instance of the syntax structure and the inter-prediction instance of the syntax structure. Again, the same syntax elements, e.g., depth_dc_abs, to indicate the residual, and depth_dc_sign_flag, to indicate the sign, can be used whether a single syntax structure or separate instances of the syntax structure are provided. In each case, the same syntax elements can be used to convey the SDC residual data for both intra- and inter-prediction modes. In some examples, at least one of the context models and binarization process used for the context-adaptive entropy coding process can be the same for the same syntax elements, e.g., depth_dc_abs and depth_dc_sign_flag, in the different instances of the syntax structure. In other examples, one or both of the context models and binarization processes used for the context-adaptive entropy coding process can be different for the syntax elements, e.g., depth_dc_abs and depth_dc_sign_flag, in the different instances of the syntax structure.

In the case of SDC coding or non-SDC coding, video decoder 30 determines whether the depth_intra_mode or depth inter mode applies to a current CU (230). Video decoder 30 inter-predicts each depth PU (232) or intra-predicts each depth PU (234), as applicable, using mode information provided in the encoded video bitstream. The mode information may include, for example, intra-coding mode information for HEVC intra-prediction modes, DMM modes, or other intra modes for generation of intra-predicted depth PU's and/or partitions, or inter-coding mode information and motion information for generation of inter-predicted depth PU's and/or partitions. Using such information, video decoder 30 generates predictive samples for the depth PU's and/or partitions.

Video decoder 30 reconstructs the partitions of the PU's of the depth CU using either SDC residual data or non-SDC residual data and the predicted depth PU. For example, in the case of SDC coding, for a given PU, video decoder 30 applies a DC residual value signaled in the SDC syntax structure, or derives the DC residual value from a DLT based on an index value difference or other information provided in the SDC syntax structure. Video decoder 30 adds the DC residual value to the predicted samples of the predicted PU partition to reconstruct the original samples. In this manner, video decoder 30 uses the SDC syntax element and SDC syntax structure to unify SDC intra and inter decoding, instead of using separate syntax elements and syntax structures for intra and inter coding, respectively.

Figure 9:
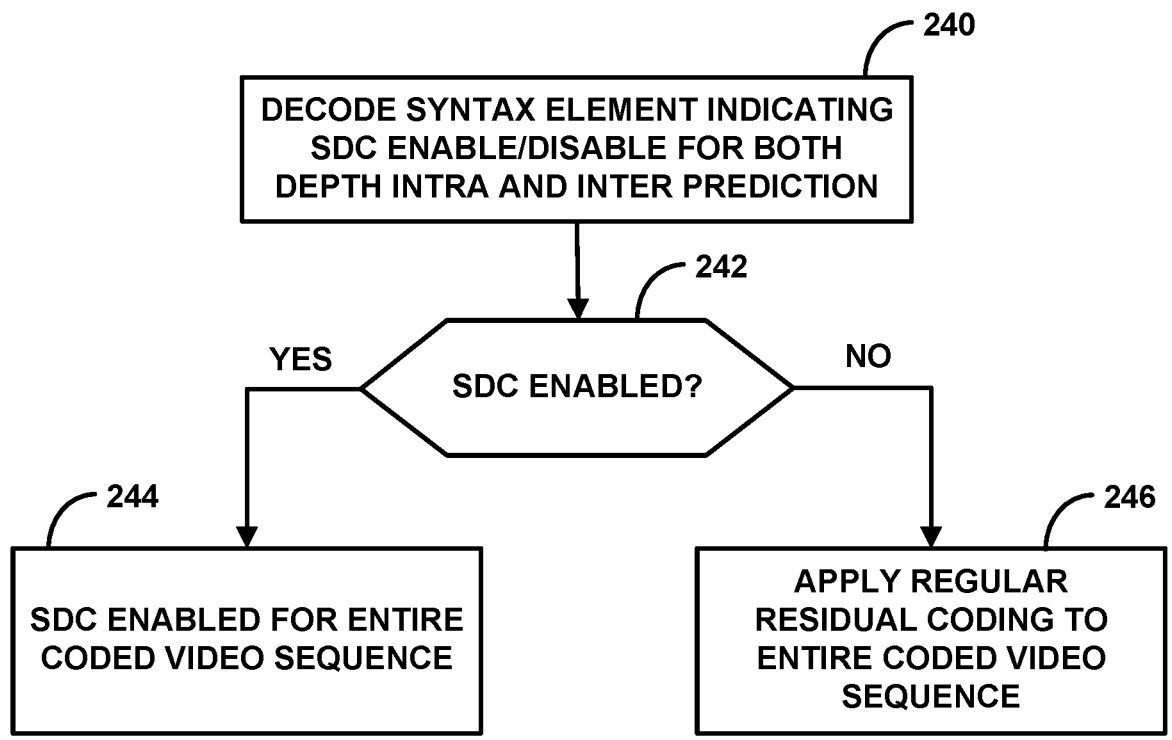
FIG. 9 is a flow diagram illustrating decoding of a syntax element to indicate whether SDC is enabled or disabled for depth CU's in an entire encoded video sequence.

FIG. 9 is a flow diagram illustrating decoding of a syntax element to indicate SDC usage for depth blocks in an entire encoded video sequence. In general, the operations illustrated in FIG. 9 from the decoder side perspective represent a possible feature for use with the methods shown in FIGS.

7 and 8. In the example of FIG. 9, video decoder 30 decodes an SDC syntax element indicating whether SDC is enabled or disabled for both depth intra prediction and depth inter prediction (240). Video decoder 30 may receive the SDC syntax element, for example, in a video parameter set (VPS) extension, sequence parameter set (SPS), picture parameter set (PPS), or slice segment header. When received in the VPS or SPS, if the SDC syntax element indicates enablement of SDC, video decoder 30 should consider SDC to be enabled for all intra-predicted and inter-prediction modes for an entire video sequence, and should receive another syntax element at the CU level (e.g., sdc_flag) indicating whether SDC is used for the CU. As an alternative, when the SDC syntax element is received in a PPS, and indicates enablement of SDC, video decoder 30 may receive additional SDC syntax elements (e.g., sdc_flag) at the CU level for all depth blocks of a corresponding picture. As a further alternative, when the SDC syntax element is received in a slice segment header, and indicates enablement of SDC, video decoder 30 may receive additional SDC syntax elements (e.g., sdc_flag) at the CU level for all depth blocks of a corresponding slice segment.

If SDC is indicated as enabled (242), in the example of FIG. 9, video decoder interprets SDC to be enabled for depth intra and depth inter coding modes for the entire coded video sequence, and may parse the bitstream for the sdc_flag syntax element at the CU level for CU's in the sequence. If SDC is not enabled (242), video decoder 30 applies regular, non-SDC residual coding to depth blocks for the entire coded video sequence. In this manner, SDC enablement or disablement can be signaled once, both for depth intra and inter modes, and for an entire coded video sequence. Accordingly, one syntax element can be used to enable/disable both intra and inter SDC modes in the decoding process for the entire coded video sequence. Alternatively, SDC enable/disable can be signaled once with a syntax element for an entire picture or slice segment. In each case, actual SDC usage for a CU can be signaled with a syntax element in the general coding unit parameters at the CU level.

In some examples, instead of indicating with one syntax element whether SDC is enabled for intra and inter modes for an entire coded video sequence, or for a picture or a slice segment, video encoder 20 may encode, and video decoder 30 may decode, a single (first) flag to indicate whether SDC is enabled for depth intra prediction mode. For example, this first flag may be used to indicate whether SDC is enabled for intra mode for a whole coded video sequence. In some examples, if the first flag is true, i.e., SDC is to be enabled for intra mode for the whole coded video sequence, video encoder 20 encodes, and video decoder 30 decodes, an additional (second) flag that is used to indicate whether SDC is enabled for inter mode for the whole coded video sequence, i.e., whether SDC is also enabled for inter mode for the whole coded video sequence.

If the first flag is not true, and SDC is not enabled for the intra mode, video encoder 20 need not generate, and video decoder 30 need not parse, for the second flag indicating whether SDC is enabled for inter mode. In some examples, the first flag to indicate enablement of SDC intra and a second flag to indicate enablement of SDC inter may be provided in the VPS or SPS for the entire coded video sequence. Alternatively, in some examples, first flag to indicate enablement of SDC intra and a second flag to indicate enablement of SDC inter may be provided in PPS or a slice segment header. In each case, actual SDC usage for a CU can be indicated in at the CU level, e.g., using sdc_flag.

Figure 10:
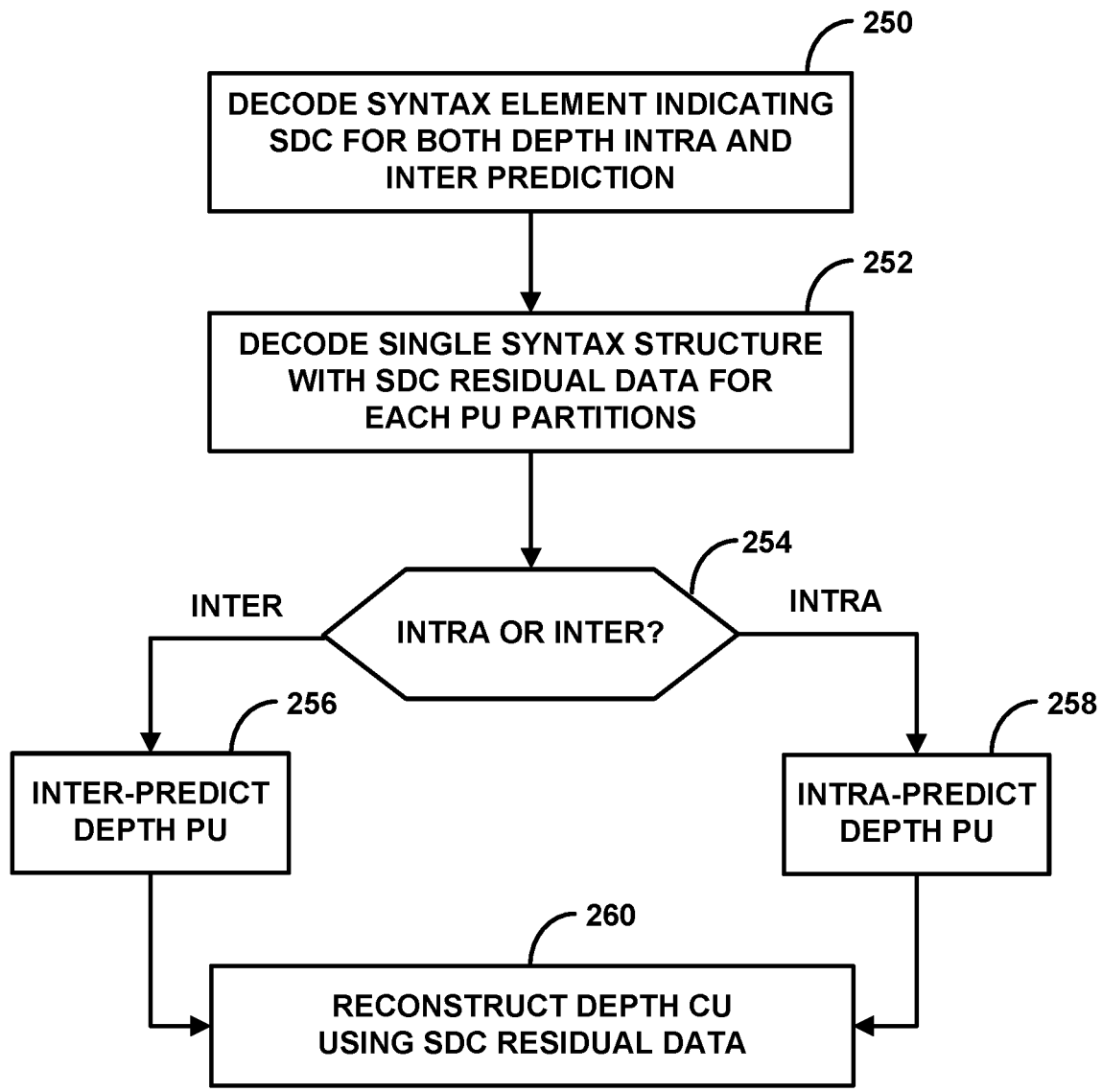
FIG. 10 is a flow diagram illustrating decoding of a single syntax structure to obtain SDC residual data for a PU partition of a CU for intra-prediction and inter-prediction modes.

FIG. 10 is a flow diagram illustrating decoding of a single syntax structure to obtain SDC residual data for intra-prediction and inter-prediction modes. In the example of FIG. 10, video decoder 30 decodes a single SDC syntax structure for both depth intra and depth inter modes as described above with reference to FIGS. 7 and 8. As shown in FIG. 10, video decoder 30 decodes an SDC syntax element indicating whether SDC is used for both depth intra and depth inter prediction at the CU level, e.g., for a depth CU. It is assumed that the syntax element indicates that SDC is used, for purposes of FIG. 10, in which case video decoder 30 further decodes a single SDC syntax structure that includes SDC residual data for one or more partitions of PU's of a given depth CU.

In the example of FIG. 10, and as described above with reference to FIGS. 7 and 8, the single SDC syntax structure may be a single syntax structure sent for both depth intra or inter modes, or separate instances of the same syntax structure for depth intra mode and depth inter mode, respectively. In each case, the syntax structure uses the same syntax elements for depth_intra_mode and depth inter mode. For example, the SDC syntax structure may include syntax elements that indicate a DC residual value or values and sign(s), or DLT index difference values for derivation of DC residual value. Examples of the syntax elements for indicating DC residual data include depth_dc_abs, to indicate the residual, and depth_dc_sign_flag, to indicate the sign.

Upon determining whether a depth CU is inter-coded or intra-coded (254), video decoder 30 inter-predicts (256) or intra-predicts (258) reference samples for a current depth PU. Video decoder 30 then reconstructs the partitions of the PU's of the depth CU using the SDC residual data signaled in the single SDC syntax structure for depth intra or depth_intra_mode, or signaled in a separate instance of the same SDC syntax structure for depth_intra_mode or depth inter mode, respectively. For example, video decoder 30 adds the DC residual value to the predicted samples of the intra- or inter-predicted PU to reconstruct the original samples.

If syntax structures used for the residual values generated by SDC share the same syntax elements and/or the same syntax structure, the context model and binarization processes, e.g., for a context-adaptive binary arithmetic coding (CABAC) entropy coding process performed by the video encoder 20 and video decoder 30, for relevant syntax elements for both the depth intra-prediction and depth inter-prediction modes can be unified. For example, the syntax elements for the residual values generated by SDC may be entropy encoded by video encoder 20 and entropy decoded by video decoder 30 using the same context model for both the depth intra-prediction mode and the depth inter-prediction mode.

Again, as an alternative to using a single SDC syntax structure, separate instances of the same SDC syntax structure may be encoded by video encoder 20 and decoded by video decoder 30 to provide SDC residual data for depth intra and depth inter modes. A first instance of the SDC syntax structure may be coded (i.e., encoded or decoded) to provide SDC residual data for a depth_intra_mode, and a second instance of the SDC syntax structure may be coded to provide SDC residual data for a depth inter mode. Depending on which depth mode (intra or inter) is used for a depth CU, video decoder 30 decodes and retrieves syntax elements from a pertinent instance (e.g., first instance for intra and second instance for inter) of the SDC syntax structure, and uses the DC residual data indicated by the syntax elements to reconstruct the depth CU. In this example, the same syntax elements are used in the syntax structure for each instance of the syntax structure. Separate contexts and/or binarizations may be maintained for entropy coding the separate instances of the SDC syntax structure by video encoder 20 and video encoder 30. Alternatively, the separate instances may be entropy coded (e.g., CABAC) using the same contexts and/or binarizations.

Figure 11:
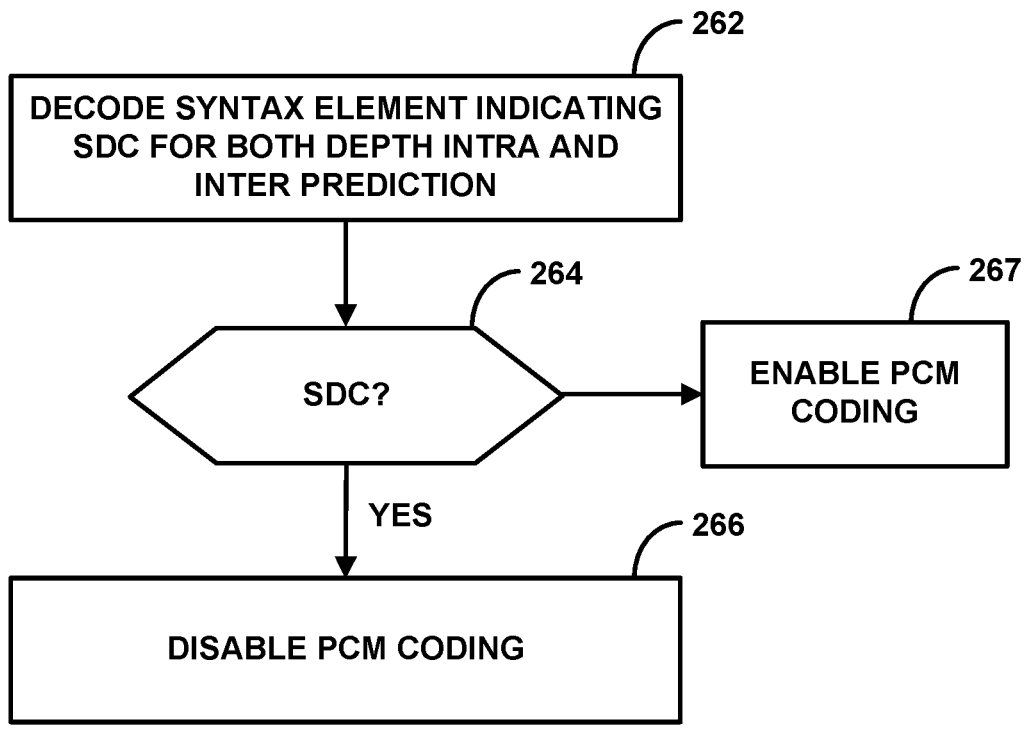
FIG. 11 is a flow diagram illustrating the use of ah example constraint on SDC coding at the decoder side.

FIG. 11 is a flow diagram illustrating the use of an example constraint on SDC coding at the decoder side. As shown in FIG. 11, video decoder 30 decodes an SDC syntax element, such as sdc_flag (262). When the SDC syntax element indicates that SDC is used (264), e.g., for a CU, video decoder 30 applies a constraint such that pulse code modulation (PCM) is disabled, e.g., for the current CU (266). When SDC coding is not used for a CU, PCM may remain enabled (267). In this manner, video decoder 30 constrains it coding operations to exclude PCM when SDC is signaled for a CU. With a constraint that PCM is disabled, in some examples, video decoder 30 need not parse for PCM mode information.

Figure 12:
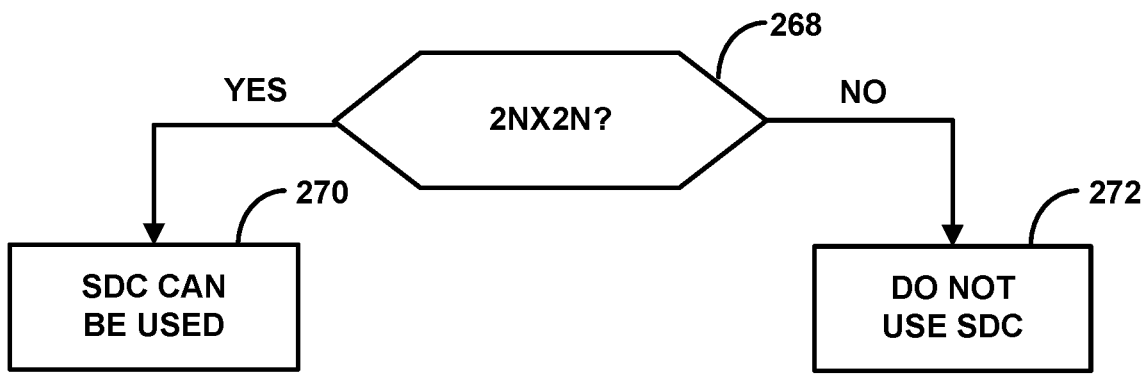
FIG. 12 is a flow diagram illustrating the use of another example constraint on SDC coding at the decoder side.

FIG. 12 is a flow diagram illustrating the use OF another example constraint on SDC coding at the decoder side. As an example of an additional constraint, video decoder 30 may determine the partition size of a current CU (268), or partition sizes of each CU to be coded in a slice, picture or video sequence. In one example, if the partition size of a current CU is not equal to 2N×2N, video decoder 30 disables SDC for the pertinent CU (272). If the partition size is equal to 2N×2N, SDC can be used (270) by video decoder 30. Use of SDC will depend on the value of sdc_flag for the CU. In this manner, video decoder 30 applies a constraint such that SDC is only used for CU's with partition sizes of 2N×2N. As an alternative, video decoder 30 may apply a constraint such that SDC is only used for inter CU's with partition sizes of 2N×2N and intra CU's with partition sizes of 2N×2N or N×N. Video encoder 20 may be configured to apply SDC modes only for particular partition sizes as described above. By applying constraints at the decoder side, however, it may not be necessary for video encoder 20 to signal which particular CU's use SDC mode prediction. Instead, video encoder 20 may simply generate an SDC syntax element to indicate whether SDC is used for both depth intra and depth inter modes, and then apply SDC to CU's that meet partition size requirements. With this constraint, video decoder 30 applies non-SDC coding to CU's that do not meet applicable partition size requirements.

The techniques described above may be performed by video encoder 20 (FIGS. 1 and 5) and/or video decoder 30 (FIGS. 1 and 6), both of which may be generally referred to as a video coder. In addition, video coding may generally refer to video encoding and/or video decoding, as applicable.

While the techniques of this disclosure are generally described with respect to 3D-HEVC, the techniques are not limited in this way. The techniques described above may also be applicable to other current standards or future standards for video coding. For example, the techniques for depth coding may also be applicable to other current or future standards requiring coding of a depth component, e.g., for 3D video coding or other applications.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

decoding information indicating whether a depth coding unit (CU) of the video data is intra-predicted or inter-predicted, wherein:

in case of intra-prediction, based on the depth CU of the video data being intra-predicted, performing intra-prediction to generate a predicted depth CU, wherein performing intra-prediction to generate the predicted depth CU comprises generating the predicted depth CU based on neighboring samples of the depth CU; or in case of inter-prediction, based on the depth CU being inter-predicted, performing inter-prediction to generate the predicted depth CU, wherein performing inter-prediction to generate the predicted depth CU comprises generating the predicted depth CU based on a motion vector that points to a block of reference samples, wherein the method further comprising:

based on a simplified depth coding (SDC) mode being used, obtaining a syntax structure comprising one or more syntax elements indicating information representing at least one DC residual value for a partition of a prediction unit (PU) of the depth CU, wherein the syntax elements of the syntax structure are the same regardless of whether the depth CU is intra-predicted or inter-predicted and the syntax elements of the syntax structure are different than the decoded information indicating whether the depth CU is intra-predicted or inter-predicted; and reconstructing the depth CU using the at least one DC residual value and the predicted depth CU, wherein the partition of the PU of the depth CU is a first partition of a first PU for a first depth CU, wherein the first depth CU is intra-predicted, wherein the at least one DC residual value comprises a first DC residual value, and wherein obtaining the syntax structure for the first partition of the first PU of the first depth CU comprises obtaining a first instance of the syntax structure, the method further comprising:

obtaining a second instance of the same syntax structure for a second partition of a second PU of a second depth CU that is inter-predicted, the second instance of the syntax structure comprising one or more syntax elements indicating information representing a second DC residual value for a partition of a PU of the second depth CU; and entropy decoding each of the first instance and second instance of the syntax structure according to a respective context-adaptive entropy decoding process using a same context model for each respective context-adaptive entropy decoding process.

2. The method of claim 1, wherein the syntax structure is a single syntax structure applicable to the depth CU regardless of whether the depth CU is intra-predicted or inter-predicted, and wherein the single syntax structure comprises the syntax elements indicating information representing the at least one DC residual value.

3. The method of claim 1, wherein the information indicated by the syntax elements represents an absolute value of the DC residual value for the depth CU and a sign of the DC residual value.

4. A method of encoding video data, the method comprising:

signaling information indicating whether a depth coding unit (CU) of the video data is intra-predicted or inter-predicted, wherein:

in case of intra-prediction, based on the depth CU of the video data being intra-predicted, performing intra-prediction to generate a predicted depth CU, wherein performing intra-prediction to generate the predicted depth CU comprises generating the predicted depth CU based on neighboring samples of the depth CU; or in case of inter-prediction, based on the depth CU being inter-predicted, performing inter-prediction to generate the predicted depth CU, wherein performing inter-prediction to generate the predicted depth CU comprises generating the predicted depth CU based on a motion vector that points to a block of reference samples, wherein the method further comprising:

based on a simplified depth coding (SDC) mode being used, encoding a syntax structure comprising one or more syntax elements indicating information representing at least one DC residual value for a partition of a prediction unit (PU) of the depth CU, wherein the syntax elements of the syntax structure are the same regardless of whether the depth CU is intra-predicted or inter-predicted and the syntax elements of the syntax structure are different than the signaled information indicating whether the depth CU is intra-predicted or inter-predicted; and encoding the depth CU based on the information representing the at least one DC residual value, wherein the partition of the PU of the depth CU is a first partition of a first PU for a first depth CU, wherein the first depth CU is intra-predicted, wherein the at least one DC residual value comprises a first DC residual value, and wherein encoding the syntax structure for the first partition of the first PU of the first depth CU comprises encoding a first instance of the syntax structure, the method further comprising:

encoding a second instance of the same syntax structure for a second partition of a second PU of a second depth CU that is inter-predicted, the second instance of the syntax structure comprising one or more syntax elements indicating information representing a second DC residual value for a partition of a PU of the second depth CU; and entropy encoding each of the first instance and second instance of the syntax structure according to a respective context-adaptive entropy encoding process using a same context model for each respective context-adaptive entropy encoding process.

5. The method of claim 4, wherein the syntax structure is a single syntax structure applicable to the depth CU regardless of whether the depth CU is intra-predicted or inter-predicted, and wherein the single syntax structure comprises the syntax elements indicating information representing the at least one DC residual value.

6. The method of claim 4, wherein the information indicated by the syntax elements represents an absolute value of the DC residual value for the depth CU and a sign of the DC residual value.

7. A video coding device comprising:
  a memory storing video data; and
  one or more processors configured to:
    code information indicating whether a depth coding unit (CU) of the video is intra-predicted or inter-predicted, wherein:
      in case of intra-prediction, based on the depth CU of the video data stored to the memory being intra-predicted, perform intra-prediction to generate a predicted depth CU of the video data, wherein to perform intra-prediction to generate the predicted depth CU, the one or more processors are configured to generate the predicted depth CU based on neighboring samples of the depth CU; or
      in case of inter-prediction, based on the depth CU being inter-predicted, perform inter-prediction to generate the predicted depth CU of the video data stored to the memory, wherein to perform inter-prediction to generate the predicted depth CU, the one or more processors are configured to generate the predicted depth CU based on a motion vector that points to a block of reference samples,
    wherein the one or more processors are configured to, based on a simplified depth coding (SDC) mode being used, code a syntax structure comprising one or more syntax elements indicating information representing at least one DC residual value for a partition of a prediction unit (PU) of the depth CU, wherein the syntax elements of the syntax structure are the same regardless of whether the depth CU is intra-predicted or inter-predicted and the syntax elements of the syntax structure are different than the information indicating whether the depth CU is intra-predicted or inter-predicted,
    wherein the partition of the PU of the depth CU is a first partition of a first PU for a first depth CU, wherein the first depth CU is intra-predicted, wherein the at least one DC residual value comprises a first DC residual value, wherein the syntax structure for the first partition of the first PU of the first depth CU is a first instance of the syntax structure, and wherein the one or more processors are further configured to:
      code a second instance of the same syntax structure for a second partition of a second PU of a second depth CU that is inter-predicted, the second instance of the same syntax structure comprising one or more syntax elements indicating information representing a second DC residual value for a partition of a PU of the second depth CU; and
      entropy code each of the first instance and second instance of the syntax structure according to a respective context-adaptive entropy coding process using a same context model for each respective context-adaptive entropy coding process.

8. The video coding device of claim 7, wherein the video coding device comprises a video decoding device, and wherein the one or more processors are configured to:
  decode the syntax elements in the syntax structure to obtain the information representing the at least one DC residual value; and
  reconstruct the depth CU using the at least one DC residual value and the predicted depth CU.

9. The video coding device of claim 7, wherein the video coding device comprises a video encoding device, and wherein the one or more processors are configured to encode the syntax elements in the syntax structure to indicate the information representing the at least one DC residual value.

10. The video coding device of claim 7, wherein the syntax structure is a single syntax structure applicable to the depth CU regardless of whether the depth CU is intra-predicted or inter-predicted, and wherein the single syntax structure comprises the syntax elements indicating information representing the at least one DC residual value.

11. The video coding device of claim 7, wherein the information indicated by the syntax elements represents an absolute value of the DC residual value for the depth CU and a sign of the DC residual value.

12. A video coding device comprising:
  means for coding information indicating whether a depth coding unit (CU) of video data is intra-predicted or inter-predicted;
  in case of intra-prediction, means for performing intra-prediction to generate a predicted depth CU) based on the depth CU of the video data being intra-predicted, wherein the means for performing intra-prediction to generate the predicted depth CU comprises means for generating the predicted depth CU based on neighboring samples of the depth CU; or
  in case of inter-prediction, means for performing inter-prediction to generate the predicted depth CU based on the depth CU being inter-predicted, wherein the means for performing inter-prediction to generate the predicted depth CU comprises means for generating the predicted depth CU based on a motion vector that points to a block of reference samples; and
  the device further comprising means for coding, based on a simplified depth coding (SDC) mode being used, a syntax structure comprising one or more syntax elements indicating information representing at least one DC residual value for a partition of a prediction unit (PU) of the depth CU, wherein the syntax elements of the syntax structure are the same regardless of whether the depth CU is intra-predicted or inter-predicted and the syntax elements of the syntax structure are different than the information indicating whether the depth CU is intra-predicted or inter-predicted,
  wherein the partition of the PU of the depth CU is a first partition of a first PU for a first depth CU, wherein the first depth CU is intra-predicted, wherein the at least one DC residual value comprises a first DC residual value, and wherein the syntax structure for the first partition of the first PU of the first depth CU is a first instance of the syntax structure, the device further comprising:
    means for coding a second instance of the same syntax structure for a second partition of a second PU of a second depth CU that is inter-predicted, the second instance of the same syntax structure comprising one or more syntax elements indicating information representing a second DC residual value for a partition of a PU of the second depth CU; and
    means for entropy coding each of the first instance and second instance of the syntax structure according to a respective context-adaptive entropy coding process using a same context model for each respective context-adaptive entropy coding process.

13. The video coding device of claim 12, wherein the video coding device is a video decoding device comprising means for reconstructing the depth CU using the at least one DC residual value and the predicted depth CU.

14. A non-transitory computer-readable storage medium encoded with instructions that, when executed, cause one or more processors to:

code information indicating whether a depth coding unit (CU) of the video data is intra-predicted or inter-predicted, wherein:

in case of intra-prediction, the instructions cause the one or more processors to perform intra-prediction, based on the depth CU of the video data being intra-predicted, to generate a predicted depth CU, wherein the instructions to perform intra-prediction to generate the predicted depth CU comprise instructions to generate the predicted depth CU based on neighboring samples of the depth CU; or in case of inter-prediction, the instructions cause the one or more processors to perform inter-prediction, based on the depth CU being inter-predicted, to generate the predicted depth CU, wherein the instructions to perform inter-prediction to generate the predicted depth CU comprise instructions to generate the predicted depth CU based on a motion vector that points to a block of reference samples, the instructions further comprising instructions that cause the one or more processors to code, based on a simplified depth coding (SDC) mode being used, a syntax structure comprising one or more syntax elements indicating information representing at least one DC residual value for a partition of a prediction unit (PU) of the depth CU, wherein the syntax elements of the syntax structure are the same regardless of whether the depth CU is intra-predicted or inter-predicted and the syntax elements of the syntax structure are different than the information indicating whether the depth CU is intra-predicted or inter-predicted, wherein the partition of the PU of the depth CU is a first partition of a first PU for a first depth CU, wherein the first depth CU is intra-predicted, wherein the at least one DC residual value comprises a first DC residual value, and wherein the syntax structure for the first partition of the first PU of the first depth CU is a first instance of the syntax structure, the one or more processors being further configured to:

code a second instance of the same syntax structure for a second partition of a second PU of a second depth CU that is inter-predicted, the second instance of the same syntax structure comprising one or more syntax elements indicating information representing a second DC residual value for a partition of a PU of the second depth CU; and entropy code each of the first instance and second instance of the syntax structure according to a respective context-adaptive entropy coding process using a same context model for each respective context-adaptive entropy coding process.

15. The non-transitory computer-readable storage medium of claim 14, further encoded with instructions that, when executed, cause the one or more processors to reconstruct the depth CU using the at least one DC residual value and the predicted depth CU.

* * * * *